(12) United States Patent
Lee et al.

(10) Patent No.: US 12,321,401 B1
(45) Date of Patent: Jun. 3, 2025

(54) MULTIMODAL QUERY PREDICTION

(71) Applicant: Google LLC, Mountain View, CA (US)

(72) Inventors: Jessica Lee, Brooklyn, NY (US); Cindy L. Huynh, San Francisco, CA (US); Harshit Kharbanda, Pleasanton, CA (US); Louis Wang, San Francisco, CA (US); Richard Cameron, Port Washington, NY (US); Christophe Patrice Fondacci, Daly City, CA (US); Ruslan Alfridovich Abdikeev, Burlingame, CA (US); Jatin Matani, San Francisco, CA (US); Kai Yu, San Francisco, CA (US); Wenjia Yuan, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/738,529

(22) Filed: Jun. 10, 2024

(51) Int. Cl.
*G06F 16/95* (2019.01)
*G06F 3/0482* (2013.01)
*G06F 3/0488* (2022.01)
*G06F 16/9532* (2019.01)
*G06F 16/9535* (2019.01)
*G06F 16/957* (2019.01)

(52) U.S. Cl.
CPC ........ *G06F 16/9532* (2019.01); *G06F 3/0482* (2013.01); *G06F 3/0488* (2013.01); *G06F 16/9535* (2019.01); *G06F 16/9577* (2019.01)

(58) Field of Classification Search
None
See application file for complete search history.

(56) References Cited

U.S. PATENT DOCUMENTS

| 9,563,623 | B2 * | 2/2017 | Sawhney | G06F 16/9535 |
| 9,564,123 | B1 * | 2/2017 | Mont-Reynaud | G06F 40/253 |
| 9,720,934 | B1 * | 8/2017 | Dube | G06V 10/40 |
| 10,032,072 | B1 * | 7/2018 | Tran | G06F 18/28 |
| 10,984,337 | B2 * | 4/2021 | Bai | G06F 16/3322 |
| 12,079,292 | B1 * | 9/2024 | Badr | G06F 16/9535 |
| 12,111,834 | B1 * | 10/2024 | Carbune | G06F 16/24553 |
| 12,124,524 | B1 * | 10/2024 | Cheung | G06F 16/9535 |
| 2009/0278809 | A1 | 11/2009 | Ohsawa | |

(Continued)

FOREIGN PATENT DOCUMENTS

| WO | WO 2011/100441 | 8/2011 |
| WO | WO 2018/200798 | 11/2018 |
| WO | WO 2019/204596 | 10/2019 |

OTHER PUBLICATIONS

International Search Report and Written Opinion for Application No. PCT/US2023/019750, mailed Jul. 13, 2023, 13 pages.

*Primary Examiner* — Eliyah S. Harper
(74) *Attorney, Agent, or Firm* — DORITY & MANNING P.A.

(57) ABSTRACT

Systems and methods for multimodal query suggestion can include obtaining image data, determining text strings associated with the image data, and providing the text strings as selectable options for performing a multimodal query with the image data. The text strings can be determined based on performing object detection and classification on the image data. The object classifications can then be leveraged for determining potential text queries a user may select for obtaining additional information about the classified object.

20 Claims, 31 Drawing Sheets

(56) References Cited

U.S. PATENT DOCUMENTS

| | | |
|---|---|---|
| 2010/0082685 A1 | 4/2010 | Hoisman et al. |
| 2010/0085169 A1 | 4/2010 | Poupyrev et al. |
| 2011/0128288 A1 | 6/2011 | Petrou et al. |
| 2011/0177799 A1* | 7/2011 | Ramer .............. H04L 67/306 455/414.1 |
| 2012/0117051 A1* | 5/2012 | Liu .............. G06F 16/90335 707/707 |
| 2013/0265226 A1 | 10/2013 | Park et al. |
| 2016/0149956 A1 | 5/2016 | Birnbaum et al. |
| 2016/0283101 A1 | 9/2016 | Schwesig et al. |
| 2016/0283519 A1 | 9/2016 | Glasgow et al. |
| 2016/0370975 A1* | 12/2016 | Collins .............. G06F 3/04817 |
| 2017/0228009 A1 | 8/2017 | Chueh et al. |
| 2018/0089199 A1 | 3/2018 | Frumkin et al. |
| 2018/0349722 A1* | 12/2018 | Chiang .................. G06T 7/11 |
| 2020/0159373 A1 | 5/2020 | Bakker et al. |
| 2020/0167995 A1* | 5/2020 | Hare .................. G06F 3/04815 |
| 2020/0229515 A1 | 7/2020 | Poupyrev et al. |
| 2020/0305802 A1* | 10/2020 | Archambault ....... A61B 5/0002 |
| 2021/0074074 A1* | 3/2021 | Goodrich .............. G06V 20/20 |
| 2021/0224312 A1 | 7/2021 | Harikumar et al. |
| 2023/0106673 A1* | 4/2023 | Asghar .................. A61B 5/024 382/104 |
| 2023/0326489 A1* | 10/2023 | Liu ........................ G06T 11/60 386/209 |
| 2023/0351706 A1* | 11/2023 | Babinowich ........... G01C 15/00 |
| 2024/0302375 A1* | 9/2024 | Kight ............... G01N 33/57449 |
| 2024/0311421 A1* | 9/2024 | Lathia .................. G06F 16/538 |
| 2024/0339217 A1* | 10/2024 | Bui ........................ G16H 50/20 |
| 2024/0355065 A1* | 10/2024 | Miller .................. G06T 19/006 |
| 2024/0378256 A1* | 11/2024 | Sadr .................... G06F 16/9538 |
| 2025/0044930 A1* | 2/2025 | Josephson ............. G06F 3/0484 |

\* cited by examiner

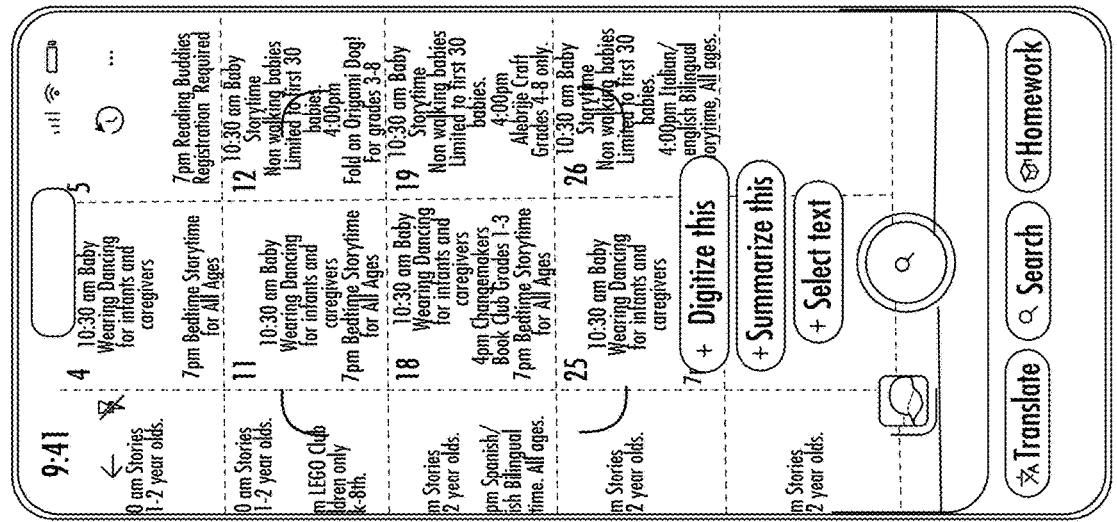
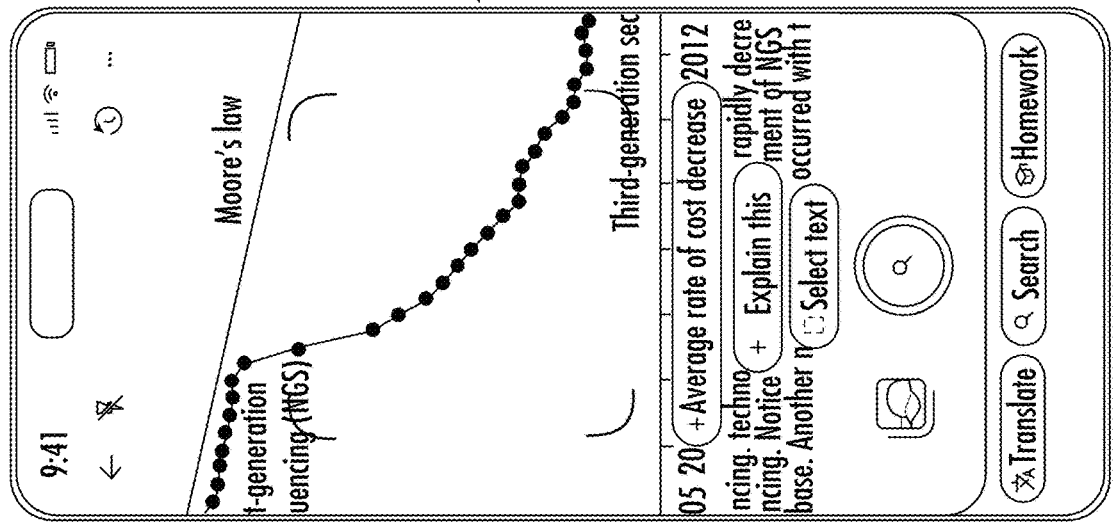
FIG. 4A

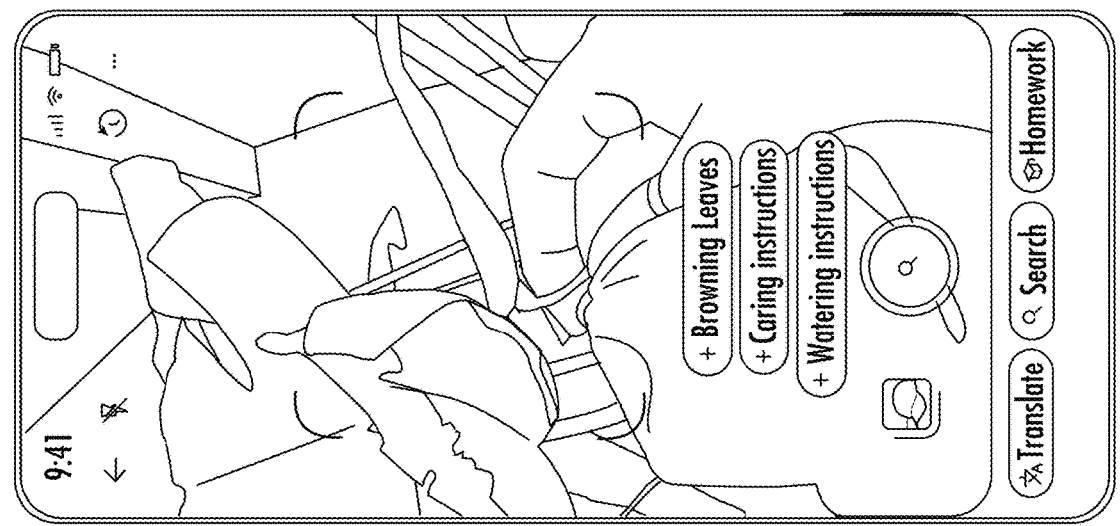
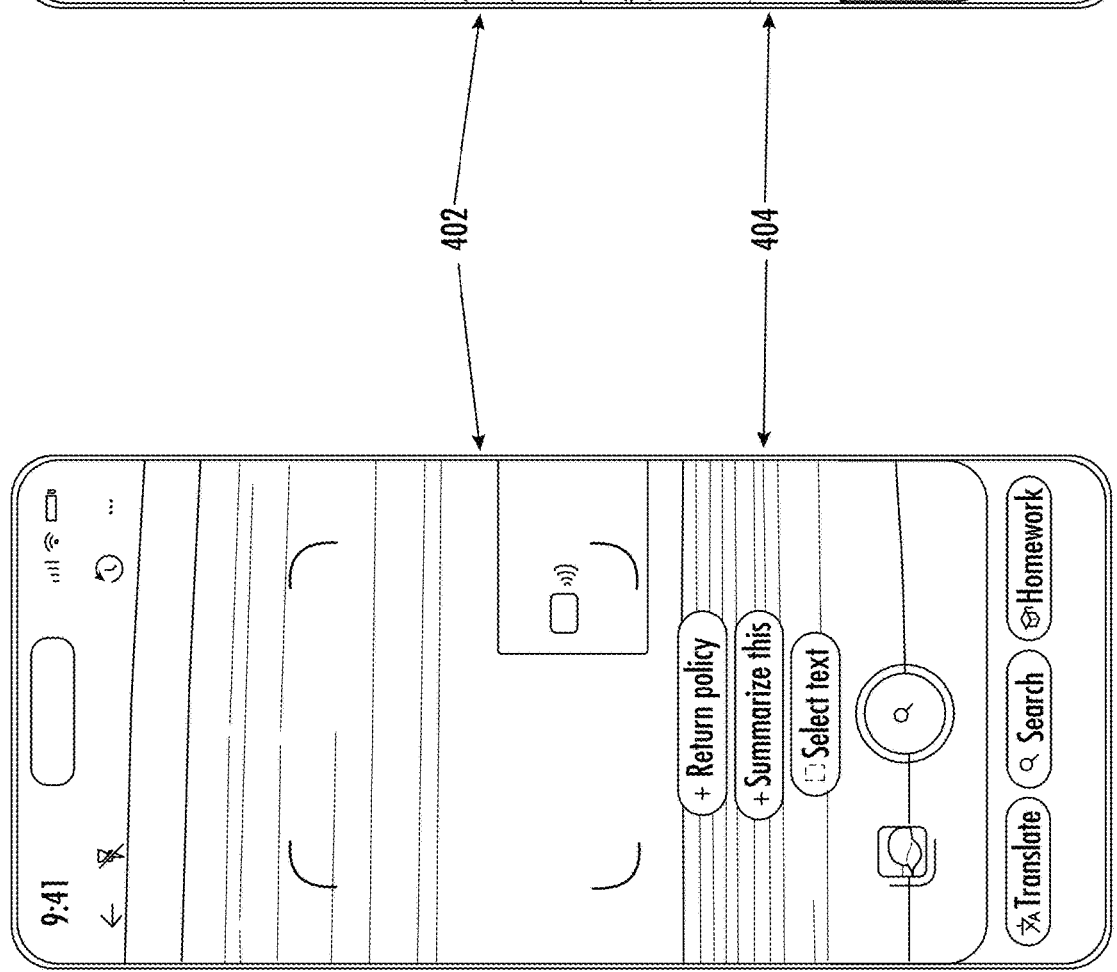
FIG. 4B

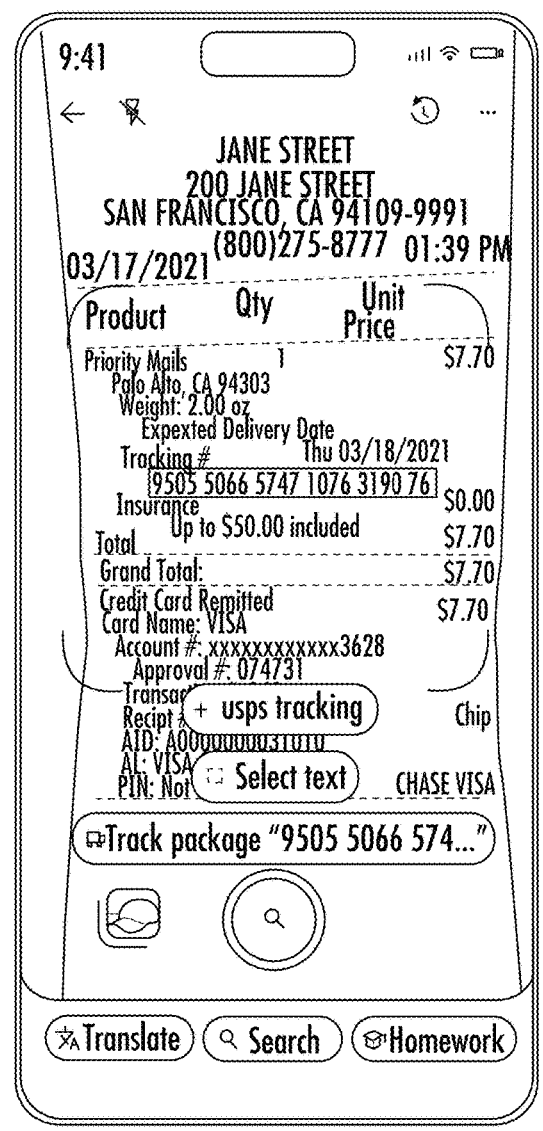
FIG. 5A

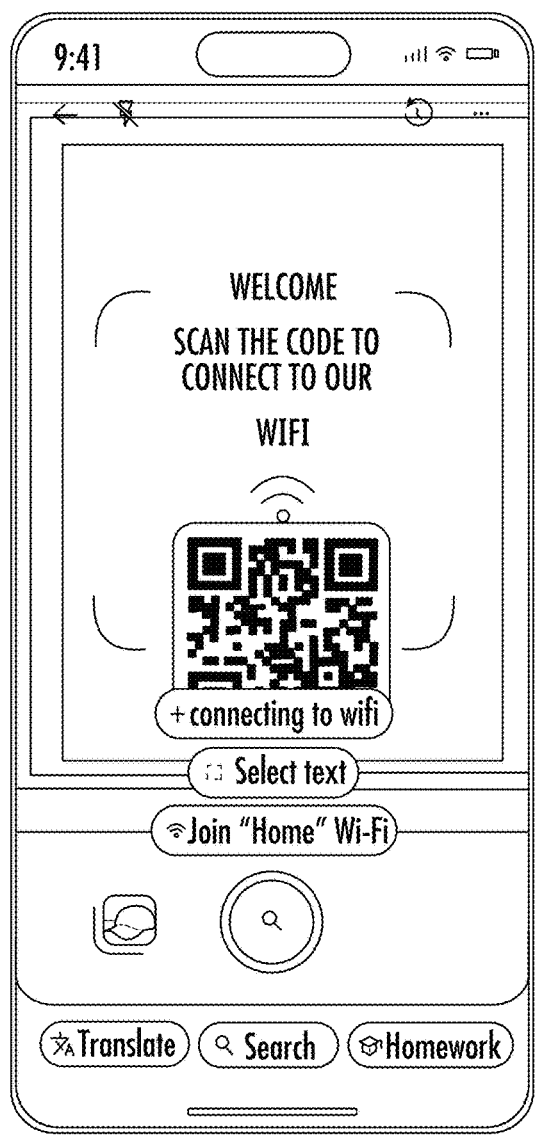
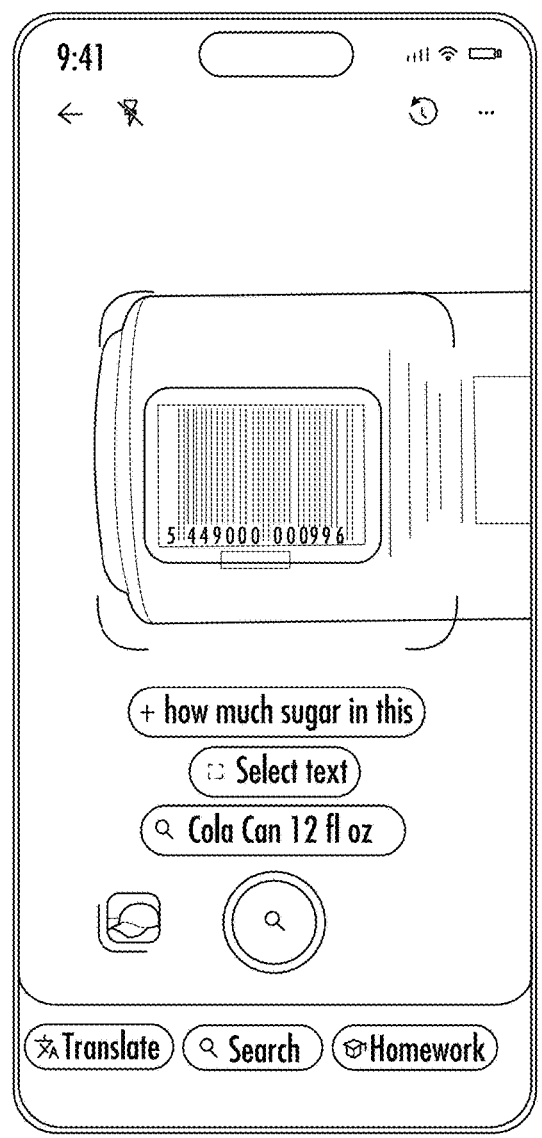
FIG. 5B

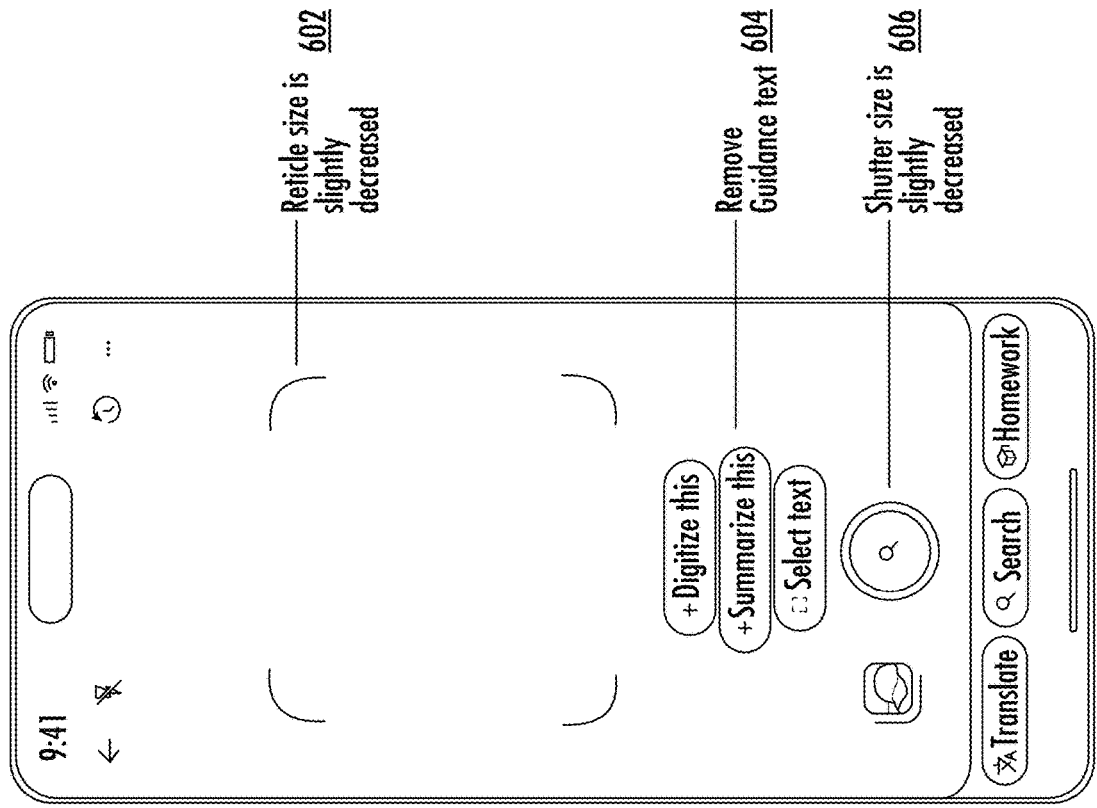
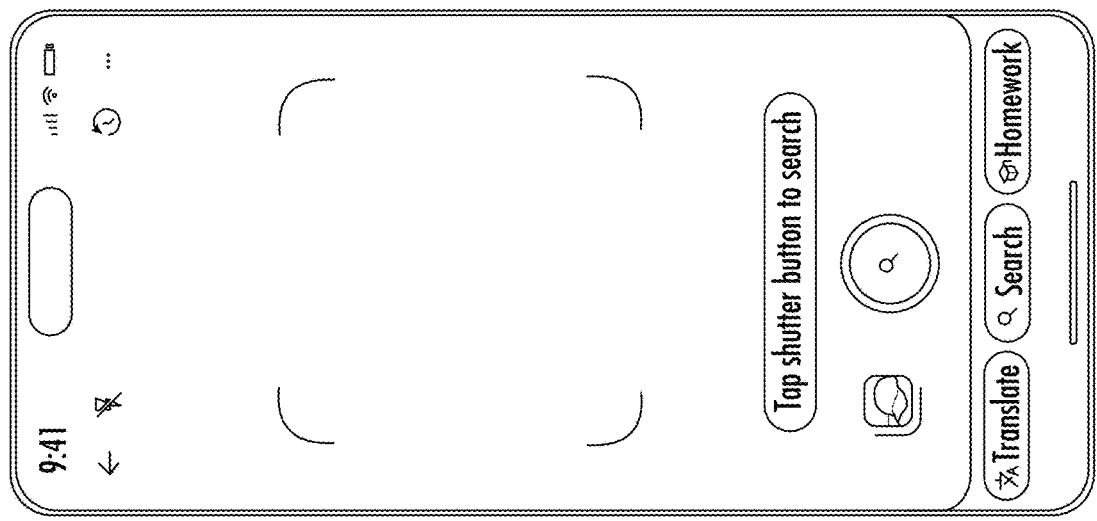
FIG. 6

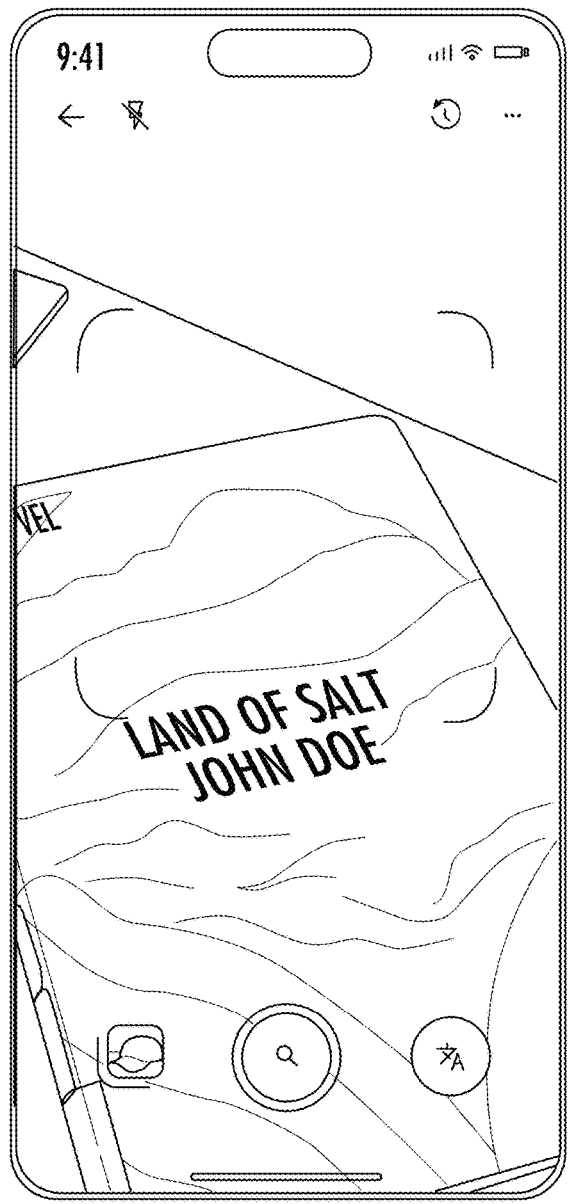 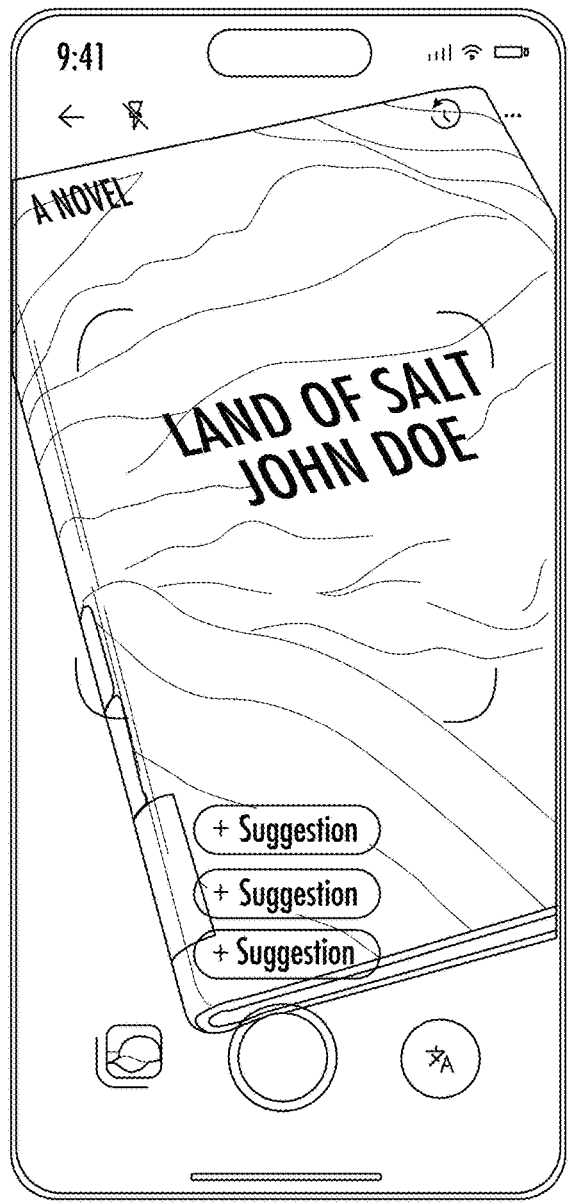
902 904
FIG. 9A

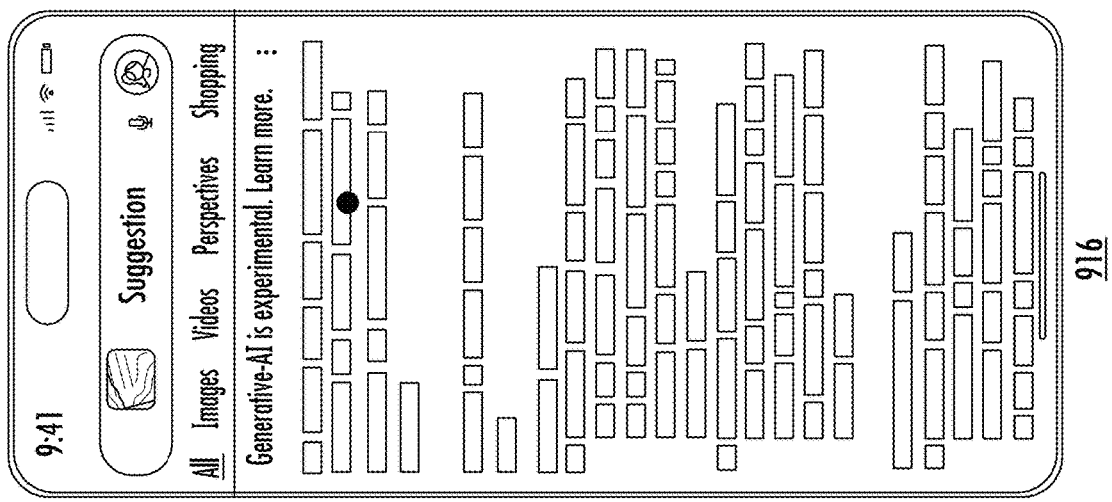
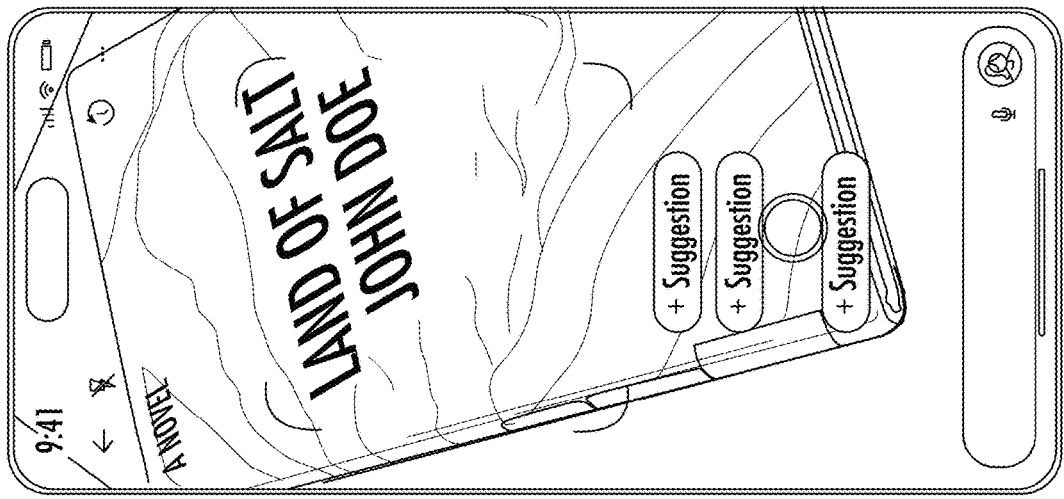
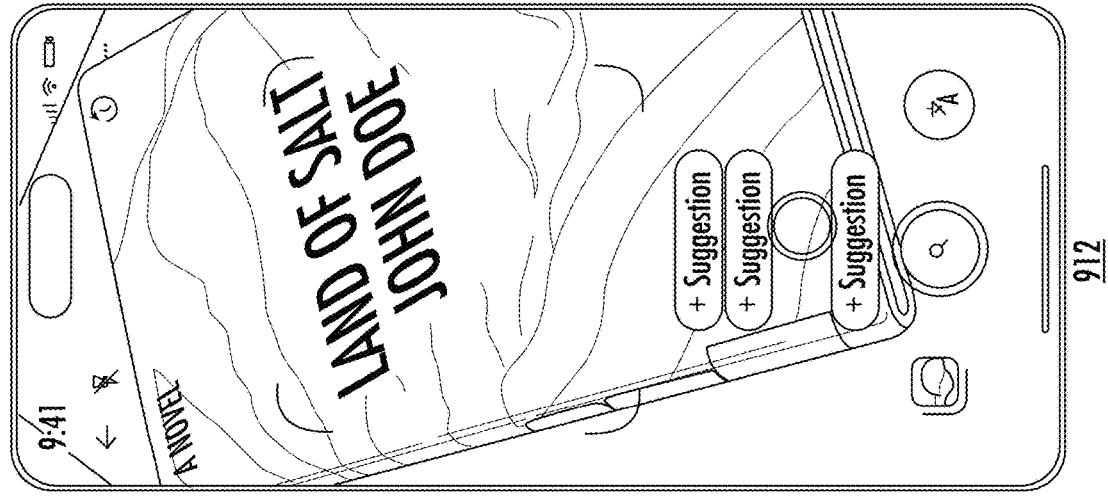
FIG. 9D

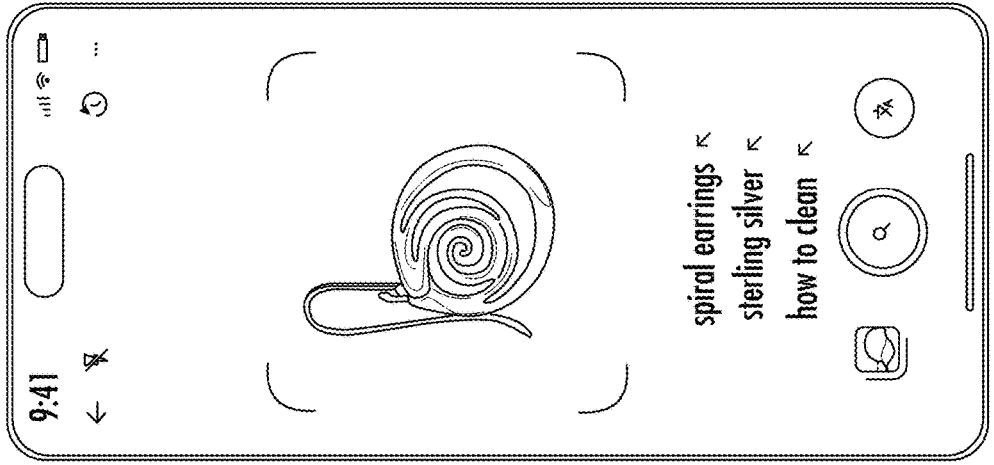
1.7 Bottom Gradient Dim, Floating Text
1114
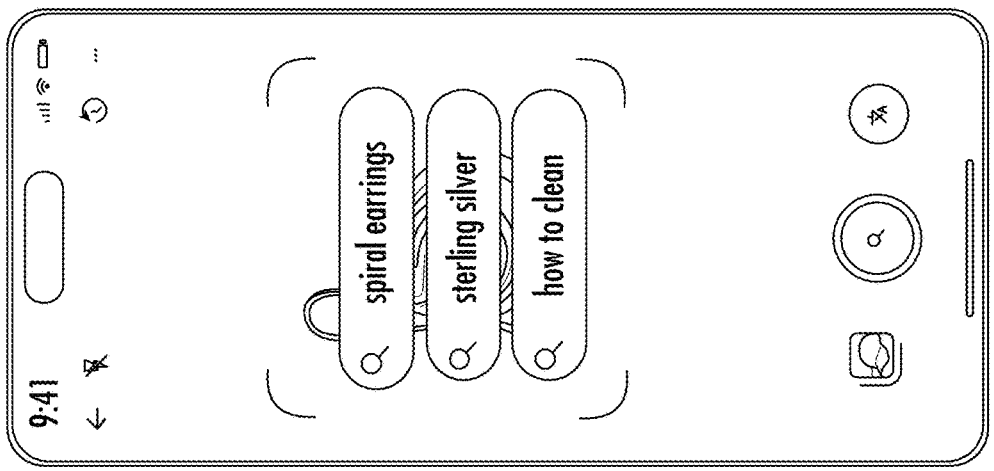
1.6 Big tap target center of Reticle
1112
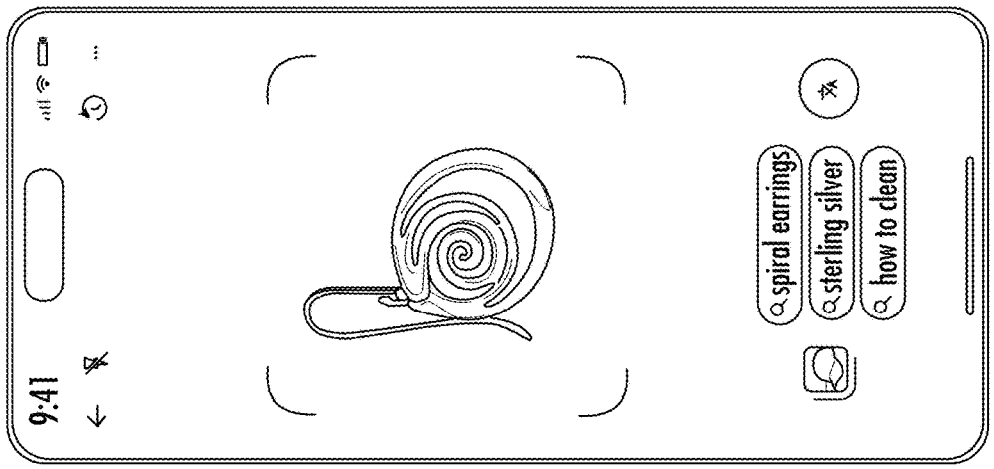
1.5 Chips replaces Shutter
1110
FIG. 11B

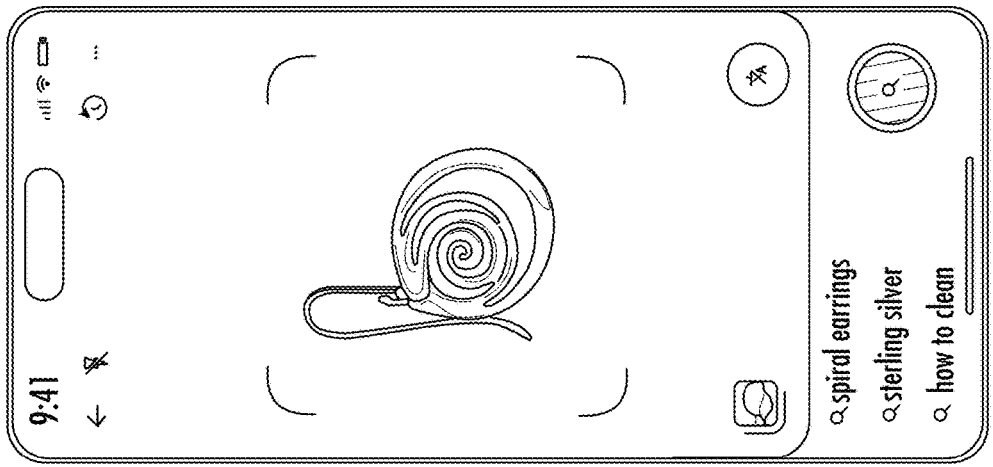
2.5 Full width, Bottom-right Magi Blue Shutter, Light
1124
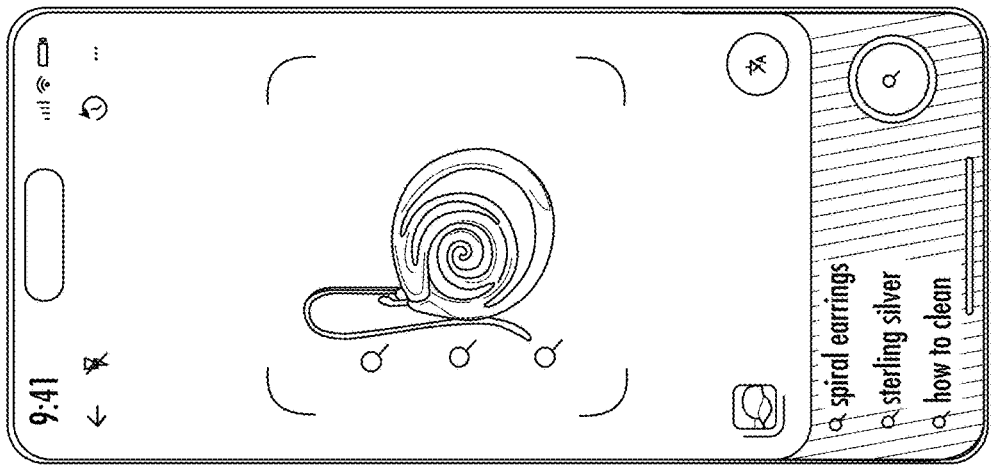
2.6 Full width, Bottom-right Shutter, Dark
1126
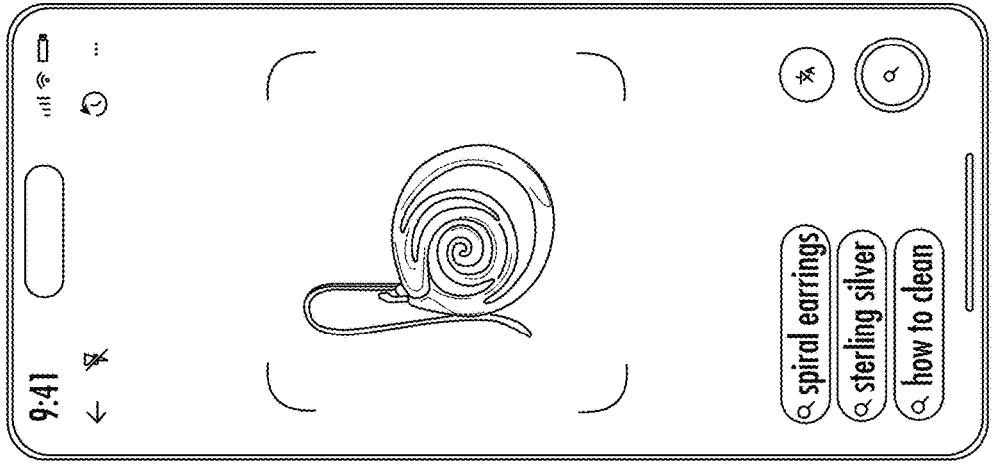
2.7 Chips, Bottom-right Shutter, Dark
1128
FIG. 11D

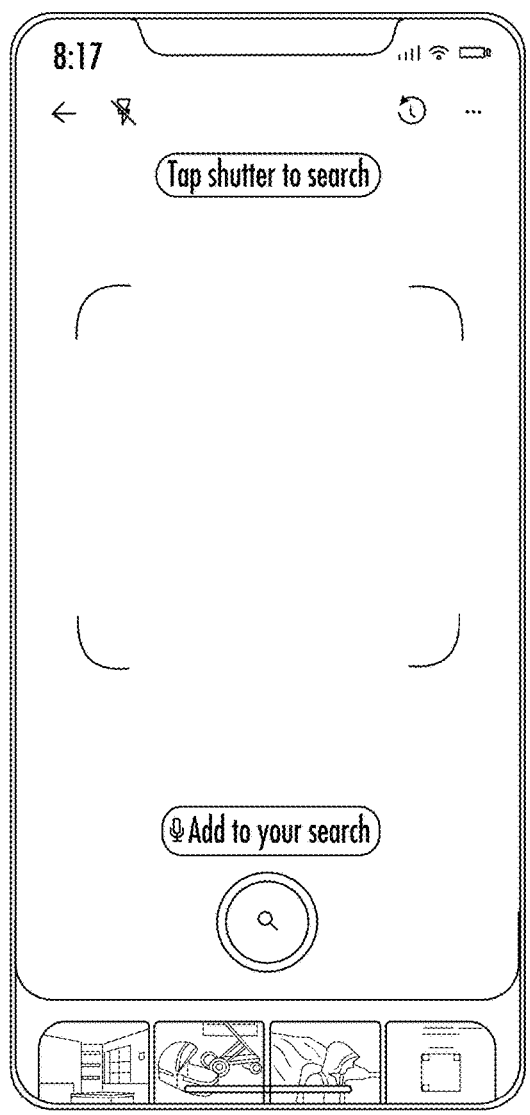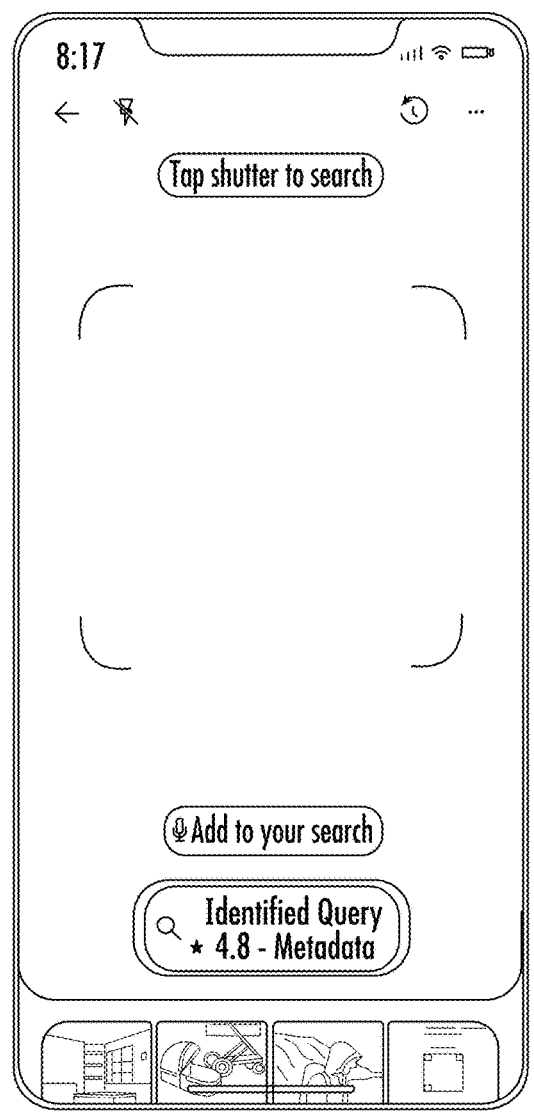
FIG. 15

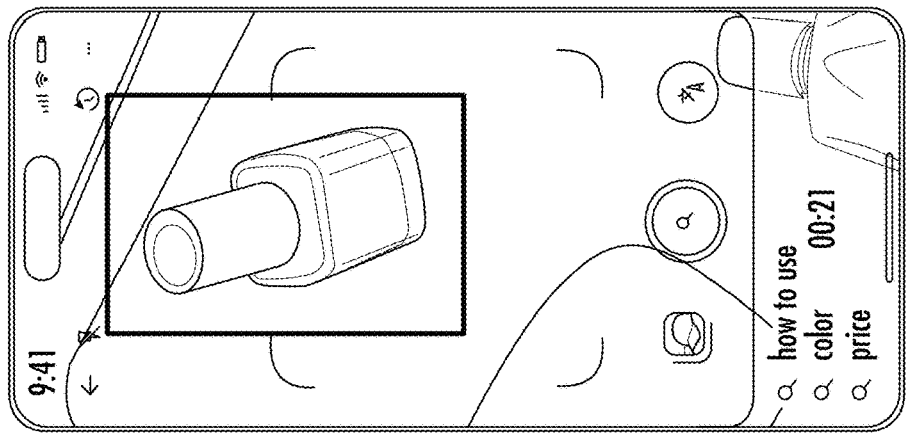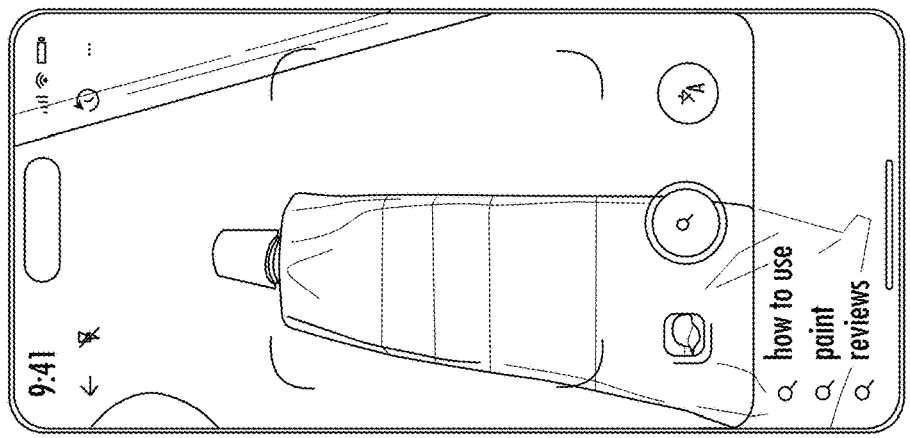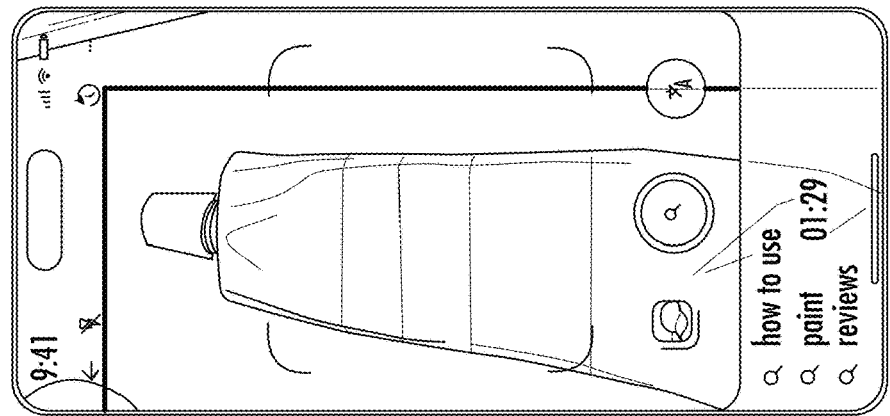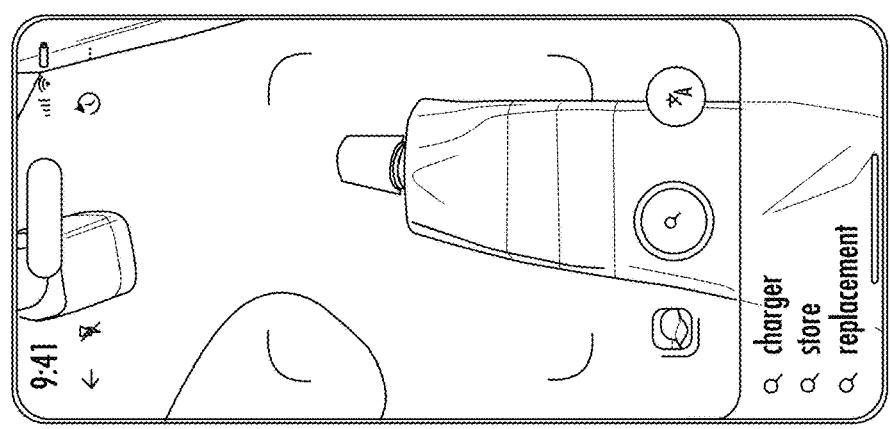
FIG. 17

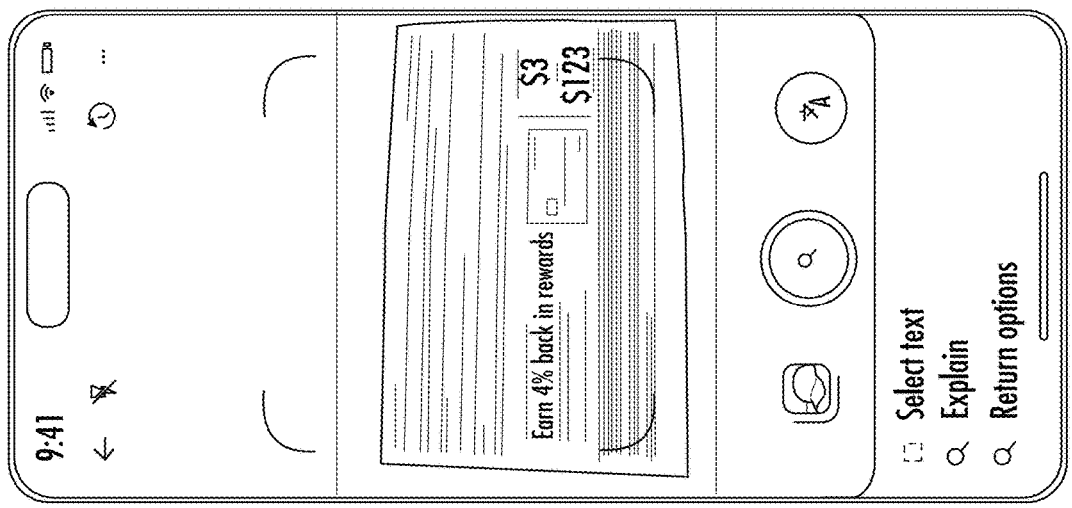
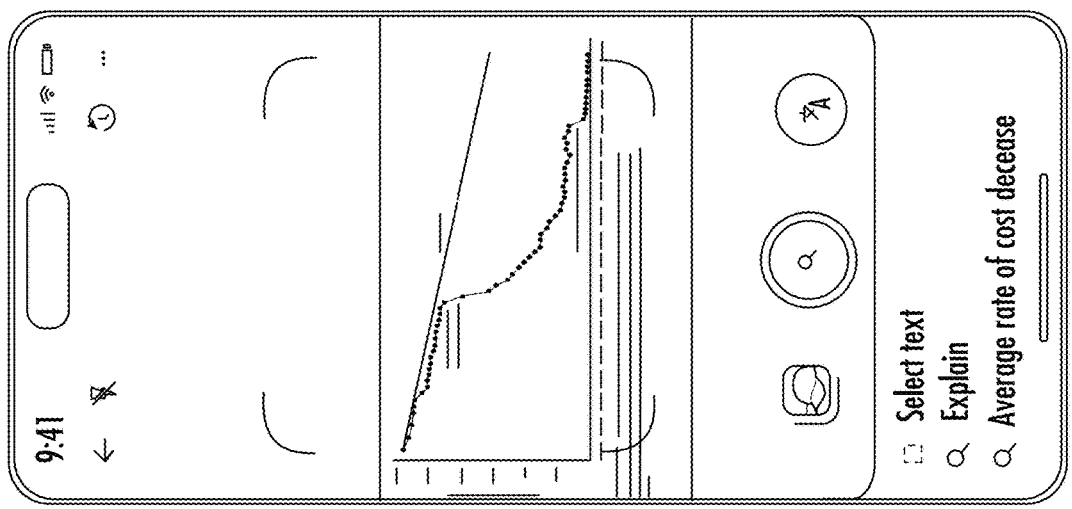
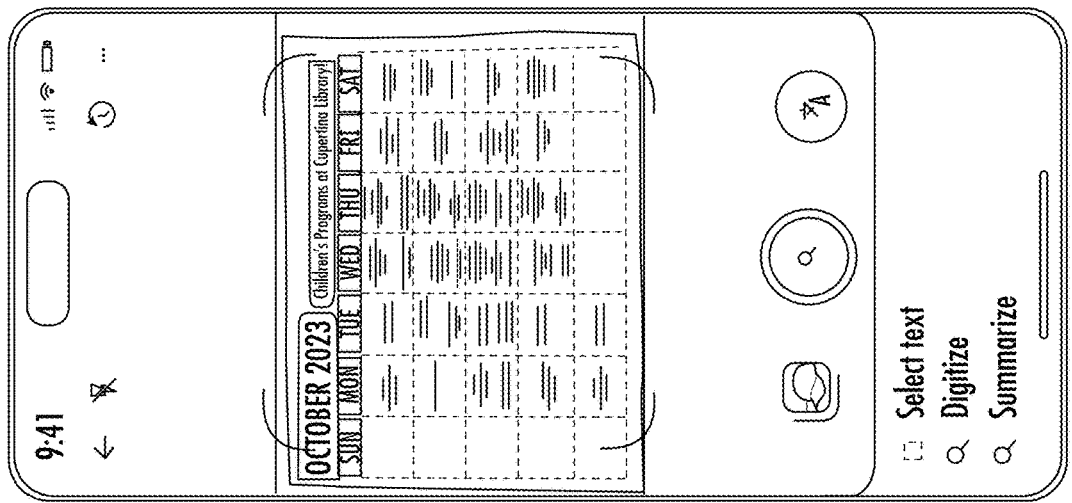
FIG. 18

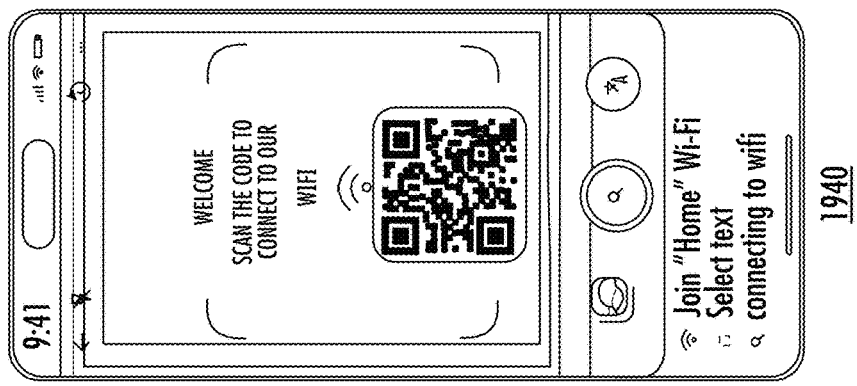
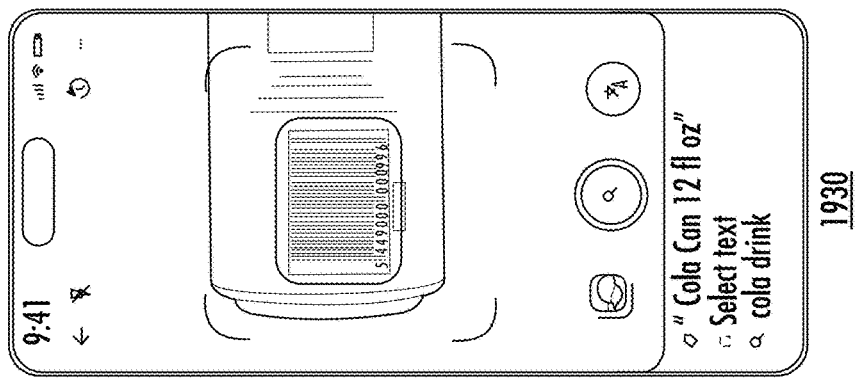
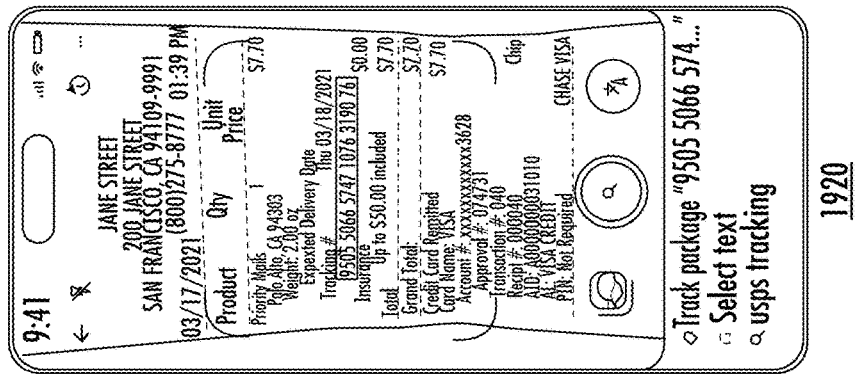
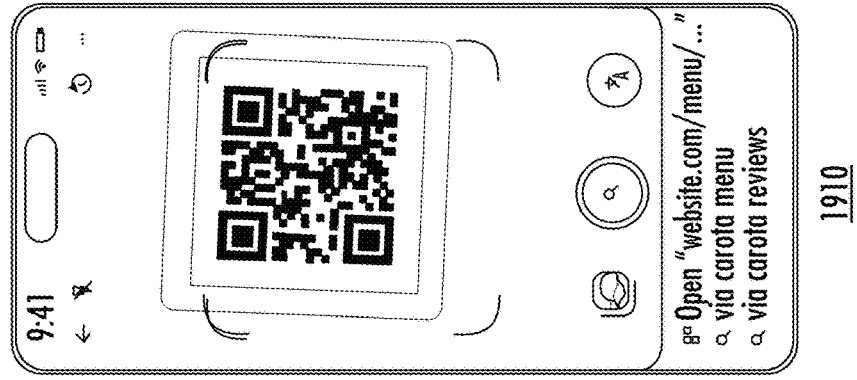
FIG. 19

MULTIMODAL QUERY PREDICTION

FIELD

The present disclosure relates generally to multimodal query suggestion. More particularly, the present disclosure relates to processing image data, determining text strings associated with one or more objects depicted in the image data, and providing the text strings with the image data.

BACKGROUND

Understanding the world at large can be difficult. Whether an individual is trying to understand what the object in front of them is, trying to determine where else the object can be found, and/or trying to determine where an image on the internet was captured from, text searching alone can be difficult. In particular, users may struggle to determine which words to use. Additionally, the words may not be descriptive enough and/or abundant enough to generate desired results.

In addition, the content being requested by the user may not be readily available to the user based on the user not knowing where to search, based on the storage location of the content, and/or based on the content not existing. The user may be requesting search results based on an imagined concept without a clear way to express the imagined concept.

SUMMARY

Aspects and advantages of embodiments of the present disclosure will be set forth in part in the following description, or can be learned from the description, or can be learned through practice of the embodiments.

One example aspect of the present disclosure is directed to a computing system for multimodal search. The system can include one or more processors and one or more non-transitory computer-readable media that collectively store instructions that, when executed by the one or more processors, cause the computing system to perform operations. The operations can include obtaining image data. The image data can be descriptive of one or more images. The one or more images can include one or more frames obtained from a live camera feed. The operations can include processing the image data with an object classification model to determine one or more object classifications for one or more objects depicted in the one or more images. The operations can include processing the one or more object classifications to generate one or more multimodal query suggestions. The one or more multimodal query suggestions can include one or more suggested text strings to provide with at least a portion of the image data to a search engine. The operations can include providing the one or more suggested text strings for display with the live camera feed. The operations can include obtaining a selection of the one or more suggested text strings associated with the one or more multimodal query suggestions and generating a multimodal query comprising the one or more suggested text strings and at least one of the one or more images or a current frame of the live camera feed. The operations can include determining one or more search results based on the multimodal query.

In some implementations, processing the one or more object classifications to generate the one or more multimodal query suggestions can include determining one or more textual queries associated with one or more object types associated with the one or more object classifications. The one or more textual queries can be determined based on one or more knowledge graphs. The one or more textual queries can be determined based on a user-specific search history for a user associated with a mobile computing device. The live camera feed can be generated with the mobile computing device.

In some implementations, generating the multimodal query can include processing at least one of the one or more images or the current frame of the live camera feed with an image segmentation model to generate an image segment that comprises a frame region that depicts the one or more objects and providing the image segment and the one or more suggested text strings to the search engine. Determining the one or more search results based on the multimodal query can include processing the multimodal query with an embedding model to generate a multimodal query embedding and determining, based on the multimodal query embedding, one or more nearest neighbor embeddings associated with one or more web resources to provide as the one or more search results.

In some implementations, providing the one or more suggested text strings for display with the live camera feed can include providing the one or more suggested text strings overlayed over the live camera feed. The operations further can include providing the one or more search results for display in a search results interface provided below the live camera feed. Obtaining image data can include obtaining the one or more images from a temporary cache. The temporary cache temporarily can store frames from the live camera feed. The frames of the temporary cache can be deleted from the temporary cache when a threshold time from capture is reached. In some implementations, the temporary cache can be updated on a rolling basis to delete frames at the same rate as new frames are added once a threshold cache size is reached. The threshold cache size can include a storage size between one second to ten seconds of frames.

Another example aspect of the present disclosure is directed to a computer-implemented method for multimodal search prediction. The method can include obtaining, by a computing system including one or more processors, image data. The image data can be descriptive of one or more images. The one or more images can include one or more frames obtained from a live camera feed. The method can include processing, by the computing system, the image data with an object classification model to determine one or more object classifications for one or more objects depicted in the one or more images. The method can include processing, by the computing system, the one or more object classifications to generate a plurality of action suggestions. The plurality of action suggestions can include a multimodal query suggestion and one or more other data processing action suggestions. The multimodal query suggestion can include a suggested text string to provide with at least a portion of the image data to a search engine. The method can include providing, by the computing system, the plurality of action suggestions for display with the live camera feed. The method can include obtaining, by the computing system, a selection of the multimodal query suggestion of the plurality of action suggestions and generating, by the computing system, a multimodal query comprising the suggested text string and at least one of the one or more images or a current frame of the live camera feed. The method can include determining, by the computing system, one or more search results based on the multimodal query.

In some implementations, the one or more other data processing action suggestions can include a digitize action suggestion. The digitize action suggestion can be associated with generating a digital version of a depicted graphic. The method can include obtaining a second selection that selects the digitize action suggestion, generating the digital version of the depicted graphic, and providing the digital version of the depicted graphic for display. Generating the digital version of the depicted graphic can include processing the one or more images with an image segmentation model to generate an image segment that segments the depicted graphic from the one or more images, processing the image segment with an optical character recognition model to extract text from the depicted graphic, processing the image segment with a layout determination model to determine graphical features and structural features of the depicted graphic, and generating the digital version of the depicted graphic based on the text, the graphical features, and the structural features of the depicted graphic.

In some implementations, the one or more other data processing action suggestions can include an application navigation suggestion associated with navigating to a second application based on the one or more objects classifications. The method can include obtaining a second selection that selects the application navigation suggestion and transmitting, with an application programming interface, data associated with the one or more object classifications to the second application.

Another example aspect of the present disclosure is directed to one or more non-transitory computer-readable media that collectively store instructions that, when executed by one or more computing devices, cause the one or more computing devices to perform operations. The operations can include obtaining image data. The image data can be descriptive of one or more images. The one or more images can include one or more frames obtained from a live camera feed. The operations can include processing the image data to generate one or more multimodal query suggestions based on one or more object detections associated with one or more objects depicted within the one or more images. The one or more multimodal query suggestions can include one or more suggested text strings to provide with at least a portion of the image data to a search engine. The operations can include providing the one or more suggested text strings for display with the live camera feed. The operations can include obtaining additional image data. The additional image data can be descriptive of one or more additional images. The one or more additional images can include one or more additional frames occurring after the one or more frames of the one or more images. The operations can include determining the one or more second objects depicted within the one or more additional images differ from the one or more objects depicted within the one or more images. The operations can include processing the additional image data to generate one or more second multimodal query suggestions based on one or more second object detections associated with the one or more second objects depicted within the one or more additional images in response to determining the one or more second objects and the one or more objects differ. The one or more second multimodal query suggestions can include one or more second suggested text strings to provide with at least a portion of the additional image data to the search engine. The operations can include providing the one or more second suggested text strings for display with the live camera feed.

In some implementations, the operations can include obtaining a selection of the one or more second suggested text strings associated with the one or more second multimodal query suggestions, generating a multimodal query comprising the one or more second suggested text strings and at least one of the one or more additional images or a current frame of the live camera feed, and determining one or more search results based on the multimodal query. The operations can include obtaining one or more second images from the live camera feed, determining the one or more second images depict the one or more objects, and continuing to provide the one or more suggested text strings for display with the live camera feed without performing an additional suggestion prediction after providing the one or more suggested text strings for display with the live camera feed and before obtaining the additional image data. In some implementations, the live camera feed can be generated with one or more image sensors of a mobile computing device.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 4A depicts illustrations of example action suggestions according to example embodiments of the present disclosure.

FIG. 4B depicts illustrations of example search action suggestions according to example embodiments of the present disclosure.

FIG. 5A depicts an illustration of example detection-based action suggestions according to example embodiments of the present disclosure.

FIG. 5B depicts an illustration of example detection-based search suggestions according to example embodiments of the present disclosure.

FIG. 6 depicts an illustration of example interface adjustments according to example embodiments of the present disclosure.

FIG. 9A depicts an illustration of example search suggestion states according to example embodiments of the present disclosure.

FIG. 9D depicts an illustration of example search transition according to example embodiments of the present disclosure.

FIGS. 11A-11D depict illustrations of example suggestion interfaces according to example embodiments of the present disclosure.

FIG. 15 depicts an illustration of an example query add-on interface according to example embodiments of the present disclosure.

FIG. 17 depicts an illustration of an example suggestion transition according to example embodiments of the present disclosure.

FIG. 18 depicts an illustration of example action suggestions according to example embodiments of the present disclosure.

FIG. 19 depicts an illustration of example code-based action suggestions according to example embodiments of the present disclosure.

Figure 1:
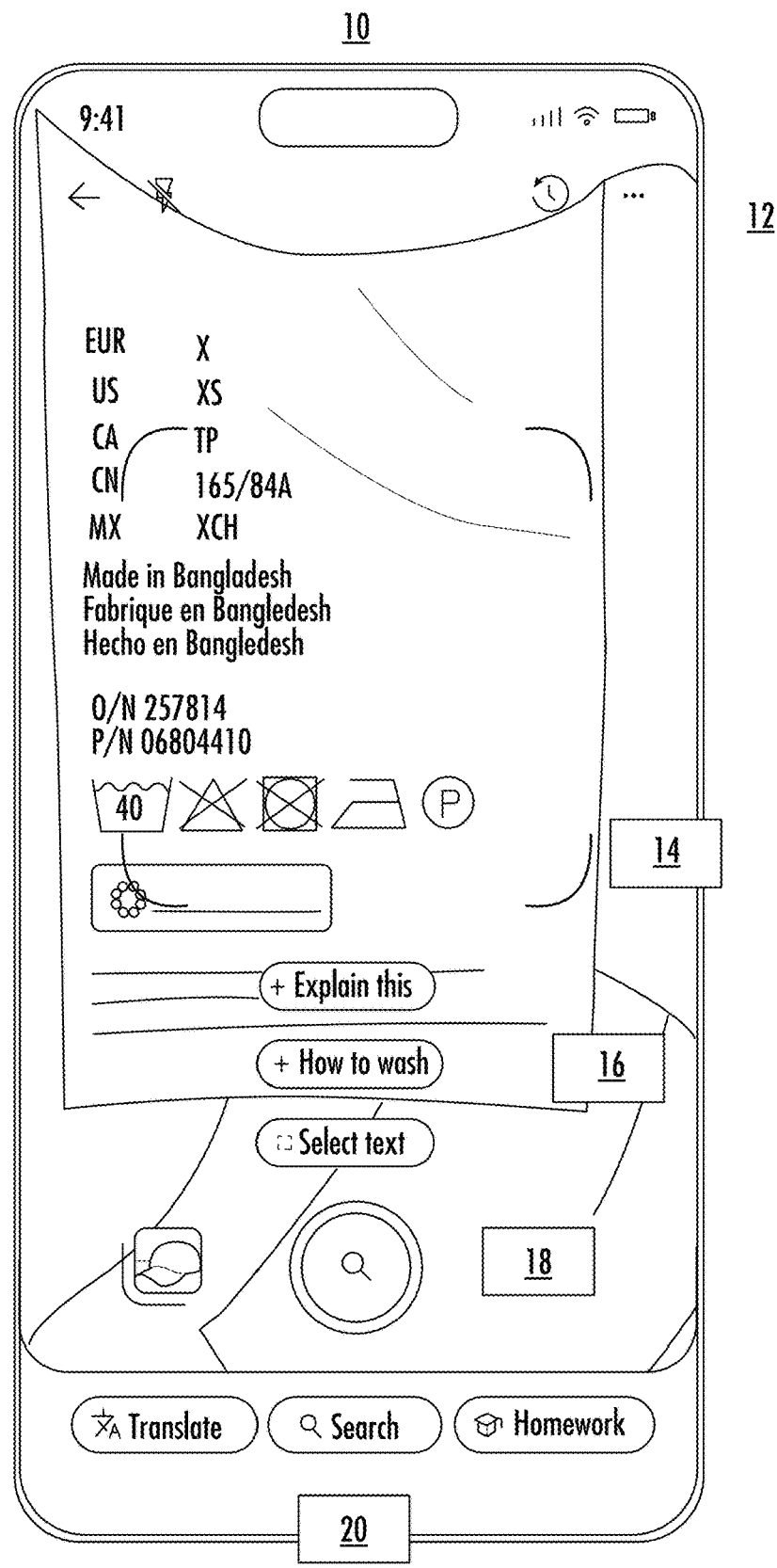
FIG. 1 depicts an illustration of an example multimodal suggestion interface according to example embodiments of the present disclosure.

Reference numerals that are repeated across plural figures are intended to identify the same features in various implementations.

DETAILED DESCRIPTION

Generally, the present disclosure is directed to systems and methods for multimodal query suggestion. In particular, the systems and methods disclosed herein can leverage machine-learned models to detect and classify image features, which can then be processed with a generative language model to generate text queries to provide with the image data to a search engine for performing a multimodal search. For example, a user may be utilizing a viewfinder to capture one or more images for performing a search. However, the user may not know what to ask in order to obtain further information on a particular object within the environment being viewed. Therefore, the systems and methods disclosed herein can provide real-time image processing and text query suggestions that may be selectable to generate a multimodal query.

The text portion of the multimodal query can be generated based on processing the image data of the viewfinder camera feed with an object classification model to determine what objects are depicted in the image data. The object classifications can then be processed with a generative language model (e.g., a large language model) to determine questions and/or prompts that are associated with the object classifications. The suggested text queries can include questions about the object, commands to find listings for the particular object, actions to perform based on the particular object, and/or other queries. The text query suggestions can then be provided with the camera feed of the viewfinder. The text query suggestions can be selectable to generate the multimodal query based on one or more image frames of the camera feed and the selected text query. The generated multimodal query may then be searched.

Multimodal search suggestions can be provided for display in a visual search application of a mobile computing device (e.g., a dedicated application for image-based search) and/or via smart glasses (e.g., augmented-reality, virtual-reality, and/or mixed-reality smart wearables). The multimodal search suggestions can be provided with other data processing action suggestions (e.g., copy text). The multimodal query suggestions and other data processing suggestions can be provided with a camera feed and/or may be updated based on a rolling camera feed.

Text queries alone can fail to provide the detail for determining what object is being asked about, while image queries alone may merely lead to similar image search results. Understanding the world at large can be difficult. Whether an individual is trying to understand what the object in front of them is, trying to determine where else the object can be found, and/or trying to determine where an image on the internet was captured from, text searching alone can be difficult. In particular, users may struggle to determine which words to use. Additionally, the words may not be descriptive enough and/or abundant enough to generate desired results.

The multimodal query suggestion system can leverage machine-learned models, user interface element features, and/or a search engine to provide an interface for users to obtain additional information on features of image data. For example, a preliminary object recognition can be performed on frames from a live camera feed to determine an object currently provided for display. Suggested text for a multimodal query can then be determined based on the detected object. The multimodal query suggestions can be provided for display with the live camera feed and may be updated as new objects are depicted, which can provide an intuitive and predictive interface for directed and detailed search that may be selectable for performing the search.

Multimodal search suggestions within the viewfinder interface can provide for multimodal search suggestions without navigating away from the viewfinder and can be utilized to help users understand the types of questions they can ask about a depicted object. Additionally and/or alternatively, multimodal searching can reduce iterative searches, provide additional context, and/or further narrow a search.

The systems and methods of the present disclosure provide a number of technical effects and benefits. As one example, the system and methods can provide for real-time multimodal query suggestion and display. In particular, the systems and methods can process image data to determine questions users may ask based on the features of the image data and then provide the questions for display with the image data to provide selectable text queries to provide with at least a portion of the image data. The systems and methods can leverage object classification, query prediction, and a search engine to suggest multimodal queries based on the image data then perform a search of a selected multimodal query.

Another technical benefit of the systems and methods of the present disclosure is the ability to leverage augmented-reality and real-time processing to provide suggested text queries and/or other suggested processing actions within a viewfinder of a live camera feed to provide continually updating suggestions to a user for obtaining additional information about an environment. In particular, the systems and methods can provide the query suggestions with a live camera feed and may adjust the suggestions based on newly detected objects and/or pre-existing objects leaving the frame of the camera feed.

Another example of technical effect and benefit relates to improved computational efficiency and improvements in the functioning of a computing system. For example, the systems and methods disclosed herein can leverage feature matching to limit new processing instances to when new objects are detected. For example, if an object has already been classified and had suggested queries determined, then upon determining the object is detected in a subsequent frame, the query suggestions will continue to be provided for display without performing the classification and determination again.

With reference now to the Figures, example embodiments of the present disclosure will be discussed in further detail.

FIG. 1 depicts an illustration of an example multimodal suggestion interface 10 according to example embodiments of the present disclosure. In particular, a user can open a visual search application (and/or viewfinder application) to obtain additional information on objects within the environment. The user may adjust one or more options 12 of the application to adjust lighting, zoom, focus, cache timing, suggestion timing, suggestion location, and/or other preferences.

Image data can be obtained via the application. The image data can include one or more images from the camera feed. The image data can depict one or more objects. The image data can be processed to perform object recognition, optical character recognition, object classification, code recognition, image segmentation, and/or other data processing tasks. For example, one or more images may be processed with an object detection model to detect one or more image features associated with an object and generate one or more bounding boxes. The one or more bounding boxes and the one or more images can then be processed with an object classification model to generate one or more object classifications (e.g., a classification descriptive of determining the object is a clothing tag). Alternatively and/or additionally, the one or more bounding boxes and the one or more images may be processed with a segmentation model to generate an image segment that depicts the one or more objects isolated from other pixels in the one or more images. The one or more image segments may be processed with the object classification model to generate the one or more object classifications.

Additionally and/or alternatively, the one or more images may be processed with an optical character recognition model to generate text data descriptive of textual characters identified in the one or more images. In some implementations, the optical character recognition model may be trained and/or configured to detect symbols (e.g., hazard symbols, laundry instruction symbols, chemical symbols, symbol notations, etc.).

The one or more object classifications and/or the text data may be processed to determine one or more text suggestions 16 to provide for display to provide text suggestions for generating a multimodal query with the depicted image data. The text suggestion determination may be performed by a machine-learned action suggestion model, which may be trained on and/or learn a knowledge graph. In some implementations, the determinations may be determined based on a user search log and/or a global search log. The one or more text suggestions 16 may include search suggestions and/or action suggestions (e.g., select text, digitize, summarize, etc.). In some implementations, a plurality of objects may be detected and classified. The suggestion determination may prioritize the objects within the focal region 14.

The one or more text suggestions 16 may include text queries predicted to be associated with a potential intent of the visual query. The user may select the image capture user interface element 18 to capture an image to be utilized for the visual query. Alternatively and/or additionally, the user may select an image from a camera roll and/or image gallery that can then be processed to perform the multimodal query suggestion.

A user may select a particular suggestion of the one or more text suggestions 16. A multimodal query can then be generated that includes the text of the selected text suggestion and one or more images associated with one or more displayed frames during text suggestion selection. For example, an image may be captured when the user selects the "How to wash" suggestion. A multimodal query with the "How to wash" text string and the image of the tag can be generated and then processed to determine one or more search results that identify how to wash that particular clothing item based at least in part on a visual search with the image.

Alternatively and/or additionally, detected symbols may be segmented and then processed to perform character classification and/or image search based on the symbols.

The multimodal suggestion interface 10 may include one or more additional image processing options 20 outside of visual search. The one or more additional image processing options 20 may include translating text depicted in the images and/or providing help with problems depicted in the one or more images.

Figure 2:
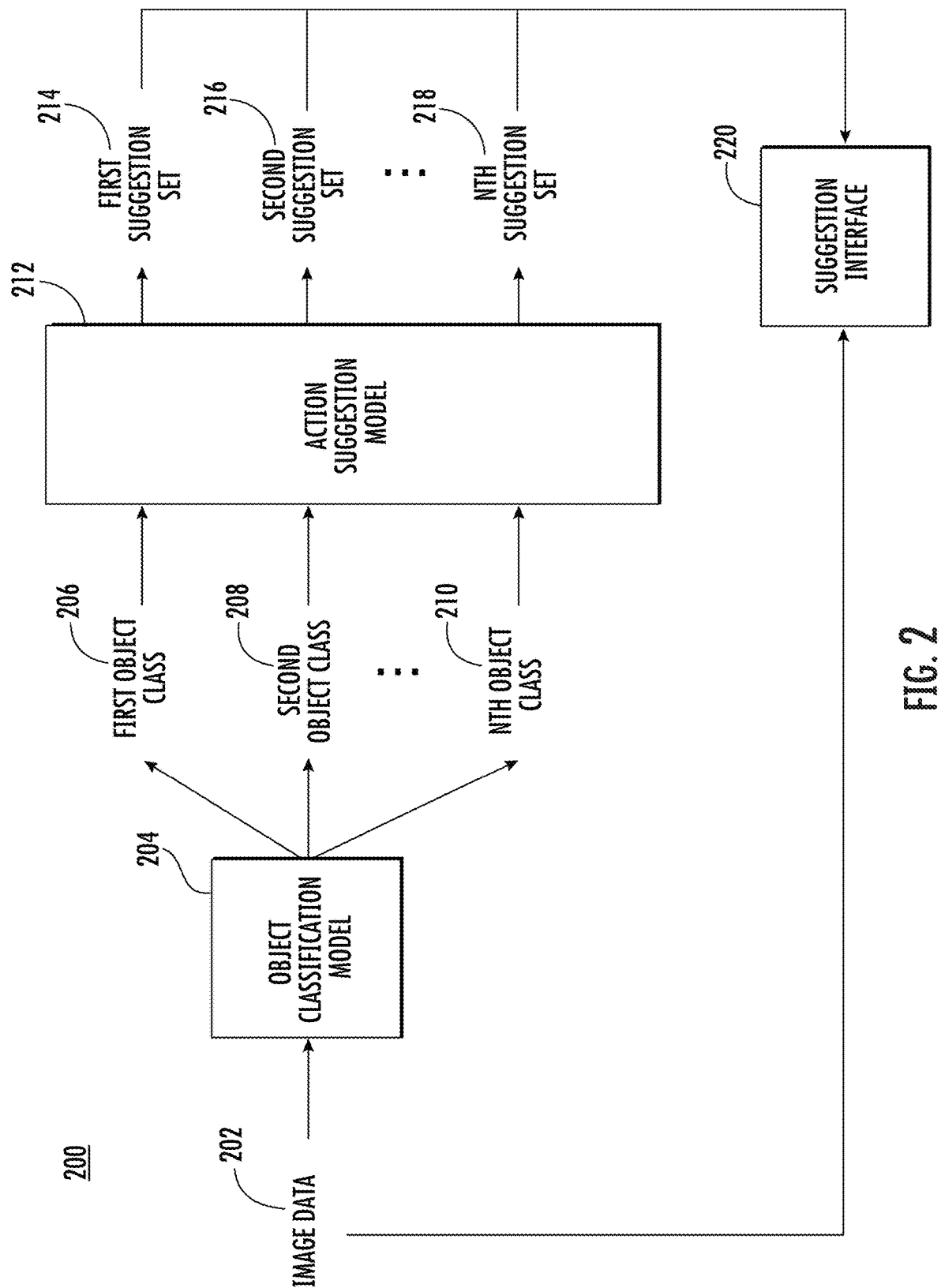
FIG. 2 depicts a block diagram of an example multimodal query suggestion system according to example embodiments of the present disclosure.

FIG. 2 depicts a block diagram of an example multimodal query suggestion system 200 according to example embodiments of the present disclosure. In particular, the multimodal query suggestion system 200 can obtain image data 202, determine one or more suggestions, and generate a suggestion interface 220, which may include an augmented-reality interface that includes suggestions for multimodal query generation.

For example, the multimodal query suggestion system 200 can obtain image data 202. The image data 202 may depict one or more objects. The image data 202 may be obtained from one or more image sensors. In some implementations, the image data 202 may include one or more frames of a live camera feed. The image data 202 may be processed on a rolling basis. In some implementations, the image data 202 may be obtained from a temporary cache that is updated on a rolling basis, which may include deleting older images when newer images are received.

An object classification model 204 may process the image data 202 to generate a plurality of object classifications descriptive of classifications for a plurality of detected objects within the one or more images of the image data 202. In particular, the plurality of object classifications may include a first object class 206 associated with a first object, a second object class 208 associated with a second object, and/or an nth object class 210 associated with an nth object. The object classifications may be descriptive of a particular object instance (e.g., a particular model, year, and type of a depicted product or a particular dog breed) and/or an object type (e.g., a general object type classification (e.g., ball instead of a 2021 Brand X basketball)).

The plurality of classifications can be processed with an action suggestion model 212 to generate a plurality of action suggestion sets associated with the plurality of detected objects. The plurality of action suggestion sets can include a first suggestion set 214 determined based on the first object class 206, a second suggestion set 216 determined based on the second object class 208, and/or an nth suggestion set 218 determined based on the nth object class 210.

The action suggestion model 212 can include a machine-learned model trained and/or tuned for multimodal query suggestion. The action suggestion model 212 may communicate with and/or be tuned on one or more knowledge graphs. In some implementations, the action suggestion model 212 may be trained and/or tuned on search log data.

The plurality of action suggestion sets can include suggested text queries to provide with the depicted image in order to generate a multimodal query. Alternatively and/or additionally, the plurality of action suggestions sets can include a mix of query suggestions and other data processing action suggestions (e.g., read depicted code to perform web navigation, location check-in, WiFi registration, and/or other tasks).

The plurality of action suggestion sets and the image data 202 can then be utilized to generate a suggestion interface 220. The suggestion interface 220 can include the one or more images of the image data augmented to depict at least a subset of one or more of the plurality of action suggestion sets. The suggestion interface 220 may include a live camera feed that depicts action suggestions overlaid over the camera feed. The suggestions may be updated as different objects enter the focal point of the camera feed and/or when objects move in and/or out of the camera view.

The depicted action suggestions in the suggestion interface 220 may include action suggestions from a particular action suggestion set of the plurality of action suggestion sets and/or may include a mix from different action suggestion sets. In some implementations, the action suggestions may be updated based on a threshold time of display being met for the suggestion and/or a particular object. For example, suggestions that are displayed for a threshold amount of time without selection may be replaced with an updated and/or other suggestion.

Figure 3:
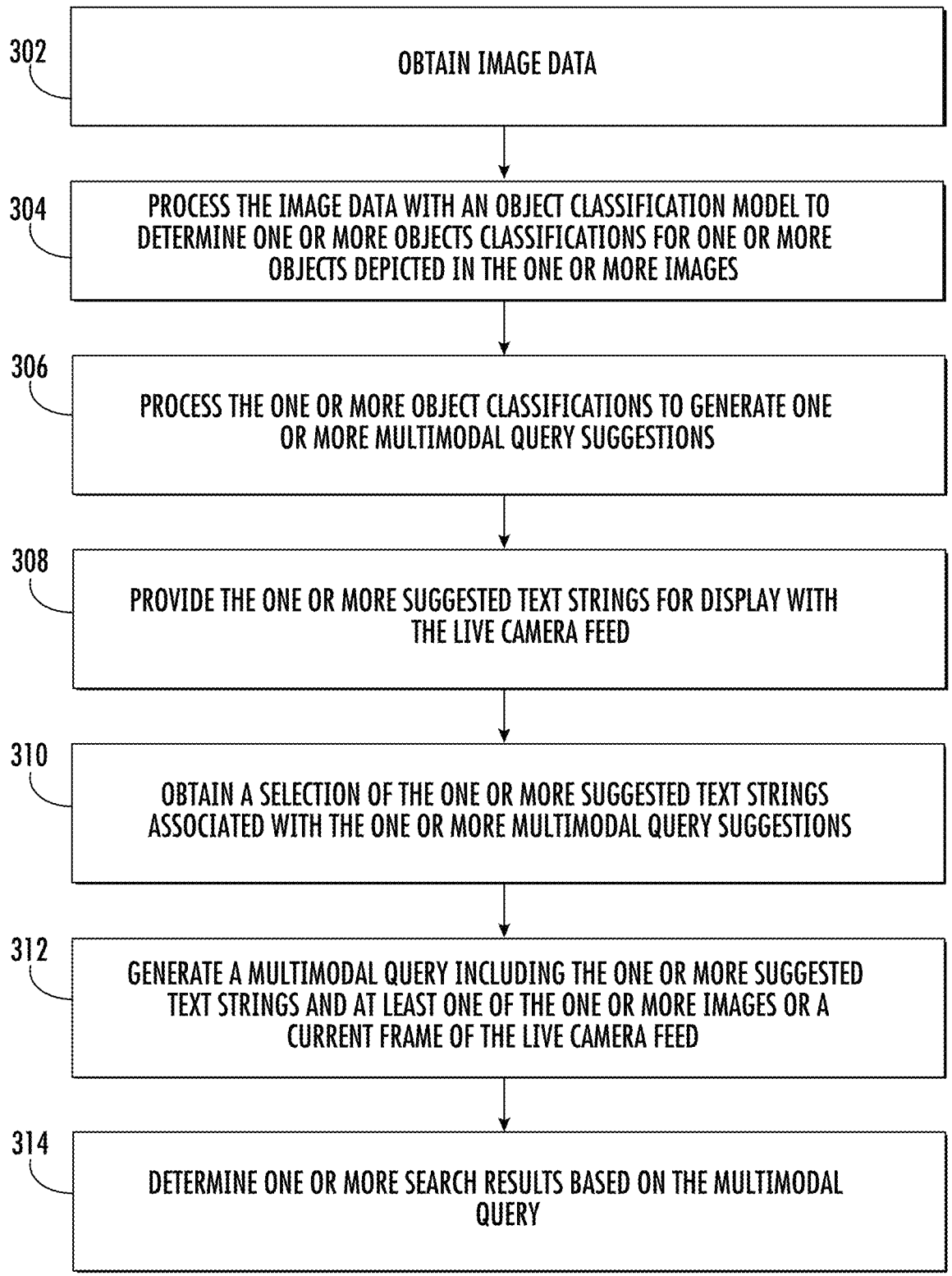
FIG. 3 depicts a flow chart diagram of an example method to perform multimodal query suggestion according to example embodiments of the present disclosure.

FIG. 3 depicts a flow chart diagram of an example method to perform according to example embodiments of the present disclosure. Although FIG. 3 depicts steps performed in a particular order for purposes of illustration and discussion, the methods of the present disclosure are not limited to the particularly illustrated order or arrangement. The various steps of the method 300 can be omitted, rearranged, combined, and/or adapted in various ways without deviating from the scope of the present disclosure.

At 302, a computing system can obtain image data. The image data can be descriptive of one or more images. The one or more images can include one or more frames obtained from a live camera feed. The one or more images may depict one or more objects within an environment. The image data may be generated with one or more image sensors of a user computing device. The live camera feed can be generated with the mobile computing device. Alternatively and/or additionally, the image data may be generated via an image capture feature of a browser application and/or an operating system.

In some implementations, obtaining image data can include obtaining the one or more images from a temporary cache. The temporary cache can temporarily store frames from the live camera feed. The frames of the temporary cache can be deleted from the temporary cache when a threshold time from capture is reached. In some implementations, the temporary cache can be updated on a rolling basis to delete frames at the same rate as new frames are added once a threshold cache size is reached. The threshold cache size can include a storage size between one second to ten seconds of frames.

At 304, the computing system can process the image data with an object classification model to determine one or more object classifications for one or more objects depicted in the one or more images. The object classification model can include a machine-learned model that may include a plurality of classifier heads. Alternatively and/or additionally, the object classification model can detect an object within an image, segment the object from the image, perform an image search based on the segmented portion of the image, determine search results based on the search, and determine one or more object classifications based on processing the content of and/or the metadata of the search results. The one or more object classifications may be generated based on a generative model (e.g., a large language model and/or a vision language model) processing the content of and/or the metadata of the search results.

At 306, the computing system can process the one or more object classifications to generate one or more multimodal query suggestions. The one or more multimodal query suggestions can include one or more suggested text strings to provide with at least a portion of the image data to a search engine. The portion of the image data of the multimodal query suggestions may include the live camera feed, a region of the live camera feed, one or more images of the image data, one or more regions of the one or more images of the image data, a segmented portion of the one or more images, and/or other image data. Processing the one or more object classifications to generate the one or more multimodal query suggestions can include determining one or more textual queries associated with one or more object types associated with the one or more object classifications. In some implementations, the one or more textual queries can be determined based on one or more knowledge graphs. The one or more textual queries can be determined based on a user-specific search history for a user associated with a mobile computing device. The one or more textual queries may be generated by determining frequently searched queries associated with an object of the one or more object classifications. Alternatively and/or additionally, the one or more textual queries may be generated by processing one or more textual labels associated with the one or more classifications with a generative model (e.g., a large language model) to generate the one or more text strings of the one or more textual queries.

At 308, the computing system can provide the one or more suggested text strings for display with the live camera feed. The one or more suggested text strings can be provided for display overlaid over the live camera feed. The one or more suggested text strings can be provided as a selectable list that can be updated as different objects are depicted and/or the one or more original objects move out of the viewfinder of the live camera feed.

In some implementations, providing the one or more suggested text strings for display with the live camera feed can include providing the one or more suggested text strings overlayed over the live camera feed. The computing system can provide the one or more search results for display in a search results interface provided below the live camera feed.

At 310, the computing system can obtain a selection of the one or more suggested text strings associated with the one or more multimodal query suggestions. The selection may be performed based on a touch input, a voice command, gaze detection, and/or other inputs. The selection may be obtained based on a tap on a touchscreen proximate to the position of the one or more suggested text strings within the user interface.

At 312, the computing system can generate a multimodal query including the one or more suggested text strings and at least one of the one or more images or a current frame of the live camera feed. The multimodal query can include an image capture of a frame of the live camera feed that was displayed at or proximate to the time of the selection.

In some implementations, generating the multimodal query can include processing at least one of the one or more images or the current frame of the live camera feed with an image segmentation model to generate an image segment that comprises a frame region that depicts the one or more objects and providing the image segment and the one or more suggested text strings to the search engine.

At 314, the computing system can determine one or more search results based on the multimodal query. The one or more search results can be determined by generating a multimodal embedding and performing a nearest neighbor search. Alternatively and/or additionally, the image portion of the multimodal query may be processed with a search engine to determine a plurality of candidate search results. The plurality of candidate search results can then be filtered based on the one or more suggested text strings.

In some implementations, determining the one or more search results based on the multimodal query can include processing the multimodal query with an embedding model to generate a multimodal query embedding and determining, based on the multimodal query embedding, one or more nearest neighbor embeddings associated with one or more web resources to provide as the one or more search results.

FIG. 4A depicts illustrations of example action suggestions according to example embodiments of the present disclosure. In particular, the first example 410 and the second example 420 depict different action suggestions 404 based on the different image features in the viewfinder 402. For example, the first example 410 depicts a graph with a description. The respective action suggestions 404 are then determined based on the graph and the other detected content. The action suggestions 404 for the first example 410 can include "average rate of cost decrease" based on the graph, an "explain this" prompt or query, and/or select text action.

The second example 420 can depict a calendar with scheduled events and graphics. The respective action suggestions 404 can then be determined based on the calendar and the other detected content. The action suggestions 404 for the second example 420 can include "digitize this" with one or more data processing tools on device, a "summarize this" prompt, and/or select text action.

FIG. 4B depicts illustrations of example search action suggestions according to example embodiments of the present disclosure. In particular, the third example 430 and the fourth example 440 depict different search action suggestions 404 based on the different image features in the viewfinder 402. For example, the third example 430 can depict a paper with rewards program details. The respective action suggestions 404 can then be determined based on the depicted text and graphics. The action suggestions 404 for the third example 430 can include "Store X return policy", a "summarize this" prompt, and/or select text action.

The fourth example 440 can depict a plant. The respective action suggestions 404 can then be determined based on the depicted plant. The action suggestions 404 for the third example 420 can include "browning leaves" text query suggestion, a "care instructions" text query suggestion, and/or "watering instructions" text query suggestion.

FIG. 5A depicts an illustration of example detection-based action suggestions according to example embodiments of the present disclosure. In particular, in the QR code example 510, the system can detect QR code, which can then be processed to determine an action associated with the QR code along with one or more additional suggestions associated with the content of the action. In the tracking code example 520, the system can detect a tracking code, which can then be processed to determine a package tracking landing page associated with the tracking code along with one or more additional suggestions determined based on the other image features within the image.

FIG. 5B depicts an illustration of example detection-based search suggestions according to example embodiments of the present disclosure. In particular, in the second QR code example 530, the system can detect QR code, which can then be processed to determine an action associated with the QR code along with one or more additional suggestions determined based on other image features within the image. In the barcode example 540, the system can detect a barcode, which can then be processed to determine the product associated with the barcode along with one or more additional suggestions determined based on the determined product.

FIG. 6 depicts an illustration of example interface adjustments according to example embodiments of the present disclosure. In particular, the interface can begin with an initial state 610 that includes a shutter button for capturing an image, an image gallery selection to select an image from an image album, data processing options, and a viewfinder window. Once one or more image features and/or objects are detected, action suggestions (e.g., query suggestions) may be determined. The interface can then transition from an initial state 610 to a suggestion state 620. The suggestion state 620 may include a reduced reticle size 602 and a reduced shutter button size 606. Additionally and/or alternatively, the guidance text from the initial state 610 may be replaced with action suggestions 604.

Figure 7:
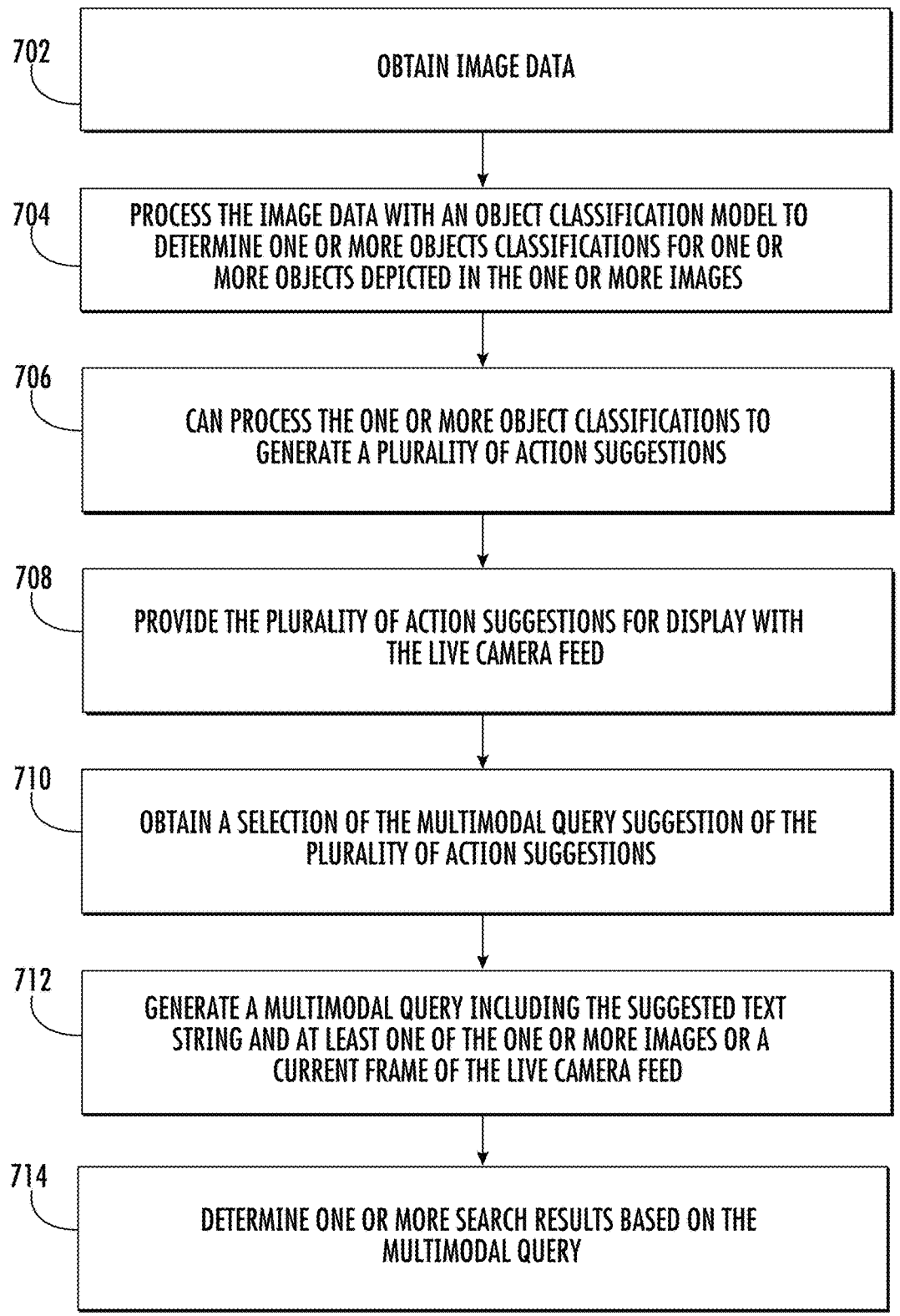
FIG. 7 depicts a flow chart diagram of an example method to perform query prediction according to example embodiments of the present disclosure.

FIG. 7 depicts a flow chart diagram of an example method to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can obtain image data. The image data can be descriptive of one or more images. The one or more images can include one or more frames obtained from a live camera feed. The image data can be updated as additional images are obtained. The image data may include image frames and/or video segments of a video being provided for display by a user computing device. Alternatively and/or additionally, the image data may include video clips from the live camera feed.

At 704, the computing system can process the image data with an object classification model to determine one or more object classifications for one or more objects depicted in the one or more images. The object classification model may output an object classification for each object within the one or more images. In some implementations, the computing system can determine a repeat object within the one or more images. The computing system can then limit the object classification model processing to a single instance of the repeat object. In some implementations, the computing system may limit the object classification model to only processing image segments of repeat objects within a set of images of the image data.

At 706, the computing system can process the one or more object classifications to generate a plurality of action suggestions. The plurality of action suggestions can include a multimodal query suggestion and one or more other data processing action suggestions. The multimodal query suggestion can include a suggested text string to provide with at least a portion of the image data to a search engine. In some implementations, the one or more other data processing action suggestions can include a digitize action suggestion. The digitize action suggestion can be associated with generating a digital version of a depicted graphic.

At 708, the computing system can provide the plurality of action suggestions for display with the live camera feed. The plurality of action suggestions may be provided for display overlayed over the live camera feed. The plurality of action suggestions may be provided with text descriptive of the suggested action along with an icon descriptive of the suggested action.

At 710, the computing system can obtain a selection of the multimodal query suggestion of the plurality of action suggestions. The selection may be performed via a gesture input and/or a tap input. The selection may be obtained via the user interface.

At 712, the computing system can generate a multimodal query including the suggested text string and at least one of the one or more images or a current frame of the live camera feed. The multimodal query may include a suggested text string associated with the selected action suggestion. The action suggestion may be a search suggestion. The action suggestion may include a certain type of search (e.g., a product search (e.g., a marketplace in which the depicted object can be purchased), a recipe search (e.g., how to make the particular object that is depicted), a diagnosis search (e.g., what is wrong with the depicted object?), etc.).

At 714, the computing system can determine one or more search results based on the multimodal query. The one or more search results may be determined by processing the multimodal search query with one or more search engines. The one or more search results may be determined by searching one or more particular databases associated with the selected action suggestion.

In some implementations, the one or more other data processing action suggestions can include a digitize action suggestion. The digitize action suggestion can be associated with generating a digital version of a depicted graphic. In some implementations, the computing system can obtain a second selection that selects the digitize action suggestion, generate the digital version of the depicted graphic, and provide the digital version of the depicted graphic for display.

In some implementations, generating the digital version of the depicted graphic can include processing the one or more images with an image segmentation model to generate an image segment that segments the depicted graphic from the one or more images, processing the image segment with an optical character recognition model to extract text from the depicted graphic, processing the image segment with a layout determination model to determine graphical features and structural features of the depicted graphic, and generating the digital version of the depicted graphic based on the text, the graphical features, and the structural features of the depicted graphic.

Alternatively and/or additionally, the one or more other data processing action suggestions can include an application navigation suggestion associated with navigating to a second application based on the one or more objects classifications. The computing system can obtain a second selection that selects the application navigation suggestion and transmit, with an application programming interface, data associated with the one or more object classifications to the second application.

Figure 8:
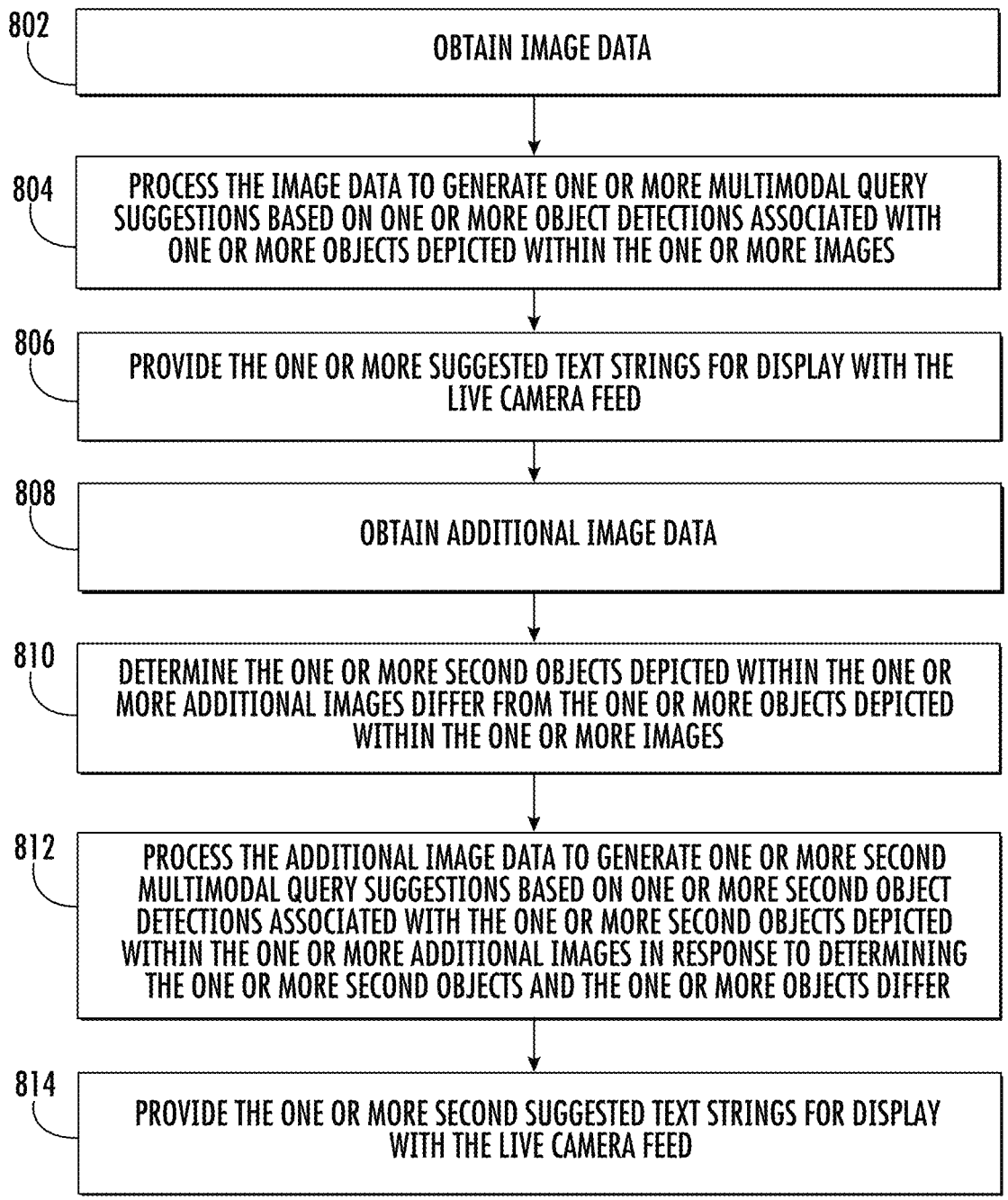
FIG. 8 depicts a flow chart diagram of an example method to perform state change determination according to example embodiments of the present disclosure.

FIG. 8 depicts a flow chart diagram of an example method to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can obtain image data. The image data can be descriptive of one or more images. The one or more images can include one or more frames obtained from a live camera feed. In some implementations, the live camera feed can be generated with one or more image sensors of a mobile computing device. The live camera feed can be provided via a dedicated application and/or by the operating system of the user computing device.

At 804, the computing system can process the image data to generate one or more multimodal query suggestions based on one or more object detections associated with one or more objects depicted within the one or more images. The one or more multimodal query suggestions can include one or more suggested text strings to provide with at least a portion of the image data to a search engine.

At 806, the computing system can provide the one or more suggested text strings for display with the live camera feed. The one or more suggested text strings may be provided as a list in a dedicated panel of the user interface. Alternatively and/or additionally, the one or more suggested text strings are provided for display with anchoring to respective image features associated with the respective multimodal query.

In some implementations, the computing system can obtain one or more second images from the live camera feed, determine the one or more second images depict the one or more objects, and continue to provide the one or more suggested text strings for display with the live camera feed without performing an additional suggestion prediction. The one or more second images can be obtained after providing the one or more suggested text strings for display with the live camera feed and before obtaining the additional image data.

At 808, the computing system can obtain additional image data. The additional image data can be descriptive of one or more additional images. The one or more additional images can include one or more additional frames occurring after the one or more frames of the one or more images. The one or more additional images can be subsequent frames that follow the frames associated with the one or more first images of the image data.

At 810, the computing system can determine the one or more second objects depicted within the one or more additional images differ from the one or more objects depicted within the one or more images. For example, the computing system can determine the one or more second objects were not depicted in the one or more images of the image data.

At 812, the computing system can process the additional image data to generate one or more second multimodal query suggestions based on one or more second object detections associated with the one or more second objects depicted within the one or more additional images in response to determining the one or more second objects and the one or more objects differ. The one or more second multimodal query suggestions can include one or more second suggested text strings to provide with at least a portion of the additional image data to the search engine.

At 814, the computing system can provide the one or more second suggested text strings for display with the live camera feed. The one or more second suggested text strings can be provided for display overlaid over the live camera feed. The one or more second suggested text strings can be provided as a selectable list that can be updated as different objects are depicted and/or the one or more objects move out of the viewfinder of the live camera feed.

In some implementations, the computing system can obtain a selection of the one or more second suggested text strings associated with the one or more second multimodal query suggestions, generate a multimodal query comprising the one or more second suggested text strings and at least one of the one or more additional images or a current frame of the live camera feed, and determine one or more search results based on the multimodal query.

FIGS. 9A-9D depict a sequence of interface transitions for the visual search interface as different objects come into frame and/or different selections are received.

FIG. 9A depicts an illustration of example search suggestion states according to example embodiments of the present disclosure. At 902, the visual search interface can be initiated, and a viewfinder may be provided for display with one or more user interface elements (e.g., a selectable shutter icon, selectable chips, selectable tiles, dropdown menus, sliders, etc.).

At 904, a first object (e.g., a book) may be detected and classified. Based on the classification (e.g., the classification of the particular title and author of the book), a plurality of first suggestions can be determined and displayed. The plurality of first suggestions can be rendered over the camera feed.

Figure 9B:
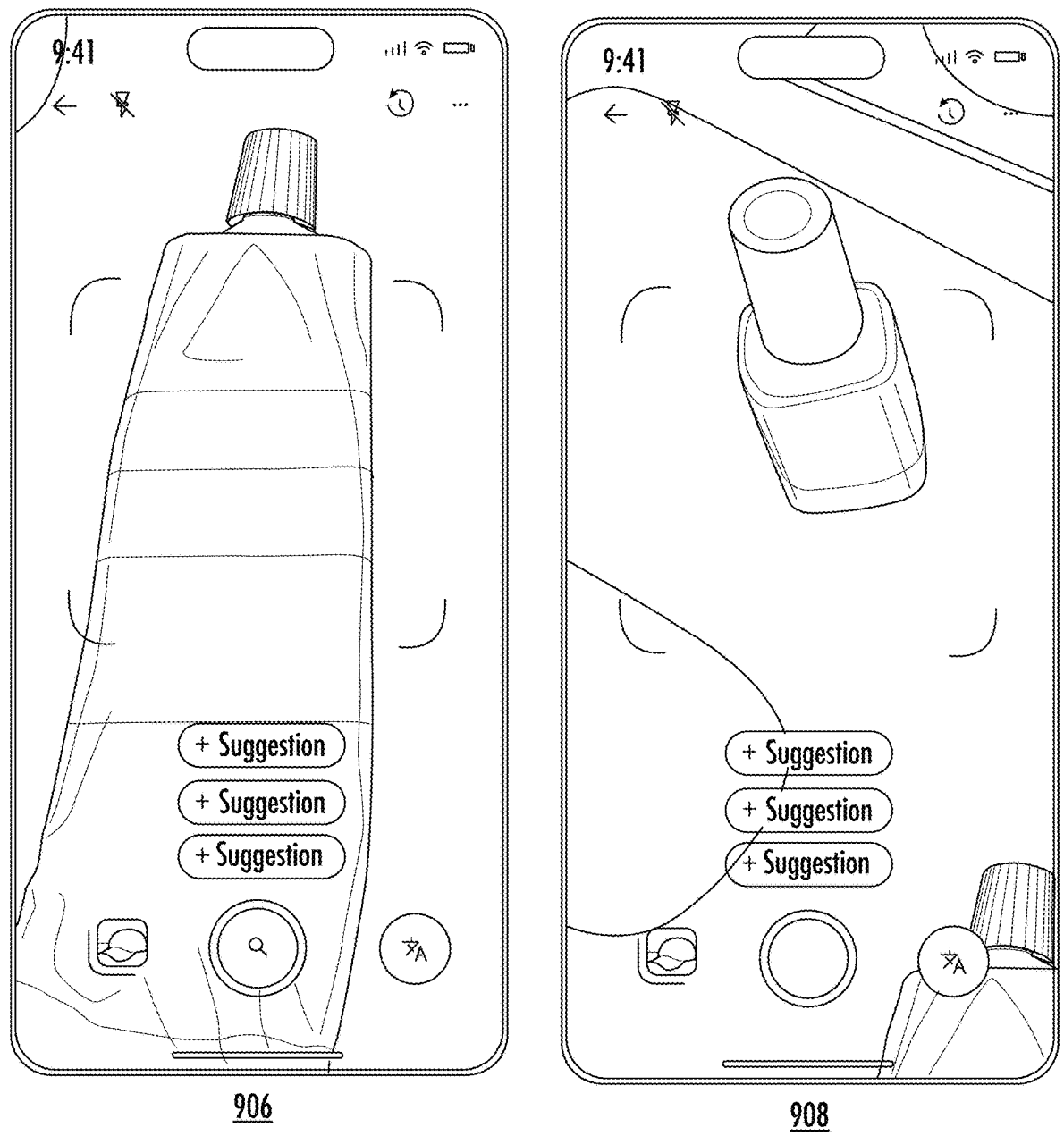
FIG. 9B depicts an illustration of example object detection-based suggestions according to example embodiments of the present disclosure.

FIG. 9B depicts an illustration of example object detection-based suggestions according to example embodiments of the present disclosure. At 906, a second object (e.g., a tube of body balm) may be detected and classified. Based on the classification (e.g., the classification of the particular brand and type of body balm), a plurality of second suggestions can be determined and displayed. The plurality of second suggestions can be rendered over the camera feed in place of the plurality of first suggestions.

At 908, a third object (e.g., a glass of nail polish) may be detected and classified. Based on the classification (e.g., the classification of the particular brand and color of the nail polish), a plurality of third suggestions can be determined and displayed. The plurality of third suggestions can be rendered over the camera feed in place of the plurality of second suggestions.

The interface can continue to update as different objects are detected and/or classified.

Figure 9C:
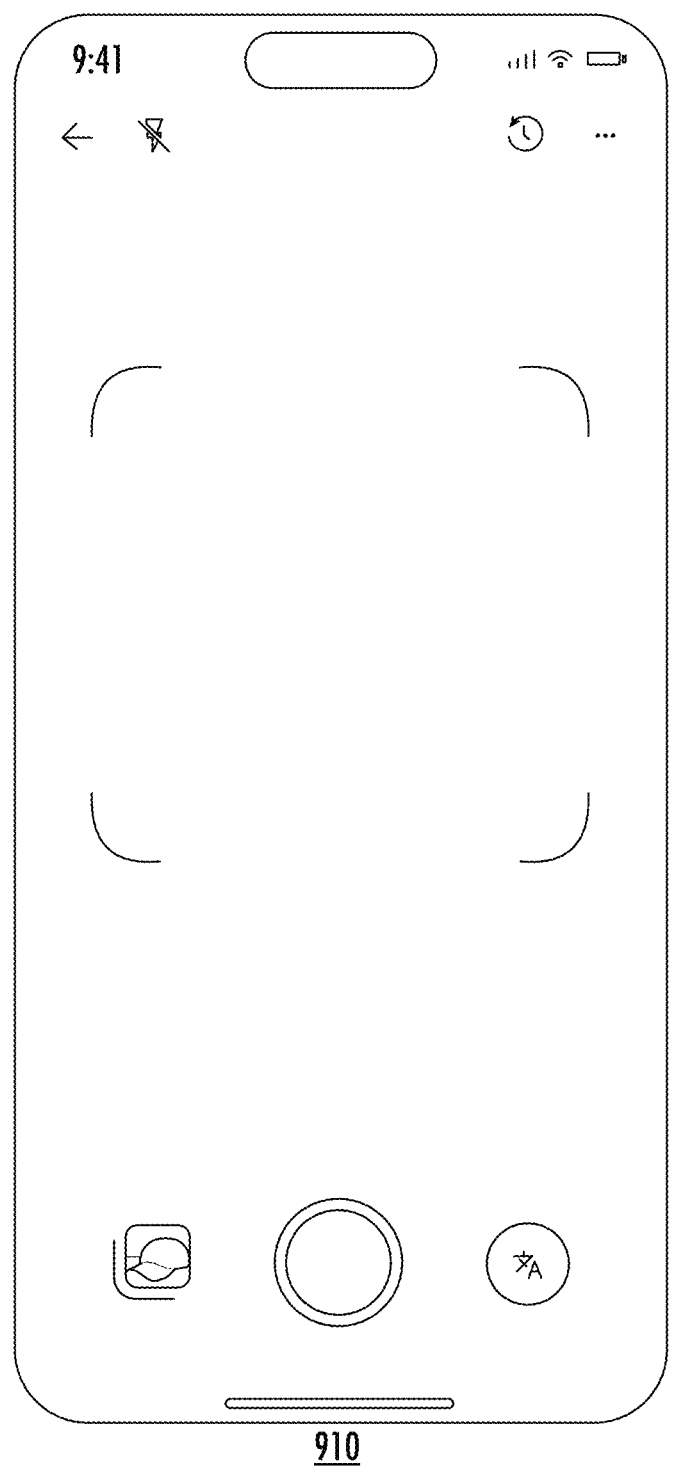
FIG. 9C depicts an illustration of an example suggestion clearing according to example embodiments of the present disclosure.

FIG. 9C depicts an illustration of an example suggestion clearing according to example embodiments of the present disclosure. For example, at 910, no object may be detected, which may cause the plurality of third suggestions to be removed. The suggestions area may be cleared until an object (or other image feature) is detected.

FIG. 9D depicts an illustration of example search transition according to example embodiments of the present disclosure. For example, at 912, a user may select a particular search suggestion displayed based on the book classification. From 912 to 914, the image and suggestion tiles may be moved as the multimodal query is generated and searched. Once the search results are determined, at least a subset of the search results may be processed with a generative language model to generate a model-generated response to the multimodal query.

At 916, the multimodal query, the model-generated response, and/or one or more search results may be provided for display. The multimodal query may be provided for display in a query input box. The model-generated response may be generated with an autoregressive language model and may be depicted in a particular panel of the search results interface. The one or more search results may be provided below the model-generated response.

Figure 10A:
FIG. 10A depicts an illustration of example interface states according to example embodiments of the present disclosure.

FIG. 10A depicts an illustration of example interface states according to example embodiments of the present disclosure. For example, at 1010, a search state can be depicted for capturing an image for a visual search. At 1020, a recognized action state can be depicted upon detecting the QR code, which can include a selectable action tile for performing the action associated with the QR code. At 1030, a translate state can be depicted for translating detected text. At 1040, a voice input state can be depicted for recording audio to obtain a voice input. The states of FIG. 10A can include state specific user interface elements (e.g., a shutter element, a translate invoke element, and/or a hold to record element). The states of FIG. 10A can include a bottom panel for switching between interface states (e.g., switching between visual search state and a translate state).

Figure 10B:
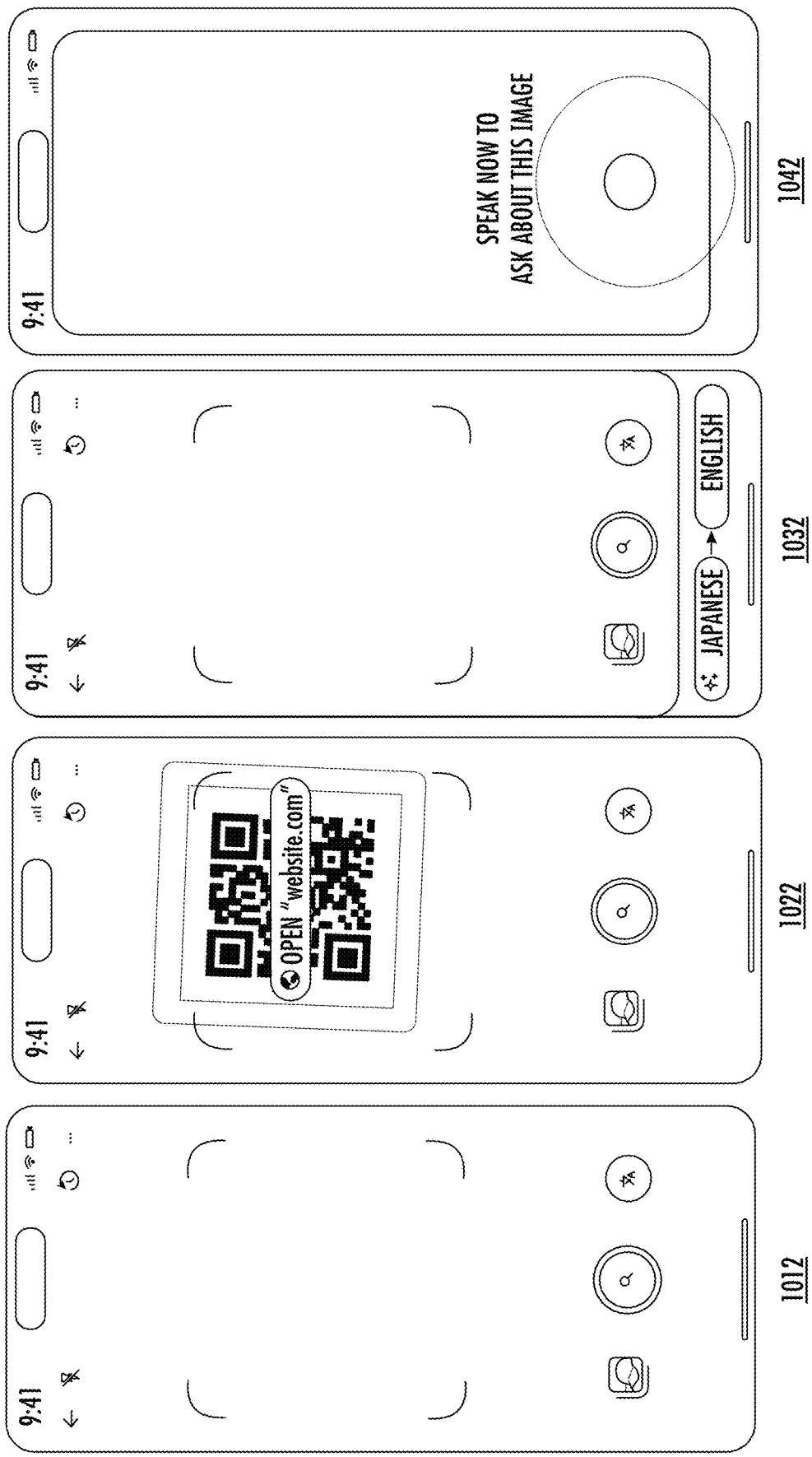
FIG. 10B depicts an illustration of example alternative interface states according to example embodiments of the present disclosure.

FIG. 10B depicts an illustration of example alternative interface states according to example embodiments of the present disclosure. For example, at 1012, a search state can be depicted for capturing an image for a visual search. At 1022, a recognized action state can be depicted upon detecting the QR code, which can include a selectable action tile for performing the action associated with the QR code. At 1032, a translate state can be depicted for translating detected text. At 1042, a voice input state can be depicted for recording audio to obtain a voice input. The states of FIG. 10B can include state specific user interface elements (e.g., a shutter element, a translate invoke element, and/or a hold to record element). The states of FIG. 10B may include different interface configurations than the states of FIG. 10A (e.g., the bottom panel may be removed or replaced).

Figure 10C:
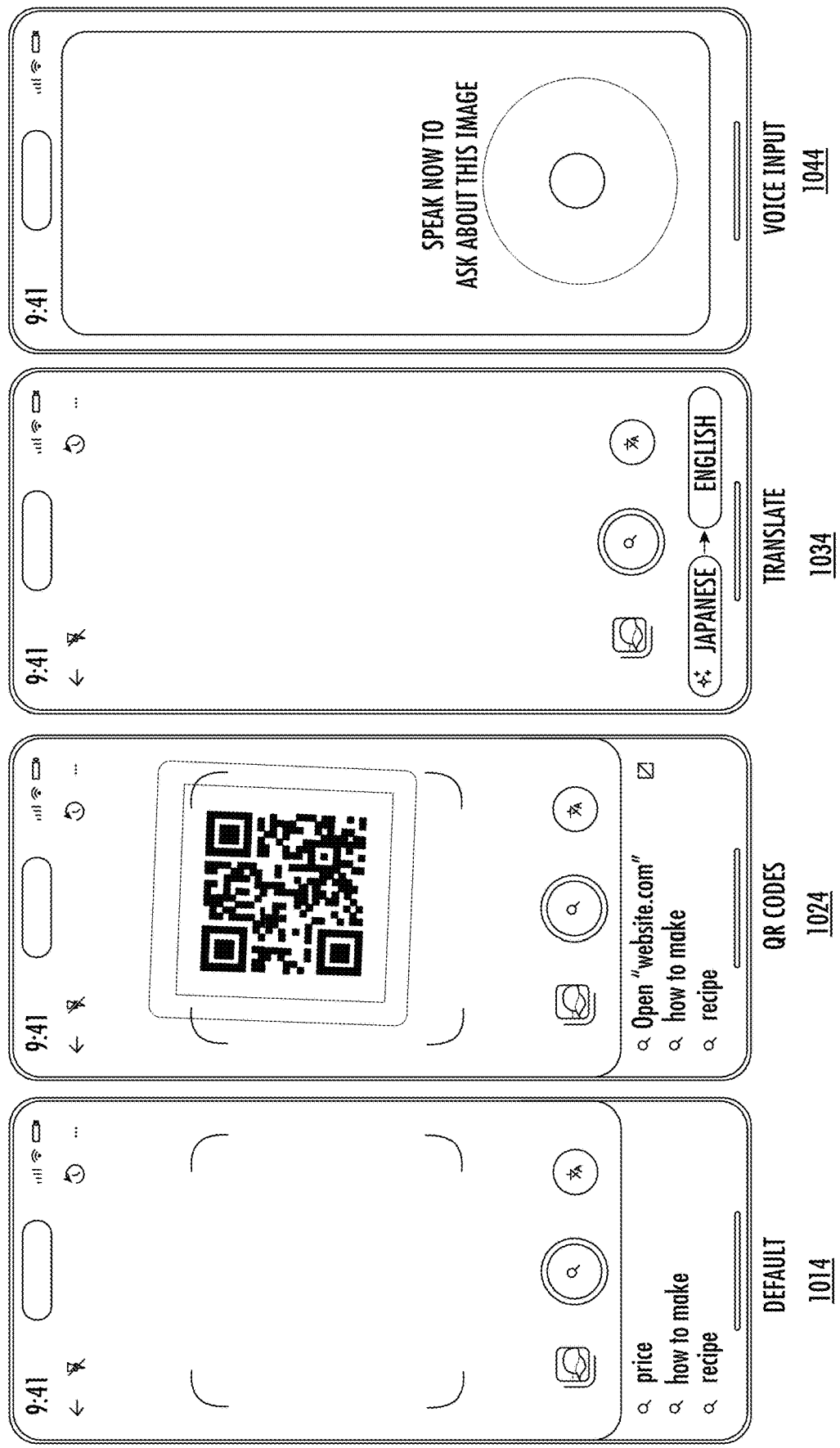
FIG. 10C depicts an illustration of example suggestion interface states according to example embodiments of the present disclosure.
Figure 11A:
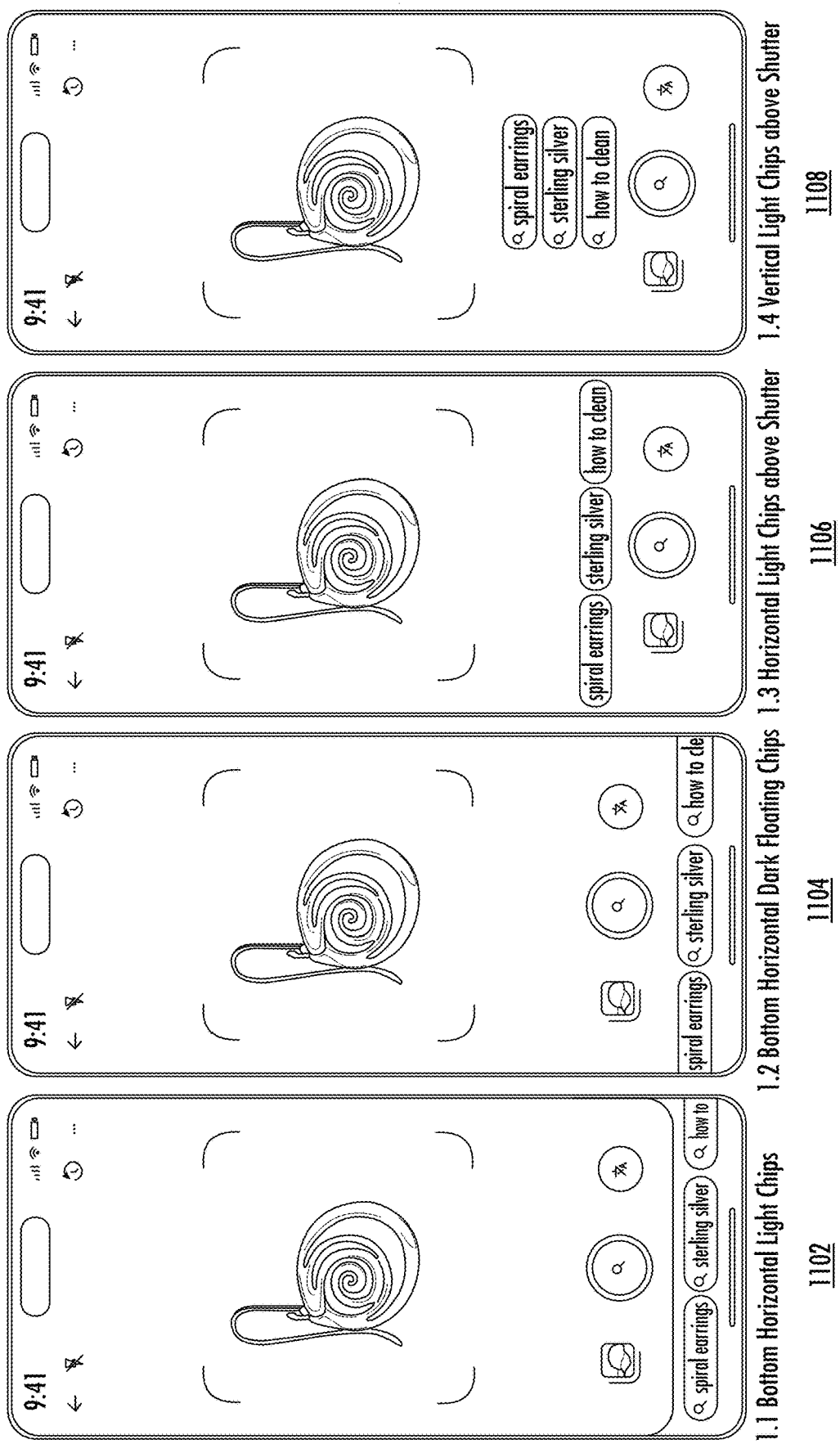
Figure 11C:
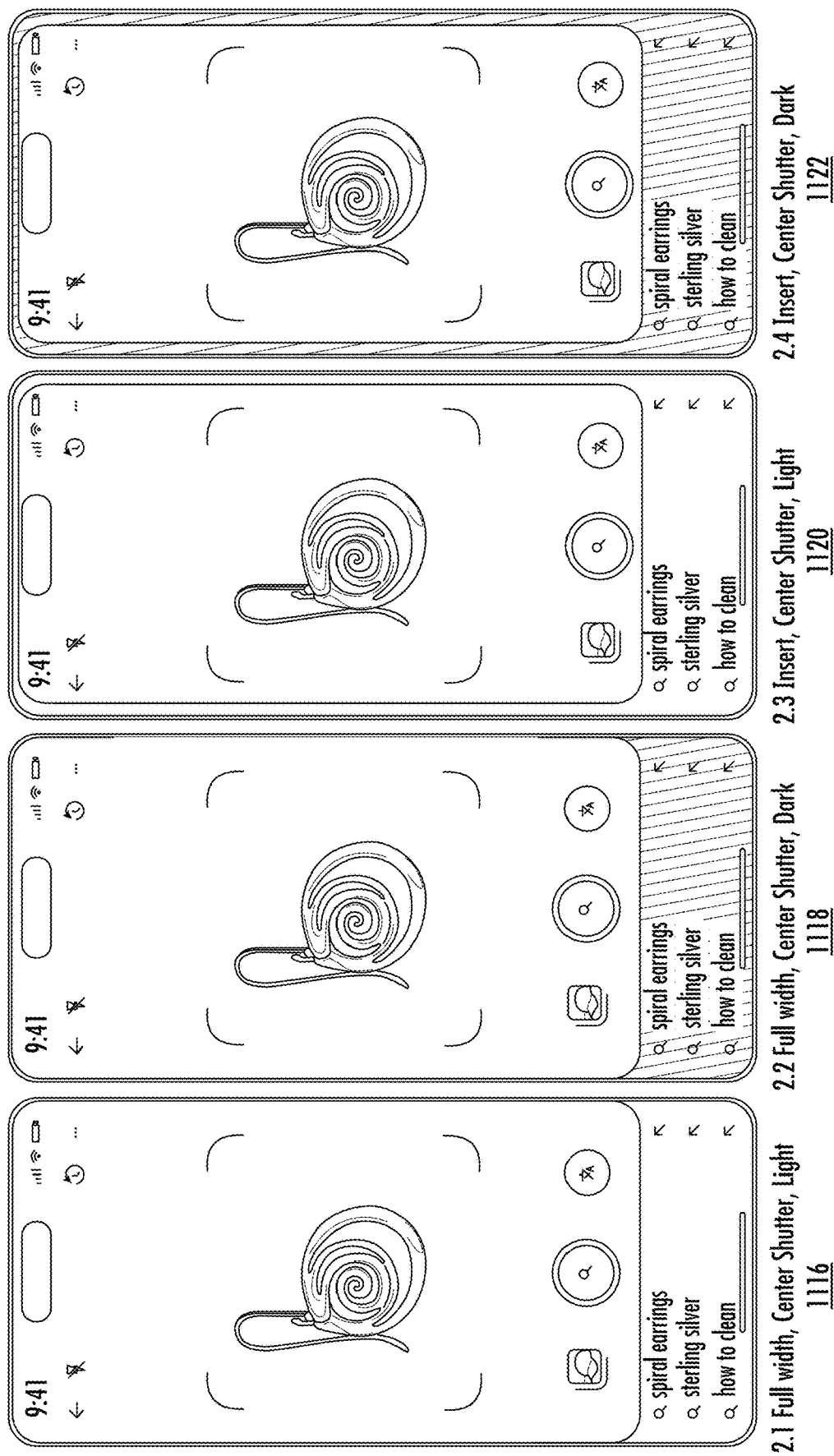

FIG. 10C depicts an illustration of example suggestion interface states according to example embodiments of the present disclosure. For example, at 1014, a search state (and/or default search state) can be depicted for capturing an image for a visual search. At 1024, a recognized action state can be depicted upon detecting the QR code, which can include a selectable action tile for performing the action associated with the QR code. At 1034, a translate state can be depicted for translating detected text. At 1044, a voice input state can be depicted for recording audio to obtain a voice input. The states of FIG. 10C can include state specific user interface elements (e.g., a shutter element, a translate invoke element, and/or a hold to record element). The states of FIG. 10C may include different interface configurations than the states of FIG. 10B (e.g., action suggestions may be provided for display in a bottom panel).

FIGS. 11A-11D depict illustrations of example suggestion interfaces according to example embodiments of the present disclosure. In particular, FIGS. 11A-11D depict different configurations of the interface including different positions and/or interface elements for providing the action suggestions for display.

For example, at 1102, the action suggestions can be provided for display in horizontal light chips (or user interface tiles) at the bottom in a dedicated panel.

At 1104, the action suggestions can be provided for display in horizontal dark floating chips (or user interface tiles) rendered at the bottom (e.g., below the shutter interface element) over the camera feed.

At 1106, the action suggestions can be provided for display in horizontal light chips (or user interface tiles) rendered above the shutter user interface element and overlaid over the camera feed.

At 1108, the action suggestions can be provided for display in vertical light chips (or user interface tiles) rendered above the shutter user interface element and overlaid over the camera feed.

At 1110, the action suggestions can be provided for display in place of the shutter user interface element. For example, vertical light chips can replace the shutter user interface element within the interface.

At 1112, the action suggestions can be provided for display in the center of the reticle of the viewfinder. The action suggestions may be provided for display as big target elements at the center.

At 1114, the action suggestions can be provided for display as floating text. The action suggestions may be provided with a bottom gradient dim.

At 1116, the action suggestions can be provided for display in a panel at the bottom of the interface. The panel may have a white background with black text with one or more icons indicating a type of action.

At 1118, the action suggestions can be provided for display in a panel at the bottom of the interface. The panel may have a black background with white text with one or more icons indicating a type of action.

At 1120, the action suggestions can be provided for display in a panel at the bottom of the interface and with a matching border. The panel may have a white background with black text with one or more icons indicating a type of action.

At 1122, the action suggestions can be provided for display in a panel at the bottom of the interface and with a matching border. The panel may have a black background with white text with one or more icons indicating a type of action.

At 1124, the action suggestions can be provided for display in a dedicated panel along with the shutter user interface element. The background of the panel may be white with black text.

At 1126, the action suggestions can be provided for display in a dedicated panel along with the shutter user interface element. The background of the panel may be partially transparent (e.g., partially dimmed) with white text.

At 1128, the action suggestions can be provided for display as selectable chips (e.g., selectable user interface elements at the bottom left of the interface) along with the shutter user interface element.

Figure 12:
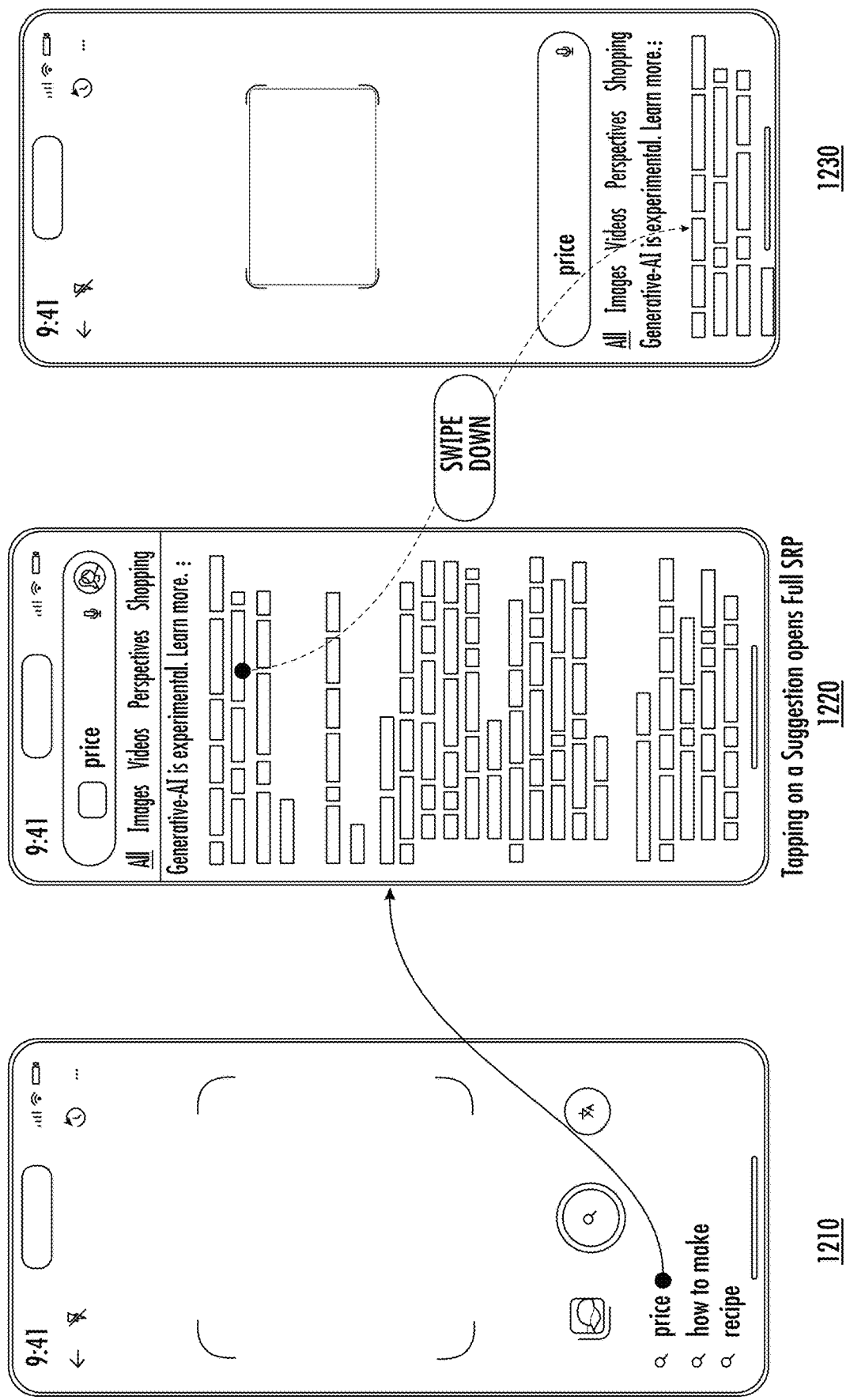
FIG. 12 depicts an illustration of an example search interface transition according to example embodiments of the present disclosure.

FIG. 12 depicts an illustration of an example search interface transition according to example embodiments of the present disclosure. In particular, the first interface state 1210 can depict a plurality of query suggestions. The "price" query suggestion can be selected, which can cause a search to be performed based on the multimodal query that includes the image and the "price" text. Search results and a model-generated response (e.g., a response generated by processing content of one or more search results with a generative model) can be determined and provided for display in a second interface state 1220. A user may then swipe down on the search results pane to minimize the pane, which can cause the third interface state 1230 to be provided for display. The third interface state 1230 can provide interface elements to crop the image, adjust the text string, and/or view the search result information.

Figure 13:
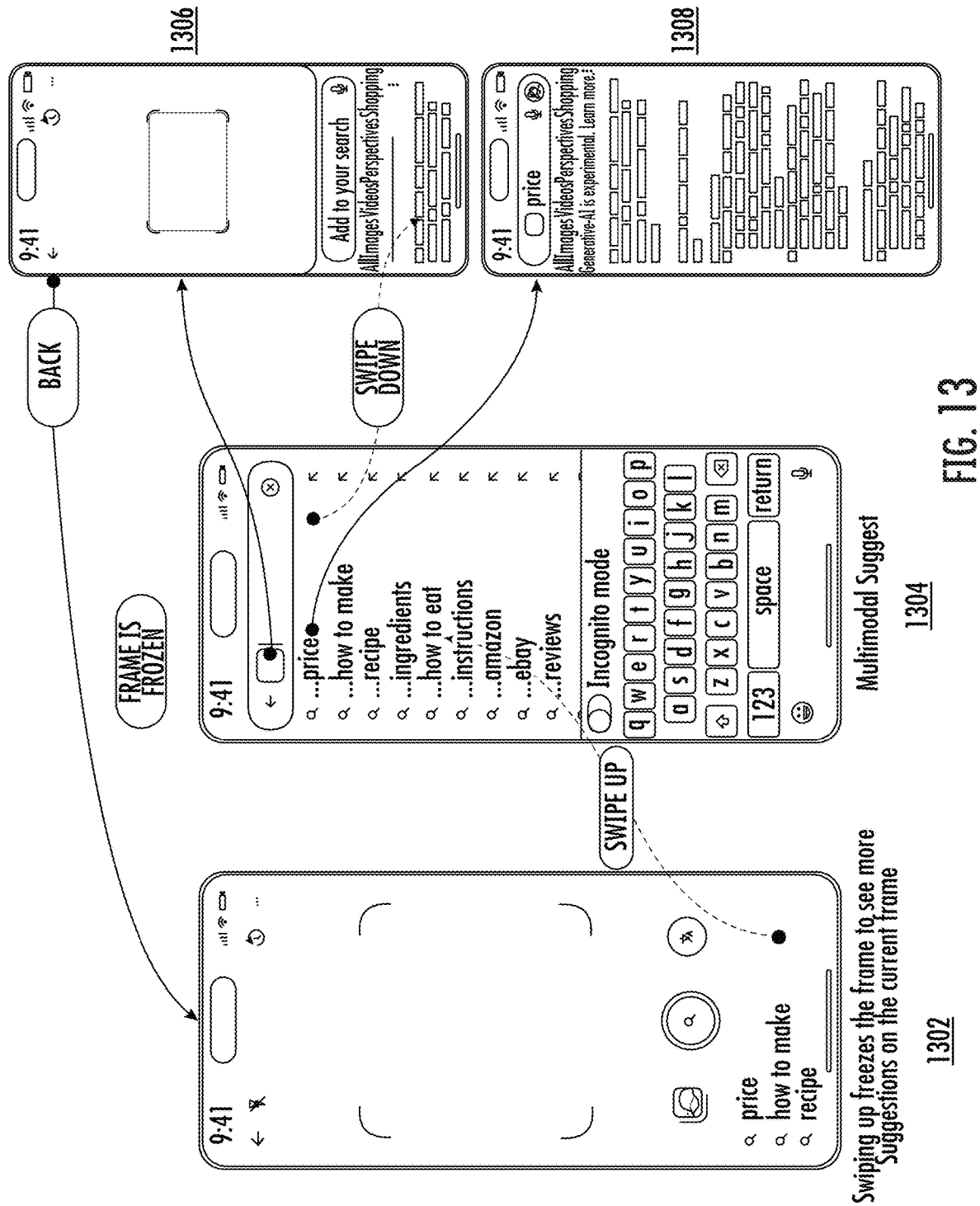
FIG. 13 depicts an illustration of an example search interface transition alternatives according to example embodiments of the present disclosure.

FIG. 13 depicts an illustration of an example search interface transition alternatives according to example embodiments of the present disclosure. For example, the initial suggestion interface 1302 can be provided for display with a first set of action suggestions. A user may swipe-up on the suggestions panel to transition to a query formulator interface 1304. The query formulator interface 1304 can include a query input box that may depict a thumbnail of the image. The query formulator interface 1304 can include an expanded list of suggested actions (e.g., an expanded list of suggested query text strings to pair with the image).

A user may then select the thumbnail of the image to transition to a cropping interface 1306. The cropping interface 1306 can include options to crop the image before search engine processing. The cropping can include different options on size, shape, and/or position.

Before and/or after the cropping, the search may be performed on the generated multimodal query. The search results and/or a model-generated response can then be provided for display within a search results interface 1308.

Figure 14:
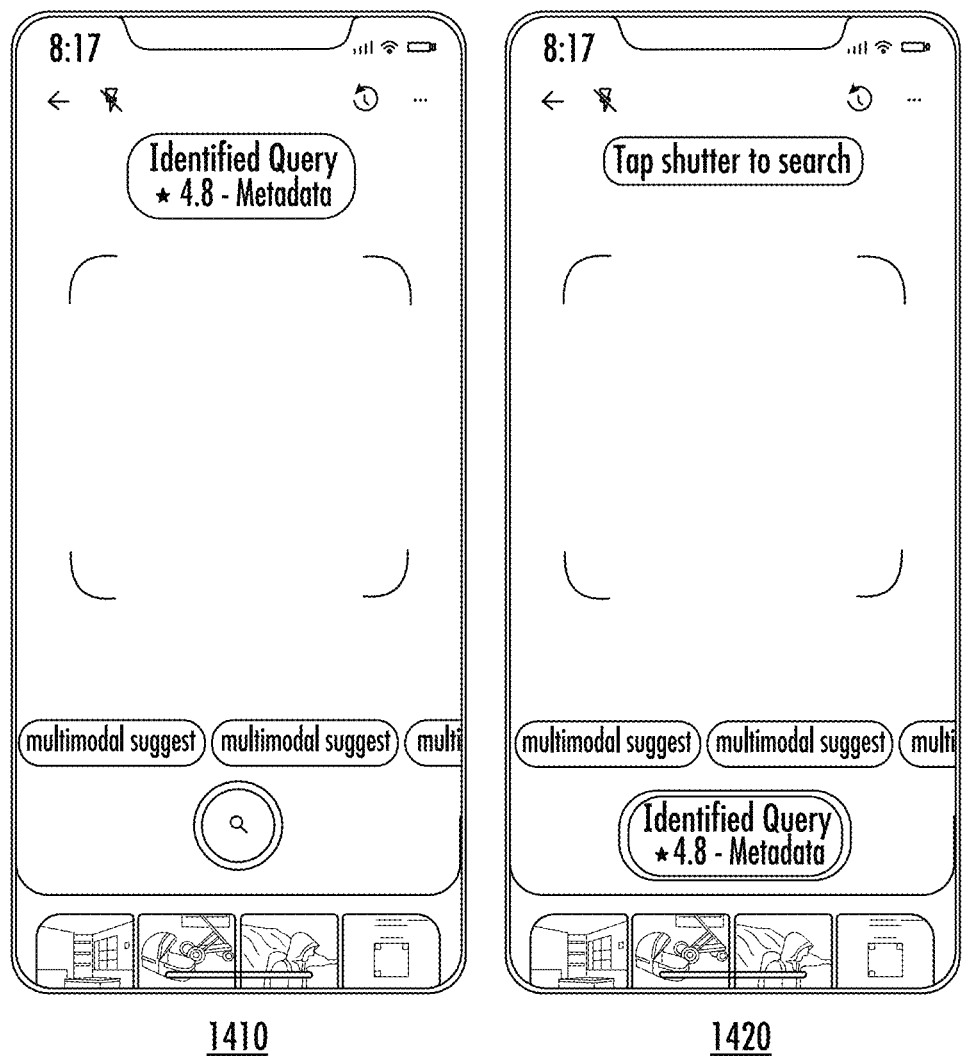
FIG. 14 depicts an illustration of an example identified query interface according to example embodiments of the present disclosure.

FIG. 14 depicts an illustration of an example identified query interface according to example embodiments of the present disclosure. In particular, the system may determine a particular visual query based on one or more detected features within the viewfinder. At 1410, a selected particular visual query with associated metadata may be provided for display as a selectable option along with the multimodal query suggestions.

The selected particular visual query may be selected. At 1420, the selected particular visual query with associated metadata may then be indicated in place of the shutter user interface element. A user may select additional suggestions to pair with the identified particular visual query. The identified query may include a location identification along with known data about the location (e.g., a particular restaurant along with review data, address, and/or other stored information). Alternatively and/or additionally, the identified query may include the object classification and data obtained from one or more knowledge graphs, databases, and/or caches associated with the object classification.

FIG. 15 depicts an illustration of an example query add-on interface according to example embodiments of the present disclosure. In particular, the visual search interface can include an initial state 1510 that may transition to a second state 1520 upon receiving an identified query determination and/or selection. The initial state 1510 and/or the second state 1520 may include a selectable tile for invoking an audio input recording, which can be utilized to obtain audio inputs to pair with the image data, the identified query, and/or text data to generate the multimodal query.

Figure 16:
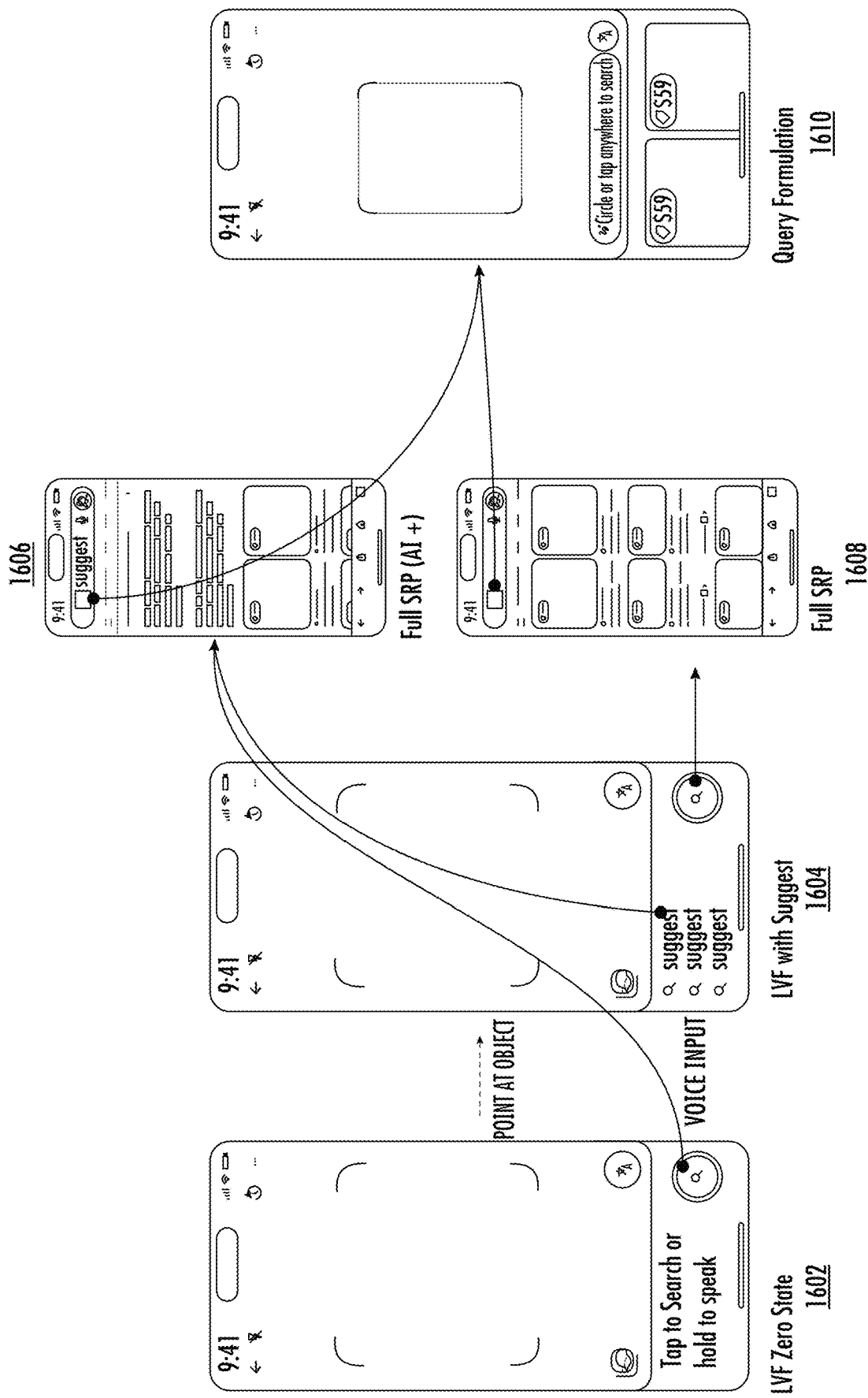
FIG. 16 depicts an illustration of an example cropping interface transition according to example embodiments of the present disclosure.

FIG. 16 depicts an illustration of an example cropping interface transition according to example embodiments of the present disclosure. In particular, the visual search interface can begin with a zero state 1602 before multimodal suggestions are determined. Once multimodal query suggestions are determined, a suggestion state 1604 can be provided for display with the multimodal query suggestions. At the zero state 1602 and/or the suggestion state 1604 an image and/or video can be captured for search and may be supplemented with a selected text string, an input text string, audio data, and/or other input data (e.g., metadata associated with the user, location, and/or time). The generated search query (e.g., the image query and/or the multimodal query) can then be processed to determine search results and/or a model-generated response.

A first search result interface state 1606 may be provided for display with one or more search results and a model-generated response that is responsive to the query with content based on at least a subset of the search results. Alternatively and/or additionally, a second search result interface state 1608 may be provided for display with one or more search results, which may include one or more image search results, one or more shopping search results, and/or one or more other types of search results.

The user may select to invoke a cropping state 1610 to crop the image of the multimodal query to refine the search results and/or model-generated response by augmenting the query.

FIG. 17 depicts an illustration of an example suggestion transition according to example embodiments of the present disclosure. In particular, the suggestions may update within the interface as new suggestions are determined, a certain period of time has elapsed, and/or different object(s) are detected. The transition may occur all at once (e.g., as depicted in 1710). Alternatively and/or additionally, the transition may occur line by line (e.g., as depicted in 1720). For example, the suggestions may be replaced all at once or suggestion by suggestion on a rolling basis.

FIG. 18 depicts an illustration of example action suggestions according to example embodiments of the present disclosure. In particular, the suggested queries and/or other suggested actions can vary based on the objects detected and/or the type of content detected.

At 1810, a colorful calendar with different graphics and text can be detected. Based on the detected image features, the action suggestions can be determined with a machine-learned model. The suggested actions can include a "select text" action, a "digitize" action, and/or a "summarize" action. The "select text" action may include performing optical character recognition, providing the identified text for display augmented into the image data, then obtaining one or more user selections of at least a portion of the identified text. The selected text can then be copied, shared, searched, and/or saved. The "digitize" action can include performing optical character recognition to identify the text. The image may be processed with one or more machine-learned models to identify the graphics, colors, layout, structure, font, size, and/or other features. The identified and/or recognized text and other information can then be leveraged to render a digital version of the depicted graphic-filled calendar. The "summarize" may include processing the image, identified text, and/or search results with one or more generative models to generate an overview of content depicted.

At 1820, a graph and a respective caption can be detected. Based on the detected image features, the action suggestions can be determined with a machine-learned model. The suggested actions can include a "select text" action, an "explain" action, and/or an "average rate of cost decrease" action. The "select text" action may include performing optical character recognition, providing the identified text for display augmented into the image data, then obtaining one or more user selections of at least a portion of the identified text. The selected text can then be copied, shared, searched, and/or saved. The "explain" may include processing the image, identified text, and/or search results with one or more generative models to generate a multi-part explanation of the depicted content. In some implementations, a generative model trained and/or tuned on diagram understanding may be leveraged. The "average rate of cost decrease" may include identifying the increments of the two axes and then determining the average rate of change based on the line on the graph and the identified increments.

At 1830, a rewards program fact sheet can be detected. Based on the detected image features, the action suggestions can be determined with a machine-learned model. The suggested actions can include a "select text" action, an "explain" action, and/or a "return options" action. The "select text" action may include performing optical character recognition, providing the identified text for display augmented into the image data, then obtaining one or more user selections of at least a portion of the identified text. The selected text can then be copied, shared, searched, and/or saved. The "explain" may include processing the image, identified text, and/or search results with one or more generative models to generate a multi-part explanation of the depicted content. The "return options" action may include generating a multimodal query including the image and a text string associated with the "return options". The multimodal query can then be searched.

In some implementations, other actions may be performed based on generating a multimodal query then performing a search. The multimodal query generation may include obtaining a stored embedding, soft prompt, and/or hard prompt based on the selected multimodal query suggestion. The obtained stored embedding, soft prompt, and/or hard prompt may then be processed with the image by the search engine.

FIG. 19 depicts an illustration of example code-based action suggestions according to example embodiments of the present disclosure. In particular, the systems and methods disclosed herein may perform code detection and code decryption via one or more models and/or engines. The different codes can include a QR code 1910, a character-based code 1920, a barcode 1930, and/or a QR code with context 1940 (e.g., a context associated with the QR code may be leveraged for action suggestion determination).

Figure 20A:
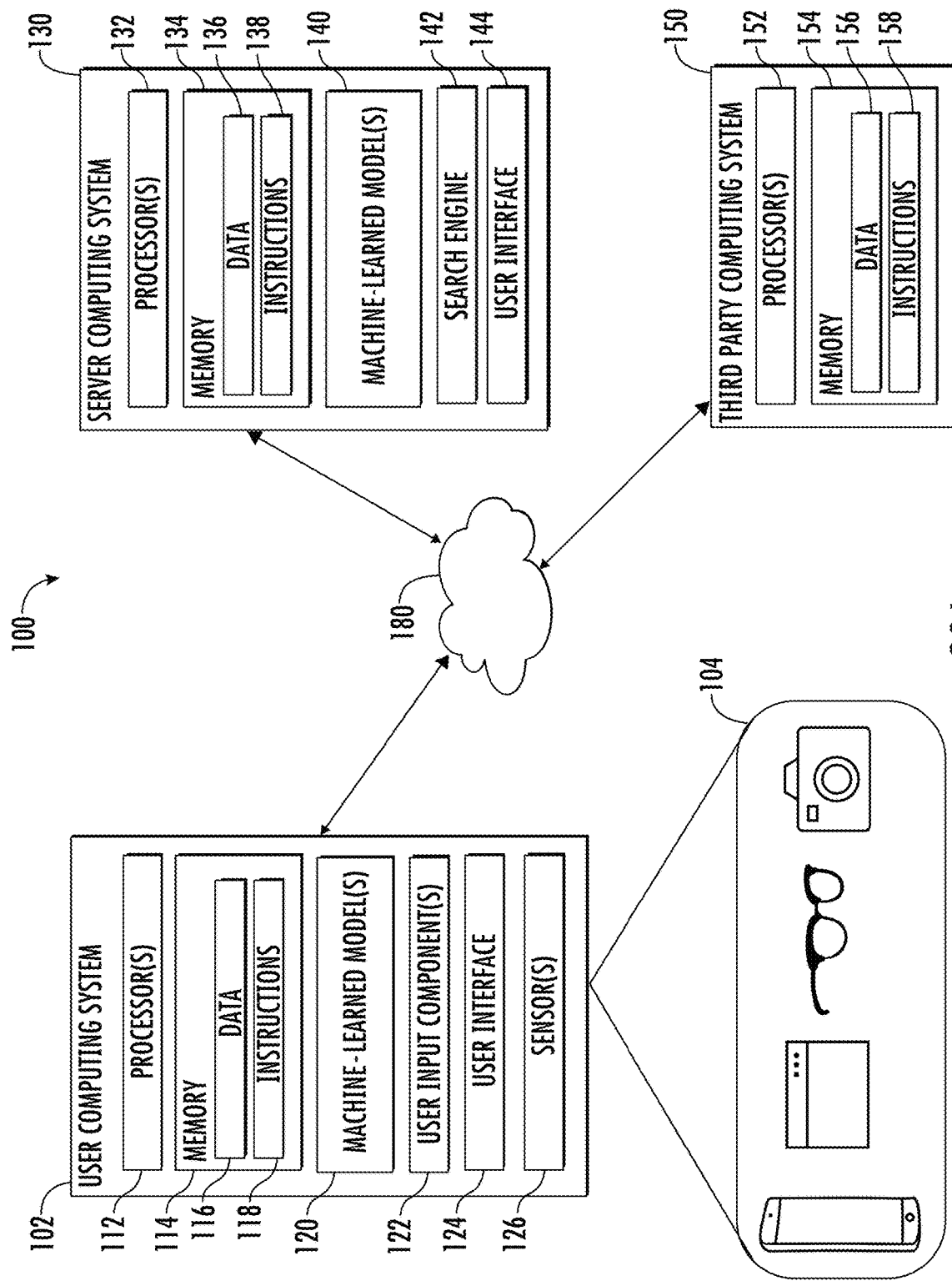
FIG. 20A depicts a block diagram of an example computing system that performs query suggestion according to example embodiments of the present disclosure.

FIG. 20A depicts a block diagram of an example computing system 100 that performs query suggestion according to example embodiments of the present disclosure. The system 100 includes a user computing system 102, a server computing system 130, and/or a third party computing system 150 that are communicatively coupled over a network 180.

The user computing system 102 can include any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing system 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing system 102 to perform operations.

In some implementations, the user computing system 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks.

In some implementations, the one or more machine-learned models 120 can be received from the server computing system 130 over network 180, stored in the user computing device memory 114, and then used or otherwise implemented by the one or more processors 112. In some implementations, the user computing system 102 can implement multiple parallel instances of a single machine-learned model 120 (e.g., to perform parallel machine-learned model processing across multiple instances of input data and/or detected features).

More particularly, the one or more machine-learned models 120 may include one or more detection models, one or more classification models, one or more segmentation models, one or more augmentation models, one or more generative models, one or more natural language processing models, one or more optical character recognition models, and/or one or more other machine-learned models. The one or more machine-learned models 120 can include one or more transformer models. The one or more machine-learned models 120 may include one or more neural radiance field models, one or more diffusion models, and/or one or more autoregressive language models.

The one or more machine-learned models 120 may be utilized to detect one or more object features. The detected object features may be classified and/or embedded. The classification and/or the embedding may then be utilized to perform a search to determine one or more search results. Alternatively and/or additionally, the one or more detected features may be utilized to determine an indicator (e.g., a user interface element that indicates a detected feature) is to be provided to indicate a feature has been detected. The user may then select the indicator to cause a feature classification, embedding, and/or search to be performed. In some implementations, the classification, the embedding, and/or the searching can be performed before the indicator is selected.

In some implementations, the one or more machine-learned models 120 can process image data, text data, audio data, and/or latent encoding data to generate output data that can include image data, text data, audio data, and/or latent encoding data. The one or more machine-learned models 120 may perform optical character recognition, natural language processing, image classification, object classification, text classification, audio classification, context determination, action prediction, image correction, image augmentation, text augmentation, sentiment analysis, object detection, error detection, inpainting, video stabilization, audio correction, audio augmentation, and/or data segmentation (e.g., mask based segmentation).

Machine-learned model(s) can be or include one or multiple machine-learned models or model components. Example machine-learned models can include neural networks (e.g., deep neural networks). Example machine-learned models can include non-linear models or linear models. Example machine-learned models can use other architectures in lieu of or in addition to neural networks. Example machine-learned models can include decision tree based models, support vector machines, hidden Markov models, Bayesian networks, linear regression models, k-means clustering models, etc.

Example neural networks can include feed-forward neural networks, recurrent neural networks (RNNs), including long short-term memory (LSTM) based recurrent neural networks, convolutional neural networks (CNNs), diffusion models, generative-adversarial networks, or other forms of neural networks. Example neural networks can be deep neural networks. Some example machine-learned models can leverage an attention mechanism such as self-attention. For example, some example machine-learned models can include multi-headed self-attention models.

Machine-learned model(s) can include a single or multiple instances of the same model configured to operate on data from input(s). Machine-learned model(s) can include an ensemble of different models that can cooperatively interact to process data from input(s). For example, machine-learned model(s) can employ a mixture-of-experts structure. See, e.g., Zhou et al., *Mixture-of-Experts with Expert Choice Routing*, ARXIV:2202.09368v2 (Oct. 14, 2022).

Input(s) can generally include or otherwise represent various types of data. Input(s) can include one type or many different types of data. Output(s) can be data of the same type(s) or of different types of data as compared to input(s). Output(s) can include one type or many different types of data.

Example data types for input(s) or output(s) include natural language text data, software code data (e.g., source code, object code, machine code, or any other form of computer-readable instructions or programming languages), machine code data (e.g., binary code, assembly code, or other forms of machine-readable instructions that can be executed directly by a computer's central processing unit), assembly code data (e.g., low-level programming languages that use symbolic representations of machine code instructions to program a processing unit), genetic data or other chemical or biochemical data, image data, audio data, audio-visual data, haptic data, biometric data, medical data, financial data, statistical data, geographical data, astronomical data, historical data, sensor data generally (e.g., digital or analog values, such as voltage or other absolute or relative level measurement values from a real or artificial input, such as from an audio sensor, light sensor, displacement sensor, etc.), and the like. Data can be raw or processed and can be in any format or schema.

In multimodal inputs or outputs, example combinations of data types include image data and audio data, image data and natural language data, natural language data and software code data, image data and biometric data, sensor data and medical data, etc. It is to be understood that any combination of data types in an input or an output can be present.

An example input can include one or multiple data types, such as the example data types noted above. An example output can include one or multiple data types, such as the example data types noted above. The data type(s) of input can be the same as or different from the data type(s) of output. It is to be understood that the example data types noted above are provided for illustrative purposes only. Data types contemplated within the scope of the present disclosure are not limited to those examples noted above.

Additionally or alternatively, one or more machine-learned models 140 can be included in or otherwise stored and implemented by the server computing system 130 that communicates with the user computing system 102 according to a client-server relationship. For example, the machine-learned models 140 can be implemented by the server computing system 130 as a portion of a web service (e.g., a viewfinder service, a visual search service, an image processing service, an ambient computing service, and/or an overlay application service). Thus, one or more models 120 can be stored and implemented at the user computing system 102 and/or one or more models 140 can be stored and implemented at the server computing system 130.

The user computing system 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

In some implementations, the user computing system 102 can store and/or provide one or more user interfaces 124, which may be associated with one or more applications. The one or more user interfaces 124 can be configured to receive inputs and/or provide data for display (e.g., image data, text data, audio data, one or more user interface elements, an augmented-reality experience, a virtual reality experience, and/or other data for display. The user interfaces 124 may be associated with one or more other computing systems (e.g., server computing system 130 and/or third party computing system 150). The user interfaces 124 can include a viewfinder interface, a search interface, a generative model interface, a social media interface, and/or a media content gallery interface.

The user computing system 102 may include and/or receive data from one or more sensors 126. The one or more sensors 126 may be housed in a housing component that houses the one or more processors 112, the memory 114, and/or one or more hardware components, which may store, and/or cause to perform, one or more software packets. The one or more sensors 126 can include one or more image sensors (e.g., a camera), one or more lidar sensors, one or more audio sensors (e.g., a microphone), one or more inertial sensors (e.g., inertial measurement unit), one or more biological sensors (e.g., a heart rate sensor, a pulse sensor, a retinal sensor, and/or a fingerprint sensor), one or more infrared sensors, one or more location sensors (e.g., GPS), one or more touch sensors (e.g., a conductive touch sensor and/or a mechanical touch sensor), and/or one or more other sensors. The one or more sensors can be utilized to obtain data associated with a user's environment (e.g., an image of a user's environment, a recording of the environment, and/or the location of the user).

The user computing system 102 may include, and/or be part of, a user computing device 104. The user computing device 104 may include a mobile computing device (e.g., a smartphone or tablet), a desktop computer, a laptop computer, a smart wearable, and/or a smart appliance. Additionally and/or alternatively, the user computing system may obtain from, and/or generate data with, the one or more user computing devices 104. For example, a camera of a smartphone may be utilized to capture image data descriptive of the environment, and/or an overlay application of the user computing device 104 can be utilized to track and/or process the data being provided to the user. Similarly, one or more sensors associated with a smart wearable may be utilized to obtain data about a user and/or about a user's environment (e.g., image data can be obtained with a camera housed in a user's smart glasses). Additionally and/or alternatively, the data may be obtained and uploaded from other user devices that may be specialized for data obtainment or generation.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIG. 20B.

Additionally and/or alternatively, the server computing system 130 can include and/or be communicatively connected with a search engine 142 that may be utilized to crawl one or more databases (and/or resources). The search engine 142 can process data from the user computing system 102, the server computing system 130, and/or the third party computing system 150 to determine one or more search results associated with the input data. The search engine 142 may perform term based search, label based search, Boolean based searches, image search, embedding based search (e.g., nearest neighbor search), multimodal search, and/or one or more other search techniques.

The server computing system 130 may store and/or provide one or more user interfaces 144 for obtaining input data and/or providing output data to one or more users. The one or more user interfaces 144 can include one or more user interface elements, which may include input fields, navigation tools, content chips, selectable tiles, widgets, data display carousels, dynamic animation, informational pop-ups, image augmentations, text-to-speech, speech-to-text, augmented-reality, virtual-reality, feedback loops, and/or other interface elements.

The user computing system 102 and/or the server computing system 130 can train the models 120 and/or 140 via interaction with the third party computing system 150 that is communicatively coupled over the network 180. The third party computing system 150 can be separate from the server computing system 130 or can be a portion of the server computing system 130. Alternatively and/or additionally, the third party computing system 150 may be associated with one or more web resources, one or more web platforms, one or more other users, and/or one or more contexts.

An example machine-learned model can include a generative model (e.g., a large language model, a foundation model, a vision language model, an image generation model, a text-to-image model, an audio generation model, and/or other generative models).

Training and/or tuning the machine-learned model can include obtaining a training instance. A set of training data can include a plurality of training instances divided between multiple datasets (e.g., a training dataset, a validation dataset, or testing dataset). A training instance can be labeled or unlabeled. The runtime inferences can form training instances when a model is trained using an evaluation of the model's performance on that runtime instance (e.g., online training/learning). Example data types for the training instance and various tasks associated therewith are described throughout the present disclosure.

Training and/or tuning can include processing, using one or more machine-learned models, the training instance to generate an output. The output can be directly obtained from the one or more machine-learned models or can be a downstream result of a chain of processing operations that includes an output of the one or more machine-learned models.

Training and/or tuning can include receiving an evaluation signal associated with the output. The evaluation signal can be obtained using a loss function. Various determinations of loss can be used, such as mean squared error, likelihood loss, cross entropy loss, hinge loss, contrastive loss, or various other loss functions. The evaluation signal can be computed using known ground-truth labels (e.g., supervised learning), predicted or estimated labels (e.g., semi- or self-supervised learning), or without labels (e.g., unsupervised learning). The evaluation signal can be a reward (e.g., for reinforcement learning). The reward can be computed using a machine-learned reward model configured to generate rewards based on output(s) received. The reward can be computed using feedback data describing human feedback on the output(s).

Training and/or tuning can include updating the machine-learned model using the evaluation signal. For example, values for parameters of the machine-learned model(s) can be learned, in some embodiments, using various training or learning techniques, such as, for example, backwards propagation. For example, the evaluation signal can be backpropagated from the output (or another source of the evaluation signal) through the machine-learned model(s) to update one or more parameters of the model(s) (e.g., based on a gradient of the evaluation signal with respect to the parameter value(s)). For example, system(s) containing one or more machine-learned models can be trained in an end-to-end manner. Gradient descent techniques can be used to iteratively update the parameters over a number of training iterations. In some implementations, performing backwards propagation of errors can include performing truncated backpropagation through time. Training and/or tuning can include implementing a number of generalization techniques (e.g., weight decays, dropouts, etc.) to improve the generalization capability of the models being trained.

In some implementations, the above training loop can be implemented for training a machine-learned model from an initialized state to a fully trained state (e.g., when the model exhibits a desired performance profile, such as based on accuracy, precision, recall, etc.).

In some implementations, the above training loop can be implemented for particular stages of a training procedure. For instance, in some implementations, the above training loop can be implemented for pre-training a machine-learned model. Pre-training can include, for instance, large-scale training over potentially noisy data to achieve a broad base of performance levels across a variety of tasks/data types. In some implementations, the above training loop can be implemented for fine-tuning a machine-learned model. Fine-tuning can include, for instance, smaller-scale training on higher-quality (e.g., labeled, curated, etc.) data. Fine-tuning can affect all or a portion of the parameters of a machine-learned model. For example, various portions of the machine-learned model can be "frozen" for certain training stages. For example, parameters associated with an embedding space can be "frozen" during fine-tuning (e.g., to retain information learned from a broader domain(s) than present in the fine-tuning dataset(s)). An example fine-tuning approach includes reinforcement learning. Reinforcement learning can be based on user feedback on model performance during use.

In some implementations, the computing system 100 may utilize one or more soft prompts for conditioning the one or more machine-learned models (120 and/or 140) for downstream tasks. The one or more soft prompts can include a set of tunable parameters that can be trained (or tuned) as the parameters of the one or more machine-learned models (120 and/or 140) are fixed. The one or more soft prompts 124 can be trained for a specific task and/or a specific set of tasks. Alternatively and/or additionally, the one or more soft prompts 124 may be trained to condition the one or more machine-learned models (120 and/or 140) to perform inferences for a particular individual, one or more entities, and/or one or more tasks such that the output is tailored for that particular individual, particular entities, and/or particular task. The one or more soft prompts 124 can be obtained and processed with one or more inputs by the one or more machine-learned models (120 and/or 140).

The one or more soft prompts can include a set of machine-learned weights. In particular, the one or more soft prompts can include weights that were trained to condition a generative model to generate model-generated content with one or more particular attributes. For example, the one or more soft prompts can be utilized by a user to generate content based on the fine-tuning. The one or more soft prompts can be extended to a plurality of tasks. For example, the computing system 100 may tune the set of parameters on a plurality of different content attributes and/or types. The one or more soft prompts may include a plurality of learned vector representations that may be model-readable.

A particular soft prompt can be obtained based on a particular task, individual, content type, etc. The particular soft prompt can include a set of learned parameters. The set of learned parameters can be processed with the generative model to generate the model-generated image.

The user computing system 102 and/or the server computing system 130 may store one or more soft prompts associated with the particular user and/or particular task. The soft prompt(s) can include a set of parameters. The user computing system 102 and/or the server computing system 130 may leverage the set of parameters of the soft prompt(s) and a generative model to generate a model-generated content item. In some implementations, the model-generated content item can be generated based on the set of parameters associated with the particular individual and/or task.

The utilization of a soft prompt (i.e., a set of parameters that can be processed with a generative model for downstream task conditioning) can reduce the computational cost for parameter tuning for object-specific content generation by reducing the parameters to be tuned. The set of parameters can be limited and may be adjusted while the parameters of the pre-trained generative model stay fixed. The set of parameters of the soft prompt can be utilized to condition the pre-trained generative model (e.g., the machine-learned image generation model and/or language model) for particular downstream tasks (e.g., response generation and/or image rendering).

In some implementations, the generative language model and/or one or more soft prompts (e.g., a set of machine-learned parameters that can be processed with the input by the generative language model) can be trained to generate content with particular attributes.

In some implementations, the server computing system 130 can include a prompt library. The prompt library can store a plurality of prompt templates (e.g., a plurality of hard prompt templates (e.g., text prompt templates)) and/or a plurality of soft prompts. The plurality of prompt templates can include hard prompt templates (e.g., text string data) that may be combined with the user input to generate a more detailed and complete prompt for the generative model to process. The templates can include text descriptive of the request. The templates may be object-specific, user-specific, and/or content-specific. The plurality of prompt templates may include few-shot examples.

The prompt library can store a plurality of soft prompts. The plurality of soft prompts may be associated with a plurality of different content attributes and/or a plurality of different individuals. The plurality of soft prompts can include learned parameters and/or learned weights that can be processed with the generative model to condition the generative model to generate content items with particular attributes. The plurality of soft prompts may have been tuned by freezing the parameters of a pre-trained generative model, while the parameters of the soft prompt are learned based on a particular task and/or user. The plurality of soft prompts can include a plurality of different soft prompts associated with a plurality of different users and/or a plurality of different sets of users.

The third party computing system 150 can include one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the third party computing system 150 to perform operations. In some implementations, the third party computing system 150 includes or is otherwise implemented by one or more server computing devices.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some implementations, the task can be a generative task, and the one or more machine-learned models (e.g., 120 and/or 140) can be configured to output content generated in view of one or more inputs. For instance, the inputs can be or otherwise represent data of one or more modalities that encodes context for generating additional content.

In some implementations, the task can be a text completion task. The machine-learned models can be configured to process the inputs that represent textual data and to generate the outputs that represent additional textual data that completes a textual sequence that includes the inputs. For instance, the machine-learned models can be configured to generate the outputs to complete a sentence, paragraph, or portion of text that follows from a portion of text represented by inputs.

In some implementations, the task can be an instruction following task. The machine-learned models can be configured to process the inputs that represent instructions to perform a function and to generate the outputs that advance a goal of satisfying the instruction function (e.g., at least a step of a multi-step procedure to perform the function). The outputs can represent data of the same or of a different modality as the inputs. For instance, the inputs can represent textual data (e.g., natural language instructions for a task to be performed) and the machine-learned models can process the inputs to generate the outputs that represent textual data responsive to the instructions (e.g., natural language responses, programming language responses, machine language responses, etc.). The inputs can represent image data (e.g., image-based instructions for a task to be performed, optionally accompanied by textual instructions) and the machine-learned models can process the inputs to generate the outputs that represent textual data responsive to the instructions (e.g., natural language responses, programming language responses, machine language responses, etc.). One or more outputs can be iteratively or recursively generated to sequentially process and accomplish steps toward accomplishing the requested functionality. For instance, an initial output can be executed by an external system or be processed by the machine-learned models to complete an initial step of performing a function. Multiple steps can be performed, with a final output being obtained that is responsive to the initial instructions.

In some implementations, the task can be a question answering task. The machine-learned models can be configured to process the inputs that represent a question to answer and to generate the outputs that advance a goal of returning an answer to the question (e.g., at least a step of a multi-step procedure to perform the function). The outputs can represent data of the same or of a different modality as the inputs. For instance, the inputs can represent textual data (e.g., natural language instructions for a task to be performed) and the machine-learned models can process the inputs to generate the outputs that represent textual data responsive to the question (e.g., natural language responses, programming language responses, machine language responses, etc.). The inputs can represent image data (e.g., image-based instructions for a task to be performed, optionally accompanied by textual instructions) and the machine-learned models can process the inputs to generate the outputs that represent textual data responsive to the question (e.g., natural language responses, programming language responses, machine language responses, etc.). One or more outputs can be iteratively or recursively generated to sequentially process and accomplish steps toward answering the question. For instance, an initial output can be executed by an external system or be processed by the machine-learned models to complete an initial step of obtaining an answer to the question (e.g., querying a database, performing a computation, executing a script, etc.). Multiple steps can be performed, with a final output being obtained that is responsive to the question.

In some implementations, the task can be an image generation task. The machine-learned models can be configured to process the inputs that represent context regarding a desired portion of image content. The context can include text data, image data, audio data, etc. Machine-learned models can be configured to generate the outputs that represent image data that depicts imagery related to the context. For instance, the machine-learned models can be configured to generate pixel data of an image. Values for channels associated with the pixels in the pixel data can be selected based on the context (e.g., based on a probability determined based on the context).

In some implementations, the task can be an audio generation task. Machine-learned models can be configured to process the inputs that represent context regarding a desired portion of audio content. The context can include text data, image data, audio data, etc. The machine-learned models can be configured to generate the outputs that represent audio data related to the context. For instance, the machine-learned models can be configured to generate waveform data in the form of an image (e.g., a spectrogram). Values for channels associated with pixels of the image can be selected based on the context. The machine-learned models can be configured to generate waveform data in the form of a sequence of discrete samples of a continuous waveform. Values of the sequence can be selected based on the context (e.g., based on a probability determined based on the context).

In some implementations, the task can be a data generation task. Machine-learned models can be configured to process the inputs that represent context regarding a desired portion of data (e.g., data from various data domains, such as sensor data, image data, multimodal data, statistical data, etc.). The desired data can be, for instance, synthetic data for training other machine-learned models. The context can include arbitrary data types. The machine-learned models can be configured to generate the outputs that represent data that aligns with the desired data. For instance, the machine-learned models can be configured to generate data values for populating a dataset. Values for the data objects can be selected based on the context (e.g., based on a probability determined based on the context).

The user computing system may include a number of applications (e.g., applications 1 through N). Each application may include its own respective machine learning library and machine-learned model(s). For example, each application can include a machine-learned model. Example applications include a text messaging application, an email application, a dictation application, a virtual keyboard application, a browser application, etc.

Each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

The user computing system 102 can include a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer can include a number of machine-learned models. For example a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing system 100.

The central intelligence layer can communicate with a central device data layer. The central device data layer can be a centralized repository of data for the computing system 100. The central device data layer may communicate with a number of other components of the computing device, such as, for example, one or more sensors, a context manager, a device state component, and/or additional components. In some implementations, the central device data layer can communicate with each device component using an API (e.g., a private API).

Figure 20B:
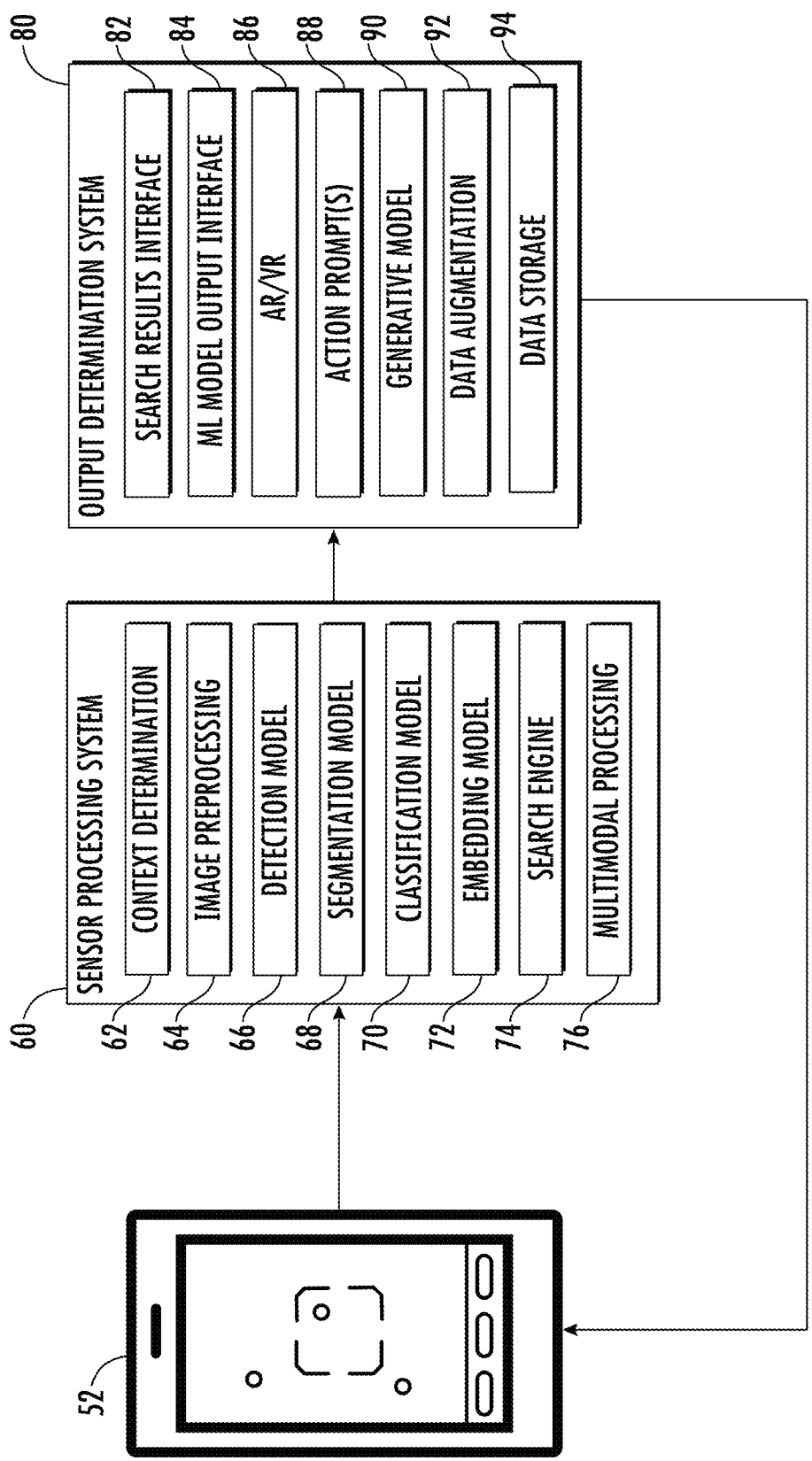
FIG. 20B depicts a block diagram of an example computing system that performs query suggestion according to example embodiments of the present disclosure.

FIG. 20B depicts a block diagram of an example computing system 50 that performs query suggestion according to example embodiments of the present disclosure. In particular, the example computing system 50 can include one or more computing devices 52 that can be utilized to obtain, and/or generate, one or more datasets that can be processed by a sensor processing system 60 and/or an output determination system 80 to feedback to a user that can provide information on features in the one or more obtained datasets. The one or more datasets can include image data, text data, audio data, multimodal data, latent encoding data, etc. The one or more datasets may be obtained via one or more sensors associated with the one or more computing devices 52 (e.g., one or more sensors in the computing device 52). Additionally and/or alternatively, the one or more datasets can be stored data and/or retrieved data (e.g., data retrieved from a web resource). For example, images, text, and/or other content items may be interacted with by a user. The interacted with content items can then be utilized to generate one or more determinations.

The one or more computing devices 52 can obtain, and/or generate, one or more datasets based on image capture, sensor tracking, data storage retrieval, content download (e.g., downloading an image or other content item via the internet from a web resource), and/or via one or more other techniques. The one or more datasets can be processed with a sensor processing system 60. The sensor processing system 60 may perform one or more processing techniques using one or more machine-learned models, one or more search engines, and/or one or more other processing techniques. The one or more processing techniques can be performed in any combination and/or individually. The one or more processing techniques can be performed in series and/or in parallel. In particular, the one or more datasets can be processed with a context determination block 62, which may determine a context associated with one or more content items. The context determination block 62 may identify and/or process metadata, user profile data (e.g., preferences, user search history, user browsing history, user purchase history, and/or user input data), previous interaction data, global trend data, location data, time data, and/or other data to determine a particular context associated with the user. The context can be associated with an event, a determined trend, a particular action, a particular type of data, a particular environment, and/or another context associated with the user and/or the retrieved or obtained data.

The sensor processing system 60 may include an image preprocessing block 64. The image preprocessing block 64 may be utilized to adjust one or more values of an obtained and/or received image to prepare the image to be processed by one or more machine-learned models and/or one or more search engines 74. The image preprocessing block 64 may resize the image, adjust saturation values, adjust resolution, strip and/or add metadata, and/or perform one or more other operations.

In some implementations, the sensor processing system 60 can include one or more machine-learned models, which may include a detection model 66, a segmentation model 68, a classification model 70, an embedding model 72, and/or one or more other machine-learned models. For example, the sensor processing system 60 may include one or more detection models 66 that can be utilized to detect particular features in the processed dataset. In particular, one or more images can be processed with the one or more detection models 66 to generate one or more bounding boxes associated with detected features in the one or more images.

Additionally and/or alternatively, one or more segmentation models 68 can be utilized to segment one or more portions of the dataset from the one or more datasets. For example, the one or more segmentation models 68 may utilize one or more segmentation masks (e.g., one or more segmentation masks manually generated and/or generated based on the one or more bounding boxes) to segment a portion of an image, a portion of an audio file, and/or a portion of text. The segmentation may include isolating one or more detected objects and/or removing one or more detected objects from an image.

The one or more classification models 70 can be utilized to process image data, text data, audio data, latent encoding data, multimodal data, and/or other data to generate one or more classifications. The one or more classification models 70 can include one or more image classification models, one or more object classification models, one or more text classification models, one or more audio classification models, and/or one or more other classification models. The one or more classification models 70 can process data to determine one or more classifications.

In some implementations, data may be processed with one or more embedding models 72 to generate one or more embeddings. For example, one or more images can be processed with the one or more embedding models 72 to generate one or more image embeddings in an embedding space. The one or more image embeddings may be associated with one or more image features of the one or more images. In some implementations, the one or more embedding models 72 may be configured to process multimodal data to generate multimodal embeddings. The one or more embeddings can be utilized for classification, search, and/or learning embedding space distributions.

The sensor processing system 60 may include one or more search engines 74 that can be utilized to perform one or more searches. The one or more search engines 74 may crawl one or more databases (e.g., one or more local databases, one or more global databases, one or more private databases, one or more public databases, one or more specialized databases, and/or one or more general databases) to determine one or more search results. The one or more search engines 74 may perform feature matching, text based search, embedding based search (e.g., k-nearest neighbor search), metadata based search, multimodal search, web resource search, image search, text search, and/or application search.

Additionally and/or alternatively, the sensor processing system 60 may include one or more multimodal processing blocks 76, which can be utilized to aid in the processing of multimodal data. The one or more multimodal processing blocks 76 may include generating a multimodal query and/or a multimodal embedding to be processed by one or more machine-learned models and/or one or more search engines 74.

The output(s) of the sensor processing system 60 can then be processed with an output determination system 80 to determine one or more outputs to provide to a user. The output determination system 80 may include heuristic based determinations, machine-learned model based determinations, user selection based determinations, and/or context based determinations.

The output determination system 80 may determine how and/or where to provide the one or more search results in a search results interface 82. Additionally and/or alternatively, the output determination system 80 may determine how and/or where to provide the one or more machine-learned model outputs in a machine-learned model output interface 84. In some implementations, the one or more search results and/or the one or more machine-learned model outputs may be provided for display via one or more user interface elements. The one or more user interface elements may be overlayed over displayed data. For example, one or more detection indicators may be overlayed over detected objects in a viewfinder. The one or more user interface elements may be selectable to perform one or more additional searches and/or one or more additional machine-learned model processes. In some implementations, the user interface elements may be provided as specialized user interface elements for specific applications and/or may be provided uniformly across different applications. The one or more user interface elements can include pop-up displays, interface overlays, interface tiles and/or chips, carousel interfaces, audio feedback, animations, interactive widgets, and/or other user interface elements.

Additionally and/or alternatively, data associated with the output(s) of the sensor processing system 60 may be utilized to generate and/or provide an augmented-reality experience and/or a virtual-reality experience 86. For example, the one or more obtained datasets may be processed to generate one or more augmented-reality rendering assets and/or one or more virtual-reality rendering assets, which can then be utilized to provide an augmented-reality experience and/or a virtual-reality experience 86 to a user. The augmented-reality experience may render information associated with an environment into the respective environment. Alternatively and/or additionally, objects related to the processed dataset(s) may be rendered into the user environment and/or a virtual environment. Rendering dataset generation may include training one or more neural radiance field models to learn a three-dimensional representation for one or more objects.

In some implementations, one or more action prompts 88 may be determined based on the output(s) of the sensor processing system 60. For example, a search prompt, a purchase prompt, a generate prompt, a reservation prompt, a call prompt, a redirect prompt, and/or one or more other prompts may be determined to be associated with the output(s) of the sensor processing system 60. The one or more action prompts 88 may then be provided to the user via one or more selectable user interface elements. In response to a selection of the one or more selectable user interface elements, a respective action of the respective action prompt may be performed (e.g., a search may be performed, a purchase application programming interface may be utilized, and/or another application may be opened).

In some implementations, the one or more datasets and/or the output(s) of the sensor processing system 60 may be processed with one or more generative models 90 to generate a model-generated content item that can then be provided to a user. The generation may be prompted based on a user selection and/or may be automatically performed (e.g., automatically performed based on one or more conditions, which may be associated with a threshold amount of search results not being identified).

The one or more generative models 90 can include language models (e.g., large language models and/or vision language models), image generation models (e.g., text-to-image generation models and/or image augmentation models), audio generation models, video generation models, graph generation models, and/or other data generation models (e.g., other content generation models). The one or more generative models 90 can include one or more transformer models, one or more convolutional neural networks, one or more recurrent neural networks, one or more feedforward neural networks, one or more generative adversarial networks, one or more self-attention models, one or more embedding models, one or more encoders, one or more decoders, and/or one or more other models. In some implementations, the one or more generative models 90 can include one or more autoregressive models (e.g., a machine-learned model trained to generate predictive values based on previous behavior data) and/or one or more diffusion models (e.g., a machine-learned model trained to generate predicted data based on generating and processing distribution data associated with the input data).

The one or more generative models 90 can be trained to process input data and generate model-generated content items, which may include a plurality of predicted words, pixels, signals, and/or other data. The model-generated content items may include novel content items that are not the same as any pre-existing work. The one or more generative models 90 can leverage learned representations, sequences, and/or probability distributions to generate the content items, which may include phrases, storylines, settings, objects, characters, beats, lyrics, and/or other aspects that are not included in pre-existing content items.

The one or more generative models 90 may include a vision language model.

The vision language model can be trained, tuned, and/or configured to process image data and/or text data to generate a natural language output. The vision language model may leverage a pre-trained large language model (e.g., a large autoregressive language model) with one or more encoders (e.g., one or more image encoders and/or one or more text encoders) to provide detailed natural language outputs that emulate natural language composed by a human.

The vision language model may be utilized for zero-shot image classification, few shot image classification, image captioning, multimodal query distillation, multimodal question and answering, and/or may be tuned and/or trained for a plurality of different tasks. The vision language model can perform visual question answering, image caption generation, feature detection (e.g., content monitoring (e.g., for inappropriate content)), object detection, scene recognition, and/or other tasks.

The vision language model may leverage a pre-trained language model that may then be tuned for multimodality. Training and/or tuning of the vision language model can include image-text matching, masked-language modeling, multimodal fusing with cross attention, contrastive learning, prefix language model training, and/or other training techniques. For example, the vision language model may be trained to process an image to generate predicted text that is similar to ground truth text data (e.g., a ground truth caption for the image). In some implementations, the vision language model may be trained to replace masked tokens of a natural language template with textual tokens descriptive of features depicted in an input image. Alternatively and/or additionally, the training, tuning, and/or model inference may include multi-layer concatenation of visual and textual embedding features. In some implementations, the vision language model may be trained and/or tuned via jointly learning image embedding and text embedding generation, which may include training and/or tuning a system to map embeddings to a joint feature embedding space that maps text features and image features into a shared embedding space. The joint training may include image-text pair parallel embedding and/or may include triplet training. In some implementations, the images may be utilized and/or processed as prefixes to the language model.

The one or more generative models 90 may be stored on-device and/or may be stored on a server computing system. In some implementations, the one or more generative models 90 can perform on-device processing to determine suggested searches, suggested actions, and/or suggested prompts. The one or more generative models 90 may include one or more compact vision language models that may include less parameters than a vision language model stored and operated by the server computing system. The compact vision language model may be trained via distillation training. In some implementations, the visional language model may process the display data to generate suggestions. The display data can include a single image descriptive of a screenshot and/or may include image data, metadata, and/or other data descriptive of a period of time preceding the current displayed content (e.g., the applications, images, videos, messages, and/or other content viewed within the past 30 seconds). The user computing device may generate and store a rolling buffer window (e.g., 30 seconds) of data descriptive of content displayed during the buffer. Once the time has elapsed, the data may be deleted. The rolling buffer window data may be utilized to determine a context, which can be leveraged for query, content, action, and/or prompt suggestion.

In some implementations, the generative models 90 can include machine-learned sequence processing models. An example system can pass inputs to sequence processing models. Sequence processing models can include one or more machine-learned components. Sequence processing models can process the data from inputs to obtain an input sequence. Input sequence can include one or more input elements obtained from inputs. The sequence processing model can process the input sequence using prediction layers to generate an output sequence. The output sequence can include one or more output elements generated based on input sequence. The system can generate outputs based on output sequence.

Sequence processing models can include one or multiple machine-learned model components configured to ingest, generate, or otherwise reason over sequences of information. For example, some example sequence processing models in the text domain are referred to as "Large Language Models," or LLMs. See, e.g., PaLM 2 Technical Report, Google, https://ai.google/static/documents/palm2techreport.pdf (n.d.). Other example sequence processing models can operate in other domains, such as image domains, see, e.g., Dosovitskiy et al., *An Image is Worth* 16×16 *Words: Transformers for Image Recognition at Scale*, arXiv: 2010.11929v2 (Jun. 3, 2021), audio domains, see, e.g., Agostinelli et al., *MusicLM: Generating Music From Text*, arXiv:2301.11325v1 (Jan. 26, 2023), biochemical domains, see, e.g., Jumper et al., Highly accurate protein structure prediction with AlphaFold, 596 Nature 583 (Aug. 26, 2021), by way of example. Sequence processing models can process one or multiple types of data simultaneously. Sequence processing models can include relatively large models (e.g., more parameters, computationally expensive, etc.), relatively small models (e.g., fewer parameters, computationally lightweight, etc.), or both.

In general, sequence processing models can obtain an input sequence using data from inputs. For instance, input sequence can include a representation of data from inputs 2 in a format understood by sequence processing models. One or more machine-learned components of sequence processing models can ingest the data from inputs, parse the data into pieces compatible with the processing architectures of sequence processing models (e.g., via "tokenization"), and project the pieces into an input space associated with prediction layers (e.g., via "embedding").

Sequence processing models can ingest the data from inputs and parse the data into a sequence of elements to obtain input sequence. For example, a portion of input data from inputs can be broken down into pieces that collectively represent the content of the portion of the input data. The pieces can provide the elements of the sequence.

In some implementations, processing the input data can include tokenization. For example, a tokenizer may process a given portion of an input source and output a series of tokens (e.g., corresponding to input elements) that represent the portion of the input source. Various approaches to tokenization can be used. For instance, textual input sources can be tokenized using a byte-pair encoding (BPE) technique. See, e.g., Kudo et al., *SentencePiece: A simple and language independent subword tokenizer and detokenizer for Neural Text Processing*, Proceedings of the 2018 Conference on Empirical Methods in Natural Language Processing (System Demonstrations), pages 66-71 (October 31-Nov. 4, 2018), https://aclanthology.org/D18-2012.pdf. Image-based input sources can be tokenized by extracting and serializing patches from an image.

In general, arbitrary data types can be serialized and processed into an input sequence.

Prediction layers can predict one or more output elements based on the input elements. Prediction layers can include one or more machine-learned model architectures, such as one or more layers of learned parameters that manipulate and transform the inputs to extract higher-order meaning from, and relationships between, input elements. In this manner, for instance, example prediction layers can predict new output elements in view of the context provided by input sequence.

Prediction layers can evaluate associations between portions of input sequence and a particular output element. These associations can inform a prediction of the likelihood that a particular output follows the input context. For example, consider the textual snippet, "The carpenter's toolbox was small and heavy. It was full of _____." Example prediction layers can identify that "It" refers back to "toolbox" by determining a relationship between the respective embeddings. Example prediction layers can also link "It" to the attributes of the toolbox, such as "small" and "heavy." Based on these associations, prediction layers can, for instance, assign a higher probability to the word "nails" than to the word "sawdust."

A transformer is an example architecture that can be used in prediction layers. See, e.g., Vaswani et al., *Attention Is All You Need*, arXiv:1706.03762v7 (Aug. 2, 2023). A transformer is an example of a machine-learned model architecture that uses an attention mechanism to compute associations between items within a context window. The context window can include a sequence that contains input sequence and potentially one or more output elements. A transformer block can include one or more attention layers and one or more post-attention layers (e.g., feedforward layers, such as a multi-layer perceptron).

Prediction layers can include other machine-learned model architectures in addition to or in lieu of transformer-based architectures. For example, recurrent neural networks (RNNs) and long short-term memory (LSTM) models can also be used, as well as convolutional neural networks (CNNs). In general, prediction layers can leverage various kinds of artificial neural networks that can understand or generate sequences of information.

Output sequence can include or otherwise represent the same or different data types as input sequence. For instance, input sequence can represent textual data, and output sequence can represent textual data. The input sequence can represent image, audio, or audiovisual data, and output sequence can represent textual data (e.g., describing the image, audio, or audiovisual data). It is to be understood that prediction layers, and any other interstitial model components of sequence processing models, can be configured to receive a variety of data types in input sequences and output a variety of data types in output sequences.

The output sequence can have various relationships to an input sequence. Output sequence can be a continuation of input sequence. The output sequence can be complementary to the input sequence. The output sequence can translate, transform, augment, or otherwise modify input sequence. The output sequence can answer, evaluate, confirm, or otherwise respond to input sequence. The output sequence can implement (or describe instructions for implementing) an instruction provided via an input sequence.

The output sequence can be generated autoregressively. For instance, for some applications, an output of one or more prediction layers can be passed through one or more output layers (e.g., softmax layer) to obtain a probability distribution over an output vocabulary (e.g., a textual or symbolic vocabulary) conditioned on a set of input elements in a context window. In this manner, for instance, the output sequence can be autoregressively generated by sampling a likely next output element, adding that element to the context window, and re-generating the probability distribution based on the updated context window, and sampling a likely next output element, and so forth.

The output sequence can also be generated non-autoregressively. For instance, multiple output elements of the output sequence can be predicted together without explicit sequential conditioning on each other. See, e.g., Saharia et al., Non-Autoregressive Machine Translation with Latent Alignments, arXiv:2004.07437v3 (Nov. 16, 2020).

The output sequence can include one or multiple portions or elements. In an example content generation configuration, the output sequence can include multiple elements corresponding to multiple portions of a generated output sequence (e.g., a textual sentence, values of a discretized waveform, computer code, etc.). In an example classification configuration, the output sequence can include a single element associated with a classification output. For instance, an output "vocabulary" can include a set of classes into which an input sequence is to be classified. For instance, a vision transformer block can pass latent state information to a multilayer perceptron that outputs a likely class value associated with an input image.

The output determination system 80 may process the one or more datasets and/or the output(s) of the sensor processing system 60 with a data augmentation block 92 to generate augmented data. For example, one or more images can be processed with the data augmentation block 92 to generate one or more augmented images. The data augmentation can include data correction, data cropping, the removal of one or more features, the addition of one or more features, a resolution adjustment, a lighting adjustment, a saturation adjustment, and/or other augmentation.

In some implementations, the one or more datasets and/or the output(s) of the sensor processing system 60 may be stored based on a data storage block 94 determination.

The output(s) of the output determination system 80 can then be provided to a user via one or more output components of the user computing device 52. For example, one or more user interface elements associated with the one or more outputs can be provided for display via a visual display of the user computing device 52.

The processes may be performed iteratively and/or continuously. One or more user inputs to the provided user interface elements may condition and/or affect successive processing loops.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system for multimodal search, the system comprising:
   one or more processors; and
   one or more non-transitory computer-readable media that collectively store instructions that, when executed by the one or more processors, cause the computing system to perform operations, the operations comprising:
   obtaining image data, wherein the image data is descriptive of one or more images, wherein the one or more images comprise one or more frames obtained from a live camera feed;
   processing the image data with an object classification model to determine one or more object classifications for one or more objects depicted in the one or more images;
   processing the one or more object classifications to generate one or more multimodal query suggestions, wherein the one or more multimodal query suggestions comprise one or more suggested text strings to provide with at least a portion of the image data to a search engine;
   providing the one or more suggested text strings for display with the live camera feed;
   obtaining a selection of the one or more suggested text strings associated with the one or more multimodal query suggestions;
   generating a multimodal query comprising the one or more suggested text strings and at least one of the one or more images or a current frame of the live camera feed; and
   determining one or more search results based on the multimodal query.

2. The system of claim 1, wherein processing the one or more object classifications to generate the one or more multimodal query suggestions comprises:
   determining one or more textual queries associated with one or more object types associated with the one or more object classifications.

3. The system of claim 2, wherein the one or more textual queries are determined based on one or more knowledge graphs.

4. The system of claim 2, wherein the one or more textual queries are determined based on a user-specific search history for a user associated with a mobile computing device, wherein the live camera feed is generated with the mobile computing device.

5. The system of claim 1, wherein generating the multimodal query comprises:
   processing at least one of the one or more images or the current frame of the live camera feed with an image segmentation model to generate an image segment that comprises a frame region that depicts the one or more objects; and
   providing the image segment and the one or more suggested text strings to the search engine.

6. The system of claim 1, wherein determining the one or more search results based on the multimodal query comprises:
   processing the multimodal query with an embedding model to generate a multimodal query embedding; and
   determining, based on the multimodal query embedding, one or more nearest neighbor embeddings associated with one or more web resources to provide as the one or more search results.

7. The system of claim 1, wherein providing the one or more suggested text strings for display with the live camera feed comprises providing the one or more suggested text strings overlayed over the live camera feed; and
   wherein the operations further comprise:
   providing the one or more search results for display in a search results interface provided below the live camera feed.

8. The system of claim 1, wherein obtaining image data comprises:
   obtaining the one or more images from a temporary cache, wherein the temporary cache temporarily stores frames from the live camera feed, wherein the frames of the temporary cache are deleted from the temporary cache when a threshold time from capture is reached.

9. The system of claim 8, wherein the temporary cache is updated on a rolling basis to delete frames at the same rate as new frames are added once a threshold cache size is reached.

10. The system of claim 9, wherein the threshold cache size comprises a storage size between one second to ten seconds of frames.

11. A computer-implemented method for multimodal search prediction, the method comprising:

obtaining, by a computing system comprising one or more processors, image data, wherein the image data is descriptive of one or more images, wherein the one or more images comprise one or more frames obtained from a live camera feed;

processing, by the computing system, the image data with an object classification model to determine one or more object classifications for one or more objects depicted in the one or more images;

processing, by the computing system, the one or more object classifications to generate a plurality of action suggestions, wherein the plurality of action suggestions comprise a multimodal query suggestion and one or more other data processing action suggestions, wherein the multimodal query suggestion comprises a suggested text string to provide with at least a portion of the image data to a search engine;

providing, by the computing system, the plurality of action suggestions for display with the live camera feed;

obtaining, by the computing system, a selection of the multimodal query suggestion of the plurality of action suggestions;

generating, by the computing system, a multimodal query comprising the suggested text string and at least one of the one or more images or a current frame of the live camera feed; and determining, by the computing system, one or more search results based on the multimodal query.

12. The method of claim 11, wherein the one or more other data processing action suggestions comprise a digitize action suggestion, wherein the digitize action suggestion is associated with generating a digital version of a depicted graphic.

13. The method of claim 12, further comprising:
obtaining a second selection that selects the digitize action suggestion;
generating the digital version of the depicted graphic; and
providing the digital version of the depicted graphic for display.

14. The method of claim 13, wherein generating the digital version of the depicted graphic comprises:
processing the one or more images with an image segmentation model to generate an image segment that segments the depicted graphic from the one or more images;
processing the image segment with an optical character recognition model to extract text from the depicted graphic;
processing the image segment with a layout determination model to determine graphical features and structural features of the depicted graphic; and
generating the digital version of the depicted graphic based on the text, the graphical features, and the structural features of the depicted graphic.

15. The method of claim 11, wherein the one or more other data processing action suggestions comprise an application navigation suggestion associated with navigating to a second application based on the one or more objects classifications.

16. The method of claim 15, further comprising:
obtaining a second selection that selects the application navigation suggestion; and
transmitting, with an application programming interface, data associated with the one or more object classifications to the second application.

17. One or more non-transitory computer-readable media that collectively store instructions that, when executed by one or more computing devices, cause the one or more computing devices to perform operations, the operations comprising:
obtaining image data, wherein the image data is descriptive of one or more images, wherein the one or more images comprise one or more frames obtained from a live camera feed;
processing the image data to generate one or more multimodal query suggestions based on one or more object detections associated with one or objects depicted within the one or more images, wherein the one or more multimodal query suggestions comprise one or more suggested text strings to provide with at least a portion of the image data to a search engine;
providing the one or more suggested text strings for display with the live camera feed;
obtaining additional image data, wherein the additional image data is descriptive of one or more additional images, wherein the one or more additional images comprise one or more additional frames occurring after the one or more frames of the one or more images;
determining the one or more second objects depicted within the one or more additional images differ from the one or more objects depicted within the one or more images;
in response to determining the one or more second objects and the one or more objects differ, processing the additional image data to generate one or more second multimodal query suggestions based on one or more second object detections associated with the one or more second objects depicted within the one or more additional images, wherein the one or more second multimodal query suggestions comprise one or more second suggested text strings to provide with at least a portion of the additional image data to the search engine; and
providing the one or more second suggested text strings for display with the live camera feed.

18. The one or more non-transitory computer-readable media of claim 17, wherein the operations further comprise:
obtaining a selection of the one or more second suggested text strings associated with the one or more second multimodal query suggestions;
generating a multimodal query comprising the one or more second suggested text strings and at least one of the one or more additional images or a current frame of the live camera feed; and
determining one or more search results based on the multimodal query.

19. The one or more non-transitory computer-readable media of claim 17, wherein the operations further comprise:
after providing the one or more suggested text strings for display with the live camera feed and before obtaining the additional image data:
obtaining one or more second images from the live camera feed;
determining the one or more second images depict the one or more objects; and
continuing to provide the one or more suggested text strings for display with the live camera feed without performing an additional suggestion prediction.

20. The one or more non-transitory computer-readable media of claim 17, wherein the live camera feed is generated with one or more image sensors of a mobile computing device.

* * * * *